United States Patent
Imanishi et al.

(10) Patent No.: US 7,326,147 B2
(45) Date of Patent: Feb. 5, 2008

(54) CONTINUOUSLY VARIABLE TRANSMISSION APPARATUS

(75) Inventors: Takashi Imanishi, Fujisawa (JP); Eiji Inoue, Fujisawa (JP); Takumi Sinojima, Fujisawa (JP); Toshirou Toyoda, Fujisawa (JP)

(73) Assignee: NSK Ltd., Tokyo (JP)

( * ) Notice: Subject to any disclaimer, the term of this patent is extended or adjusted under 35 U.S.C. 154(b) by 190 days.

(21) Appl. No.: 11/074,804

(22) Filed: Mar. 9, 2005

(65) Prior Publication Data
US 2005/0202930 A1    Sep. 15, 2005

(30) Foreign Application Priority Data
Mar. 9, 2004 (JP) .......................... P2004-065330
Jun. 23, 2004 (JP) .......................... P2004-185277

(51) Int. Cl.
F16H 15/38    (2006.01)
F16H 61/664   (2006.01)

(52) U.S. Cl. .................. 477/50; 475/116; 475/216; 475/218

(58) Field of Classification Search ............ 475/208, 475/209, 210, 214, 215, 216, 218, 116; 477/50, 477/166
See application file for complete search history.

(56) References Cited

U.S. PATENT DOCUMENTS 5,888,160 A * 3/1999 Miyata et al. ............ 475/216
5,980,420 A * 11/1999 Sakamoto et al. ............ 476/10
6,030,311 A * 2/2000 Osumi ..................... 476/42
6,074,320 A   6/2000 Miyata et al.
6,569,051 B2  5/2003 Hirano et al.
7,160,220 B2 * 1/2007 Shinojima et al. .......... 475/208

FOREIGN PATENT DOCUMENTS

| JP | 9-210191 A    | 8/1997 |
| JP | 11-108148 A   | 4/1999 |
| JP | 2001-50375 A  | 2/2001 |
| JP | 2001-50380 A  | 2/2001 |
| JP | 2001-235022 A | 8/2001 |

* cited by examiner

Primary Examiner—David D. Le
(74) Attorney, Agent, or Firm—Sughrue Mion, Pllc.

(57) ABSTRACT

A continuously variable transmission apparatus includes a toroidal continuously variable transmission, a planetary gear transmission and a clutch apparatus that connects the toroidal continuously variable transmission and the planetary gear transmission. The clutch apparatus includes: a low speed clutch a high speed clutch and a controller. The controller controls the transmission ratio of the toroidal continuously variable transmission so that rotational speeds of members connected via the clutch apparatus equals with each other, and then disengages the one of the low speed clutch and the high speed clutch after engaging the other, whereby an instance of simultaneously transmitting the power by the two clutches is set during a time period until disconnecting the other clutch after starting to transmit the power by the one clutch.

22 Claims, 27 Drawing Sheets

CONTINUOUSLY VARIABLE TRANSMISSION APPARATUS

BACKGROUND OF THE INVENTION

1. Field of the Invention

The present invention relates to an improvement in a continuously variable transmission apparatus utilized as an automatic transmission for a vehicle (automobile) and integrated with a toroidal-type continuously variable transmission apparatus realizing a structure capable of preventing a state of bringing about an abrupt variation in a transmission ratio when switching a low speed mode and a high speed mode at low cost.

2. Background Art

As an automatic transmission apparatus for a vehicle, researches are carried out on using a toroidal-type continuously variable transmission as shown by FIGS. 27 through 29 and the transmission is partially embodied. The toroidal-type continuously variable transmission is referred to as a double cavity type and input side disks 2, 2 are supported by surroundings of both end portions of an input shaft 1 via ball splines 3, 3. Therefore, the two input side disks 2, 2 are supported concentrically and synchronizingly rotatably. Further, an output gear 4 is supported at a surrounding of a middle portion of the input shaft 1 rotatably relative to the input shaft 1. Further, output side disks 5, 5 are engaged to both end portions of a cylindrical portion provided at a central portion of the output gear 4 respectively by splines. Therefore, the two output side disks 5, 5 are synchronizingly rotated along with the output gear 4.

Further, respective pluralities of pieces (normally, two through three pieces respectively) of power rollers 6, 6 are interposed between the respective input side disks 2, 2 and the respective output side disks 5, 5. The respective power rollers 6, 6 are respectively supported rotatably by inner side faces of trunnions 7, 7 via support shafts 8, 8 and a plurality of rolling bearings. The respective trunnions 7, 7 are rockably displaceable centering on pivoting shafts 9, 9 provided at the respective trunnions 7, 7 concentrically with each other at both end portions in respective length directions (up and down direction of FIGS. 27, 29 and head and tail direction of FIG. 28). A motion of inclining the respective trunnions 7, 7 is carried out by displacing the respective trunnions 7, 7 in axial directions of the pivoting shafts 9, 9 by hydraulic type actuators 10, 10 and inclined angles of all of the trunnions 7, 7 are synchronized with each other hydraulically and mechanically.

That is, when the inclined angles of the respective trunnions 7, 7 are changed in order to change a transmission ratio between the input shaft 1 and the output gear 4, the respective trunnions 7, 7 are displaced by the respective actuators 10, 10 respectively in reverse directions (same direction with regard to directions of rotating the respective disks 2, 5), for example, the power roller 6 on a right side of FIG. 18 is displaced to a lower side of the drawing and the power roller 6 on a left side of the drawing is displaced to an upper side of the drawing respectively. As a result, directions of forces in tangential lines acting on rolling contact portions (traction portions) between peripheral faces of the respective power rollers 6, 6 and the inner side faces of the respective input side disks 2, 2 and the respective output side disks 5, 5 are changed (side slip is produced at the contact portion). Further, in accordance with the change in the directions of the forces, the respective trunnions 7, 7 are rocked (inclined) in directions reverse to each other centering on the pivoting shafts 9, 9 axially supported by support plates 11, 11. As a result, contact positions between the peripheral faces of the respective power rollers 6, 6 and the inner side faces of the respective input side and output side disks 2, 5 are changed and a rotational transmission ratio between the input shaft 1 and the output gear 4 is changed.

A state of charging and discharging a pressurized oil to and from the respective actuators 10, 10 is controlled by a single piece of control valve 12 regardless of a number of the respective actuators 10, 10 and movement of any single piece of trunnion 7 is fed back to the control valve 12. The control valve 12 includes a sleeve 14 displaced by a stepping motor 13 in an axial direction (head and tail direction of FIG. 27, left and right direction of FIG. 29) and a spool 15 fit to an inner diameter side of the sleeve 14 displaceably in the axial direction. Further, in rods 17, 17, connecting the respective trunnions 7, 7 and pistons 16, 16 of the actuators 10, 10, an end portion of the rod 17 belonging to any single piece of the trunnion 7 is fixed with a precess cam 18 and there is constituted a feedback mechanism for transmitting movement of the rod 17, that is, a synthesized value of a displacement amount in an axial direction and a displacement amount in a rotational direction to the spool 15 via the precess cam 18 and a link arm 19. Further, a synchronizing cable 20 is hung between the respective trunnions 7, 7 to thereby mechanically synchronize the inclined angles of the respective trunnions 7, 7 even in a failure in a hydraulic system.

In switching a speed changing state, a flow path in a predetermined direction of the control valve 12 is opened by displacing the sleeve 14 to a predetermined position compatible with a desired transmission ratio by the stepping motor 13. As a result, a pressurized oil is fed in the predetermined direction to the respective actuators 10, 10 and the respective actuators 10, 10 displace the trunnions 7, 7 in the predetermined direction. That is, in accordance with feeding the pressurized oil, the respective trunnions 7, 7 are rocked centering on the respective pivoting shafts 9, 9 while being displaced in axial directions of the respective pivoting shafts 9, 9. Further, movement (in axial direction and rocking displacement) of any single piece of the trunnion 7 is transmitted the spool 15 via a cam surface 21 of the precess cam 18 fixed to the end portion of the rod 17 and the link arm 19 to displace the spool 15 in the axial direction. As a result, in a state of displacing the trunnion 7 by a predetermined amount, the flow path of the control valve 12 is closed and the pressurized oil is stopped from charging and discharging to and from the respective actuators 10, 10.

In operating the above-described toroidal-type continuously variable transmission, the input side disk 2 on one side (left side of FIGS. 27, 28) is driven to rotate by a drive shaft 22 connected to a power source of an engine or the like via a press apparatus 23 of a loading cam type, or a hydraulic type as illustrated. As a result, the pair of input side disks 2, 2 supported by the both end portions of the input shaft 1 are rotated synchronizingly while being pressed in directions proximate to each other. Further, the rotation is transmitted to the respective output side disks 5, 5 via the respective power rollers 6, 6 and outputted from the output gear 4.

In the case in which rotational speeds of the input shaft 1 and the output gear 4 are changed, first, when the speed is reduced between the input shaft 1 and the output gear 4, the respective trunnions 7, 7 are moved in the axial directions of the respective pivoting shafts 9, 9 by the respective actuators 10, 10 to rock to positions shown in FIG. 28. Further, as shown by FIG. 28, the peripheral faces of the respective power rollers 6, 6 are made to be respectively brought into contact with portions of the respective input side disks 2, 2 on sides of centers of the inner side faces and portions of the respective outputs side disks 5, 5 on sides of outer peripheries of the inner side faces. On the contrary, in increasing the speed, the respective trunnions 7, 7 are rocked in directions opposed to those of FIG. 28 and contrary to a state shown in FIG. 28, the respective trunnions 7, 7 are inclined such that the peripheral faces of the respective power rollers 6, 6 are respectively brought into rolling contact with portions of the respective input side disks 2, 2 on sides of the outer peripheries in the inner side surfaces thereof and portions of the respective output side disks 5, 5 on sides of the centers of the inner side faces thereof. A middle transmission ratio (speed ratio) is provided between the input shaft 1 and the output gear 4 when the inclined angles of the respective trunnions 7, 7 are set to middles.

Further, when the toroidal-type continuously variable transmission constituted and operated as described above is actually integrated to a continuously variable transmission for an automobile, it has been variously proposed in a background art to constitute a continuously variable transmission apparatus by being integrated with a planetary gear mechanism. FIG. 30 shows the continuously variable transmission apparatus proposed in the prior art disclosed in U.S. Pat. No. 6,251,039. The continuously variable transmission apparatus is referred to as so-to-speak geared neutral, in which a rotational state of an output shaft can be switched to rotate regularly and rotate reversely by interposing a stationary state while rotating the input shaft in one direction and which is constituted by a toroidal-type continuously variable transmission 24 and a planetary gear type transmission 25. The toroidal-type continuously variable transmission 24 is provided with the input shaft 1, the pair of input side disks 2, 2, the output side disk 5a and the plurality of power rollers 6, 6. In the illustrated example, the output side disk 5a is constituted by a structure of butting outer side faces of the pair of output side disks to integrate.

The planetary gear type transmission 25 is provided with a carrier 26 coupled to fix to the input shaft 1 and the input side disk 2 on one side (right side of FIG. 30). A first transmitting shaft 28 both end portions of which are respectively provided fixedly with planetary gear elements 27a, 27b is rotatably supported by a middle portion in a diameter direction of the carrier 26. Further, a second transmitting shaft 31 both end portions of which are fixedly provided with sun gears 29a, 29b is supported rotatably on a side opposed to the input shaft 1 by interposing the carrier 26 therebetween concentrically with the input shaft 1. Further, each of the planetary gear elements 27a, 27b and a sun gear 32 fixedly provided to a front end portion (right end portion of FIG. 30) of a hollow rotating shaft 32 a base end portion (left end portion of FIG. 30) is coupled with the output side disk 5a or the sun gear 29a fixedly provided to one end portion (left end portion of FIG. 30) of the second transmitting shaft 30 are respectively brought in mesh with each other. Further, the planetary gear element 27a on one side (left side of FIG. 30) is brought in mesh with a ring gear 34 rotatably provided at a surrounding of the carrier 26 via other planetary gear element 33.

Meanwhile, planetary gear elements 36a, 36b are rotatably supported by a second carrier 35 provided at a surrounding of the sun gear 29b fixedly provided to other end portion (right end portion of FIG. 30) of the second transmitting shaft 30. Further, the second carrier 35 is fixedly provided to a base end portion (left end portion in FIG. 30) of an output shaft 37 arranged concentrically with the input shaft 1 and the second transmitting shaft 30. Further, the respective planetary gear elements 36a, 36b are brought in mesh with each other, the planetary gear element 36a on one side is brought in mesh with the sun gear 29b, and the planetary gear element 36b on other side is brought in mesh with a second ring gear 38 provided rotatably at a surrounding of the second carrier 35, respectively. Further, the ring gear 34 and the second carrier 35 are made to be engageable and disengageable by a low speed clutch 39, and the second ring gear 38 and a fixed portion of a housing or the like are made to be engageable and disengageable by a high speed clutch 40.

In the case of the above-described continuously variable transmission apparatus shown in FIG. 30, in a so-to-speak low speed mode state connecting the low speed clutch 39 and disconnecting the high speed clutch 40, power of the input shaft 1 is transmitted to the output shaft 37 via the ring gear 34. Further, by changing a transmission ratio of the toroidal-type continuously variable transmission 24, a transmission ratio as a total of the continuously variable transmission apparatus, that is, a transmission ratio between the input shaft 1 and the output shaft 37 is changed. In such a low speed mode state, the transmission ratio of the total of the continuously variable apparatus is changed infinitely. That is, by adjusting the transmission ratio of the toroidal-type continuously variable transmission 24, while bringing the input shaft 1 in a state of being rotated in one direction, a rotational state of the output shaft 37 can be converted to regular rotation and reverse rotation by interposing a stationary state.

Further, in running at an accelerated speed or a constant speed in such a low speed mode state, a torque (passing torque) passing the toroidal-type continuously variable transmission 24 is applied from the input shaft 1 to the output shaft disk 5a via the carrier 26, the first transmitting shaft 28, the sun gear 32 and the hollow rotating shaft 31 and is applied from the output side disk 5a to the respective input side disks 2, 2 via the respective power rollers 6, 6. That is, the torque passing the toroidal-type continuously variable transmission 24 in running at the accelerated speed or the constant speed is circulated in a direction in which the respective input side disks 2, 2 receive the torque from the respective power rollers 6, 6.

In contrast thereto, in a so-to-speak high speed mode state in which the low speed clutch 39 is disconnected and the high speed clutch 40 is connected, the power of the input shaft 1 is transmitted to the output shaft 37 via the first and the second transmitting shafts 28, 30. Further, by changing the transmission ratio of the toroidal-type continuously variable transmission 24, the transmission ratio as the total of the continuously variable transmission apparatus is changed. In this case, the larger the transmission ratio of the toroidal-type continuously variable transmission 24, the larger the transmission ratio of the total of the continuously variable transmission apparatus. In running at an accelerated state or a constant speed in such a high speed mode state, a torque passing the toroidal-type continuously variable transmission 25 is applied from the respective input side disks 2, 2 to the output side disk 5a via the respective power rollers 6, 6.

Further, U.S. Pat. No. 6,171,210 discloses a continuously variable transmission apparatus as shown by FIG. 31. The continuously variable apparatus is referred to as so-to-speak power split type and constituted by combining a toroidal-type continuously variable transmission 24a and a planetary gear type transmission 25a. Further, in a low speed mode, power is transmitted only by the toroidal-type continuously variable transmission 24a and in a high speed mode, power is mainly transmitted by the planetary gear type transmission 25a and a transmission ratio by the planetary gear type transmission 25a is controlled by changing a transmission ratio of the toroidal-type continuously variable transmission 24a.

Therefore, a base end portion (right end portion of FIG. 31) of the input shaft 1 that extends through the center portion of the toroidal-type continuously variable transmission 24a and supports the pair of input side disks 2, 2 at both end portions thereof and a ring gear 41 constituting the planetary gear type transmission 25a are coupled via the high speed clutch 40a. Further, a starting clutch 44 and a hydraulic type pressing apparatus 23a are provided in a direction of transmitting power in series with each other between an output side end portion (right end portion of FIG. 31) of a crankshaft 43 of an engine 42 constituting a drive source and an input side end portion (=base end portion=left end portion of FIG. 31) of the input shaft 1. The pressing apparatus 23a is constituted by fitting the input side disk 2 on the base end side into a cylinder 96 in oil tight and to be able to transmit a rotating force.

Further, an output shaft 37a for outputting power based on rotation of the input shaft 1 is arranged concentrically with the input shaft 1. Further, the planetary gear type transmission 25a is provided at a surrounding of the output shaft 37a. A sun gear 45 constituting the planetary gear type transmission 25a is fixed to an input side end portion (left end portion of FIG. 31) of the output shaft 37a. Therefore, the output shaft 37a is rotated in accordance with rotation of the sun gear 45. The ring gear 41 is supported at a surrounding of the sun gear 45 concentrically with the sun gear 45 and rotatably. Further, a plurality of sets of planetary gear elements 46a and 46b are provided between an inner peripheral face of the ring gear 41 and an outer peripheral face of the sun gear 45. The respective sets of the planetary gear elements 46a and 46b are brought in mesh with each other, the planetary gear elements 46a arranged on an outer diameter side are brought in mesh with the ring gear 41 and the planetary gear elements 46b arranged on an inner diameter side are brought in mesh with the sun gear 45. The respective planetary gear elements 46a and 46b are rotatably supported by a carrier 47. Further, the carrier 47 is rotatably supported by a middle portion of the output shaft 37a.

Further, the carrier 47 and the pair of output side disks 5, 5 constituting the toroidal-type continuously variable transmission 24a are connected in a state of being capable of transmitting the rotating force by a first power transmitting mechanism 48. The first power transmitting mechanism 48 is constituted by coupling both end portions of a transmitting shaft 49 and the respective output side disks 5, 5 or the carrier 47 by a chain transmitting mechanism or a gear transmitting mechanism. Further, the carrier 47 is rotated by a speed in accordance with a transmission ratio of the chain transmitting mechanism or the gear transmitting mechanism in accordance with rotation of the respective output side disks 5, 5 in a direction reverse to that of the output side disks 5, 5. Meanwhile, the input shaft 1 and the ring gear 41 are made to be connectable in a state of capable of transmitting the rotating force via other transmitting shaft 50 disposed concentrically with the input shaft 1 and the high speed clutch 40a. Therefore, the transmitting shaft 50 is rotated in a direction and at a speed the same as those of the input shaft 1 in connecting the high speed clutch 40a.

Further, a low speed clutch 39a is provided between an outer peripheral edge portion of the carrier 47 and one end portion (right end portion of FIG. 31) in the axial direction of the ring gear 41. Further, a reverse clutch 51 is provided between the ring gear 41 and a fixed portion of a housing (not illustrated) of the continuously variable transmission apparatus or the like.

According to the continuously variable transmission apparatus constituted as described above, first, in the low speed mode state, the low speed clutch 39a is connected and the high speed clutch 40a and the reverse clutch 51 are disconnected. When the starting clutch 44 is connected under the state and the input shaft 1 is rotated, only the toroidal-type continuously variable transmission 24a transmits power from the input shaft 1 to the output shaft 37a. In running at low speed in this way, the transmission ratio between the respective pairs of input side disks 2, 2 and the output side disks 5, 5 is controlled similar to the case of a single one of the above-described toroidal-type continuously variable transmission shown in FIGS. 27 through 29. Further, in accelerating or running at constant speed in the above-described low speed mode state, a torque passing the toroidal-type continuously variable transmission 24a is transmitted from the respective above-described input side disks 2, 2 to the respective above-described disks 5, 5 via the respective power rollers.

In contrast thereto, in the high speed mode state, the above-described high speed clutch 40a is connected and the above-described low speed clutch 39a and the reverse clutch 51 are disconnected. When the input shaft 1 is rotated under the state, power is transmitted from the input shaft 1 to the output shaft 37a by the transmitting shaft 50 and the planetary gear type transmission 25a. That is, when the input shaft 1 is rotated in running at high speed as described above, the rotation is transmitted to the ring gear 41 via the high speed clutch 40a and the transmitting shaft 50. Further, rotation of the ring gear 41 is transmitted to the sun gear 45 via the plurality of sets of planetary gear elements 46a and 46b to rotate the output shaft 37a fixed with the sun gear 45. When revolving speed of the respective planetary gear elements 46a and 46b is changed by changing the transmission ratio of the toroidal-type continuously variable transmission 24a, a transmission ratio of a total of the continuously variable transmission apparatus can be controlled.

That is, in the high speed mode state, the slower the revolving speed of the respective planetary gear elements 46a and 46b, the faster becomes the rotating speed of the output shaft 37a fixed with the sun gear 45. Therefore, in the high speed mode state, the more changed the transmission ratio of the toroidal-type continuously variable transmission 24a to a speed reducing side, the more changed is the transmission ratio of the total of the continuously variable transmission apparatus to a speed increasing side. In such a state of running at high speed, the toroidal-type continuously variable transmission 24a is applied with the torque not from the input side disk 2 but from the output side disk 5 (applied with a minus torque when the torque applied at low speed is constituted by a plus torque). That is, in the state of connecting the high speed clutch 40a, the torque transmitted from the engine 42 to the input shaft 1 is transmitted to the ring gear 41 of the planetary gear type transmission 24a via the transmitting shaft 50. Therefore, a torque transmitted from the side of the input shaft 1 to the respective input side disks 2, 2 constituting the toroidal-type continuously variable transmission 24a is almost nullified.

Meanwhile, a portion of the torque transmitted to the ring gear 41 via the transmitting shaft 50 is transmitted from the respective planetary gear elements 46a and 46b to the respective output side disks 5, 5 via the carrier 47 and the first power transmitting mechanism 48. In this way, the more changed is the transmission ratio of the toroidal-type continuously variable transmission 24a to the speed reducing side, the smaller the torque applied from the output side disks 5, 5 to the toroidal-type continuously variable transmission 24a in order to change the transmission ratio of the total of the continuously variable transmission apparatus to the speed increasing side. As a result, in running at high speed, the torque inputted to the toroidal-type continuously variable transmission 24a is reduced, a transmitting efficiency of the total of the continuously variable transmission apparatus is increased, and durability of constituent parts of the toroidal-type continuously variable transmission 24a can be promoted. In accelerating or running at constant speed under the high speed mode state, the torque passing the toroidal-type continuously variable transmission 24a is transmitted from the respective output side disks 5, 5 to the respective input side disks 2, 2 via the respective power rollers.

Further, when the output shaft 37a is rotated reversely in order to back up the automobile, both of the low speed and the high speed clutches 39a and 40a are disconnected and the reverse clutch 51 is connected. As a result, the ring gear 41 is fixed, and the respective planetary gear elements 46a and 46b are revolved at a surrounding of the sun gear 45 while being brought in mesh with the ring gear 41 and the sun gear 45. Further, the sun gear 45 and the output shaft 37a fixed with the sun gear 45 are rotated in a direction reverse to that in running at low speed, mentioned above, and in running at high speed, mentioned above.

In the case of the continuously variable transmission apparatus constituted by combining the toroidal-type continuously variable transmission 24 or 24a and the planetary gear type transmission 25 or 25a via the clutch apparatus and having the low speed mode and the high speed mode, regardless of whether the continuously variable transmission apparatus is constituted by the above-described geared neutral type or the above-described power split type, in switching the low speed mode and the high speed mode, the magnitude and the direction of the torque passing the toroidal-type continuously variable transmission 24 or 24a are rapidly changed. Meanwhile, respective constituent members of the toroidal-type continuously variable transmission 24 or 24a is displaced or elastically deformed in a direction in accordance with the direction of the torque in accordance with the magnitude of the torque passing the apparatus (passing torque). Further, in accordance with the displacement or the elastic deformation, there is produced so-to-speak torque shift in which the transmission ratio of the toroidal-type continuously variable transmission 24 or 24a is changed.

Therefore, when any measure is not taken therefor, in switching the modes of the continuously variable transmission apparatus, the transmission ratio of the total of the continuously variable transmission apparatus is rapidly varied by the torque shift. When the transmission ratio is varied in this way, a speed change shock is brought about to give unpleasant feeling to a passenger starting from a driver and to cause to deteriorate a part of a system of transmitting power and therefore, the rapid variation is not preferable. In contrast thereto, there is disclosed a technology of preventing rapid variation of the transmission ratio in switching the mode in U.S. Pat. No. 6,074,320, JP-A-2001-50375, JP-A-2001-50380, JP-A-2001-235022, and U.S. Pat. No. 6,569, 051, JP-A-9-210191, JP-A-11-108148 which have been known conventionally.

Among them, according to a prior art described in U.S. Pat. No. 6,074,320, the mode is switched in a state in which a rotating speed of power inputted to a planetary gear type transmission via a toroidal-type continuously variable transmission and a rotating speed of power inputted to the planetary gear type transmission without passing the toroidal-type continuously variable transmission coincide with each other. Further, according to prior arts described in JP-A-2001-50375, JP-A-2001-50380 and JP-A-2001-235022, in switching modes, connection and disconnection of respective clutches are switched in semi-clutched state. Further, according to the prior art described in U.S. Pat. No. 6,569,051, modes are switched by electromagnetic clutches. Further, according to the described background art, a switching valve of a spool valve type for controlling to charge and discharge pressurized oil to and from the two clutches for low speed and for high speed is provided with a position of introducing hydraulic pressure to the two clutches in addition to positions for introducing hydraulic pressure to either one of the clutches and stopping to introduce hydraulic pressure to other of the clutches. In the case of the described background art, a transmission ratio of a toroidal type continuously variable transmission in switching a mode is restricted to be less than a predetermined value.

According to the prior art preventing rapid variation of the transmission ratio in switching modes in which modes are switched in the state in which the rotating speeds coincide with each other as disclosed in U.S. Pat. No. 6,074,320, the rapid variation of the transmission ratio based on the torque shift cannot be prevented only thereby. Further, in the case of switching connection and disconnection of the respective clutches in the semi-clutched state as disclosed in JP-A-2001-50375, JP-A-2001-50380 and JP-A-2001-235022, a delicate control is needed, a total of the apparatus is complicated, cost is increased and also danger of failure is enhanced. Further, in the case of switching modes by the electromagnetic clutches disclosed in U.S. Pat. No. 6,069, 051, not only rapid variation of the transmission ratio based on the torque shift cannot be prevented only thereby but also danger of failure is enhanced.

SUMMARY OF THE INVENTION

In view of the above-described circumstance, the invention has been made to realize a structure at a low cost, in which an occurrence of an abrupt variation in reduction rate can be surely prevented when switching a low speed mode and a high speed mode, and in which a failure does not easily occur.

Further, in the case of a structure of selecting a state of connecting either one of clutches and a state of connecting two clutches by a single piece of switching valve as described in JP-A-9-210191, the following problems (1) through (3) are posed.

(1) Owing to the structure of simultaneously introducing hydraulic pressure into hydraulic chambers for clutches for connecting the two clutches in order to simultaneously fasten the clutch for low speed and the clutch for high-speed in switching the mode, a time period required for switching the mode is prolonged to cause to give a strange feeling to a driver. Particularly, in the case of the structure described in JP-A-9-210191, the hydraulic pressure is simultaneously introduced to the two clutches by the switching valve, however, it cannot be guaranteed that the two clutches are connected so far as a time period to some degree has not elapsed after switching the switching valve by influence of resistance of a hydraulic pressure introducing path portion and a stroke of a piston belonging to the clutch. Therefore, in order to ensure a state of simultaneously connecting the two clutches, the time period required for switching the mode is obliged to be prolonged.

(2) By similar reason, an amount of pressurized oil necessary for switching the mode is increased, an amount of working a pump for supplying the pressurized oil is increased and an efficiency of a total of a continuously variable transmission apparatus is reduced.

(3) In order to select either of the states, it is necessary to accurately control a position of the spool constituting the switching valve. Specifically, in switching the mode, in the midst of displacing the spool from one end to other end in an axial direction, after temporarily stopping the spool at a center position, the spool needs to move again in the same direction. A control for moving the spool in this way is troublesome and a danger of failure is enhanced.

Further, in the case of the background art described in JP-A-11-108148, torque shift accompanied by switching the mode is not prevented.

The invention provides a continuously variable transmission apparatus combined with a toroidal type continuously variable transmission and a planetary gear type transmission via a clutch apparatus, wherein the clutch apparatus comprising: a low speed clutch connected in realizing a low speed mode of increasing a gear change ratio of the continuously variable transmission apparatus and disconnected in realizing a high speed mode of reducing the gear change ratio of the continuously variable transmission apparatus; a high speed clutch connected in realizing the high speed mode and disconnected in realizing the low speed mode; and a controller for switching a state of connecting and disconnecting the respective clutches; and wherein the controller brings a speed change state into either mode of the low speed mode and the high speed mode by controlling to connect and disconnect the respective clutches; and the controller has a function, in switching the low speed mode and the high speed mode, that, prior to start to connect one of the low speed clutch and the high speed clutch which has not been connected, by adjusting the transmission ratio of the toroidal type continuously variable transmission, the one clutch is started to connect after making rotational speeds of a pair of members connected via the one clutch substantially coincide with each other, and after starting to transmit a power by the one clutch, an operation of disconnecting other clutch which has been connected is started, whereby an instance of simultaneously transmitting the power by the two clutches is set during a time period until disconnecting the other clutch after starting to transmit the power by the one clutch.

Preferably, a start of the power transmission by the one clutch is detected by detecting a displacement of a drive member for connecting the clutch.

Preferably, the low speed clutch is connected by introducing a hydraulic pressure into a hydraulic chamber for the low speed clutch; the high speed clutch is connected by introducing a hydraulic pressure into a hydraulic chamber for the high speed clutch; and the power is detected to start to transmit by the one clutch of the low speed clutch and the high speed clutch by the hydraulic pressure in the hydraulic chamber for the clutch for introducing the hydraulic pressure in connecting the clutch.

Preferably, the hydraulic pressure in the hydraulic chamber for the clutch is electrically detected by a pressure sensor.

Preferably, the continuously variable transmission apparatus further includes: a switching valve switched by introducing the hydraulic pressure into the hydraulic chamber for the clutch to mechanically detect the hydraulic pressure in the hydraulic chamber for the clutch; wherein a spool constituting the switching valve is displaced by introducing the hydraulic pressure into the hydraulic chamber for the clutch and the hydraulic pressure introduced into the hydraulic chamber for the clutch of the other clutch is reduced based on a displacement of the spool.

Preferably, a state of introducing the hydraulic pressure into the hydraulic chamber for the low speed clutch is controlled by the switching valve for the low speed clutch including a spool for the low speed clutch displaced by introducing the hydraulic pressure into a pilot chamber for the low speed clutch; a state of introducing the hydraulic pressure into the hydraulic chamber for the high speed clutch including a spool for the high speed clutch displaced by introducing the hydraulic pressure into a pilot chamber for the high speed clutch; the state of introducing the hydraulic pressure into the pilot chamber for the low speed clutch and the state of introducing the hydraulic pressure into the pilot chamber for the high speed clutch are controlled by an electric switch valve; the switching valve for the low speed clutch reduces the hydraulic pressure introduced into the hydraulic chamber for the low speed clutch by introducing the hydraulic pressure into the pilot chamber for the low speed clutch; the hydraulic pressure introduced into the pilot chamber for the low speed clutch is the hydraulic pressure introduced into the hydraulic chamber for the high speed clutch; the switching valve for the high speed clutch reduces the hydraulic pressure introduced into the hydraulic chamber for the high speed clutch by introducing the hydraulic pressure into the pilot chamber for the high speed clutch; and the hydraulic pressure introduced into the pilot chamber for the high speed clutch is the hydraulic pressure introduced into the hydraulic chamber for the low speed clutch.

Preferably, a state of introducing the hydraulic pressure into the hydraulic chamber for the low speed clutch is controlled by the switch valve for the low speed clutch including a spool for the low speed clutch displaced by introducing the hydraulic pressure into a pilot chamber for the low sped clutch; a state of introducing the hydraulic pressure into the hydraulic chamber for the high speed clutch is controlled by the switching valve for the high speed clutch including a spool for the high speed clutch displaced by introducing the hydraulic pressure into a pilot chamber for the high speed clutch; the state of introducing the hydraulic pressure into the pilot chamber for the low speed clutch and the state of introducing the hydraulic pressure into the pilot chamber for the high speed clutch are controlled by a shifting switching valve including a switching spool displaced by introducing the hydraulic pressure into a switching pilot chamber; a state of introducing the hydraulic pressure into the switching pilot chamber is controlled by a shifting electric switching valve, the switching valve for the low speed clutch reduces the hydraulic pressure introduced into the hydraulic chamber for the low speed clutch by introducing the hydraulic pressure into the pilot chamber for the low speed clutch; the hydraulic pressure introduced into the pilot chamber for the low speed clutch is the hydraulic pressure introduced into the hydraulic chamber for the high speed clutch; the switching valve for the high speed clutch reduces the hydraulic pressure introduced into the hydraulic chamber for the high speed clutch by introducing the hydraulic pressure into the pilot chamber for the high speed clutch; and the hydraulic pressure introduced into the pilot chamber for the high speed clutch is the hydraulic pressure introduced into the hydraulic chamber for the low speed clutch.

Preferably, the switching valve for the high speed clutch includes an elastic member for the high speed clutch on a side opposed to the pilot chamber for the high speed clutch in an axial direction by interposing the spool for the high speed clutch; the spool for the high speed clutch is displaced against an elastic force of the elastic member for the high speed clutch by introducing the hydraulic pressure into the pilot chamber for the high speed clutch; the switching valve for the low speed clutch includes an elastic member for the low speed clutch on a side opposed to the pilot chamber for the low speed clutch in an axial direction by interposing the spool for the low speed clutch; and the spool for the low speed clutch is displaced against an elastic force of the elastic member for the low speed clutch by introducing the hydraulic pressure into the pilot chamber for the low speed clutch.

Preferably, the elastic force of the elastic member for the clutch integrated to the switching valve for the clutch opened in introducing the hydraulic pressure into the hydraulic chamber for the clutch belonging to the clutch which is not to be connected at least in starting in the respective switching valves for the low speed and the high speed clutches is set to be large in a running state and small in a non-running state.

Preferably, the elastic member for the clutch is a compression coil spring for the clutch, the compression coil spring for the clutch is provided between the spool for the clutch and a pressing piston provided displaceably in the axial direction at inside of a cylinder portion provided at a position opposed to the pilot chamber for the clutch in the axial direction by interposing the spool for the clutch, and the pressing piston increases the elastic force of the compression coil spring for the clutch by being displaced to a side of the spool for the clutch by the hydraulic pressure introduced into the cylinder portion when the running state is selected and reduces the elastic force of the compression coil spring for the clutch by being displaced to a side of being remote from the spool for the clutch when the hydraulic pressure in the cylinder portion is discharged by selecting the non-running state.

Preferably, the continuously variable transmission apparatus further includes: a manual switching valve switched to a running mode and a non-running mode by a shift lever installed at a driver's seat; wherein also the elastic forces of the elastic members for the clutches integrated to the switching valves for the clutches opened in introducing the hydraulic pressure into the hydraulic chambers for the clutches belonging not only to the clutch which is not to be connected in starting but also the clutch which is to be connected in starting for elastically pressing the spools for the clutches in the respective switching valves for the low speed and the high speed clutches are increased in a state of switching the manual switching valve to the running mode and reduced in a state of switching the manual switching valve to the non-running mode.

Preferably, the switching valve for the clutch opened in introducing the hydraulic pressure into the hydraulic chamber for the clutch belonging to the clutch which is not to be connected at least in starting in the respective switching valves for the low speed clutch and the high speed clutch, is provided with a reaction force chamber on a side opposed to the pilot chamber for the clutch constituting the switching valve for the clutch by interposing the spool for the clutch constituting the switching valve for the clutch, and the hydraulic pressure in the reaction force chamber for pressing the spool for the clutch to a side of the pilot chamber for the clutch based on the hydraulic pressure introduced to inside of the reaction force chamber is set to be large in the running state and small in the non-running state.

Preferably, the hydraulic pressure outputted from a portion communicating with a delivery port of a pressurizing pump and adjusted to a predetermined pressure by a pressure control valve of an electric type is introduced into the reaction force chamber.

Preferably, the hydraulic pressure having a reduced pressure by being delivered from a delivery port of a pressurizing pump and passing a pressure reducing valve is introduced into the reaction force chamber by passing a pressure control valve of an electric type or an opening and closing valve.

Preferably, the hydraulic pressure having a reduced pressure by being delivered from a delivery port of pressurizing pump and passing a pressure reducing valve is introduced into the reaction force chamber by passing a valve of a hydraulic type switched based on the hydraulic pressure in the hydraulic chamber for the clutch belonging to the connected clutch in the high speed clutch and the low speed clutch.

Preferably, the continuously variable transmission apparatus further includes: a manual switching valve switched to a running mode and a non-running mode by a shift lever installed at a driver's seat; wherein also the hydraulic pressures in the reaction chambers of the switching valves for the clutches opened in introducing the hydraulic pressure into the hydraulic chambers for the clutches belonging not only to the clutch which is not to be connected in starting but also the clutch which is to be connected in starting in the respective switching valves for the low speed and the high speed clutches are increased in a state of switching the manual switching valve to the running mode and reduced in a state of switching the manual switching valve to the non-running mode.

Preferably, the switching valve for the high speed clutch includes a reaction force chamber for the high speed clutch on a side opposed to the pilot chamber for the high speed clutch in an axial direction by interposing the spool for the high speed clutch, the spool for the high speed clutch is displaced against the hydraulic pressure introduced into the reaction force chamber for the high speed clutch by introducing the hydraulic pressure into the pilot chamber for the high speed clutch, the switching valve for the low speed clutch includes a reaction force chamber for the low speed clutch on a side opposed to the pilot chamber for the low speed clutch in an axial direction by interposing the spool for the low speed clutch, and the spool for the low speed clutch is displaced against the hydraulic pressure introduced into the reaction force chamber for the low speed clutch by introducing the hydraulic pressure into the pilot chamber for the low speed clutch.

Preferably, a pressure receiving area on a side of the pilot chamber for the high speed clutch in the spool for the high speed clutch is wider than a pressure receiving area on a side of the reaction force chamber for the high speed clutch; the same hydraulic pressure is made to be able to be introduced into the hydraulic chamber for the high speed clutch and the reaction force chamber for the high speed clutch; a pressure receiving area on a side of the pilot chamber for the low speed clutch in the spool for the low speed clutch is wider than a pressure receiving area on a side of the reaction force chamber for the low speed clutch; and the same hydraulic pressure is made to be able to be introduced into the pilot chamber for the low speed clutch and the reaction force chamber for the low speed clutch.

Preferably, the hydraulic pressure introduced into the pilot chamber for the high speed clutch, the reaction force chamber for the high speed clutch, the pilot chamber for the low speed clutch, and the reaction force chamber for the low speed clutch is the hydraulic pressure introduced into the two hydraulic chambers for the high speed clutch and the low speed clutch.

Preferably, a ratio of the pressure receiving area on the side of the reaction force chamber for the high speed clutch to the pressure receiving area on the side of the pilot chamber for the high speed clutch as well as a ratio of the pressure receiving area on the side of the reaction force chamber for the low speed clutch to the pressure receiving area on the side of the pilot chamber for the low speed clutch are both equal to or larger than 0.4 and less than 1.

Preferably, a rattle preventing spring for the high speed clutch for pressing the spool for the high speed clutch to the side of the pilot chamber for the high speed clutch is provided in the reaction force chamber for the high speed clutch, and a rattle preventing spring for the low speed clutch for pressing the spool for the low speed clutch to the side of the pilot chamber for the low speed clutch is provided in the reaction force chamber for the low speed clutch, respectively.

Preferably, a shifting manual switching valve for manually achieving a function the same as a function of the shifting electric switching valve is provided in parallel with the shifting electric switching valve and a selecting manual switching valve for selecting either of the shifting electric switching valve and the shifting manual switching valve is provided. According to any of the continuously variable transmission apparatus of the invention constituted as described above, in switching the low speed mode and high speed mode, an instance of simultaneously transmitting power by the two clutches of the clutch for low speed and the clutch for high speed (connecting the clutches) can be produced although the instance is a short period of time. Therefore, the torque shift brought about in the toroidal type continuously valuable transmission in switching the mode can be alleviated. That is, in the state of transmitting power by the two clutches (the two clutches are connected), the torque passing the toroidal type continuously variable transmission is substantially nullified. Further, in switching the mode, the two clutches are brought into a state of transmitting power (state of being connected) from the mode heretofore, thereafter, shifted to a new mode. Therefore, when shifting between the different modes, the transmission ratio of the toroidal-type continuously variable transmission is temporarily returned to a state of not being influenced by the passing torque (neutral state). The torque shift is produced dividedly in two stages between the previous mode and the neutral state and between the neutral state and the new mode. The torque shift is not produced abruptly between the different modes. That is, between the respective modes and the neutral state, amounts of elastically deforming respective portions are changed based on a variation in the torque, thereby bringing about a variation in the transmission ratio of the toroidal-type continuously variable transmission. Simultaneously, also a slip rate of a traction portion is changed. As a result, a variation in the transmission ratio of the total of the continuously variable transmission apparatus based on the torque shift of the toroidal-type continuously variable transmission is made to be gradual and the strange feeling given to the passenger starting from the driver can be alleviated. Further, by preventing the driving system from being applied with an impact, durability of a constituent part of the driving system can be promoted.

Therefore, the invention can contribute to a realization of the continuously variable transmission apparatus achieving high efficiency by combining the toroidal-type continuously variable transmission and the planetary gear type transmission, while reducing the strange feeling given to the driver in switching the modes.

BRIEF DESCRIPTION OF THE DRAWINGS

The present invention may be more readily described with reference to the accompanying drawings.

DETAILED DESCRIPTION OF THE PREFERRED EMBODIMENTS

Figure 1:
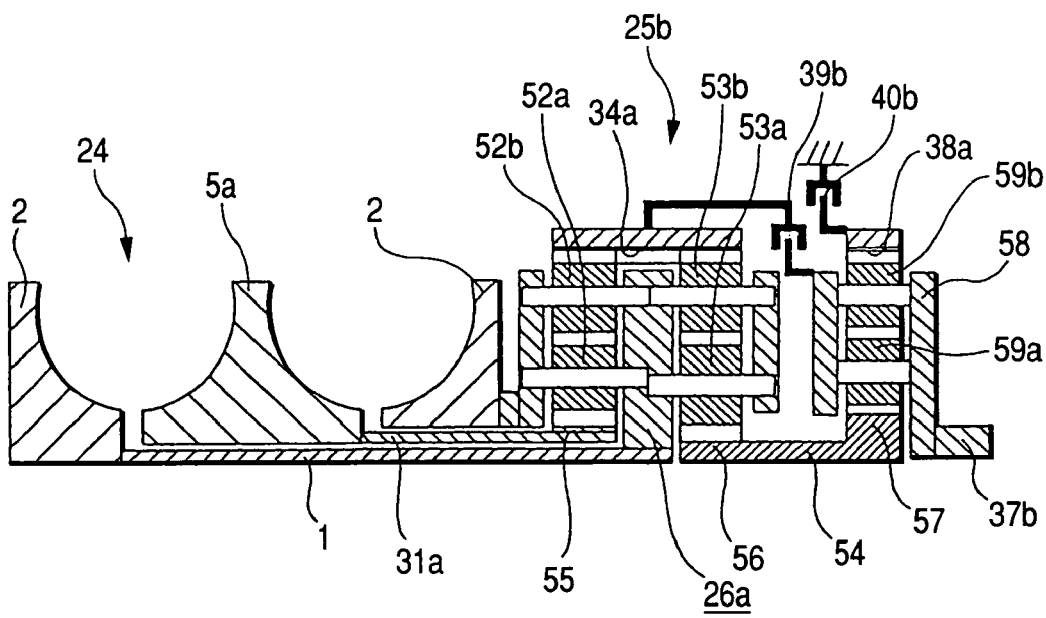
FIG. 1 is an outline sectional view of a half portion showing an example of a continuously variable transmission apparatus according to the invention.

In embodying the invention, for example, starting to transmit power by one clutch (hydraulic type, electromagnetic type, dry friction clutch) is detected by displacement (stroke) of a driving member (a piston in the case of hydraulic type) for connecting the clutch. The detection by the displacement (stroke) is carried out by a displacement meter of a potentiometer or the like installed at the driving member (piston) or a portion displacing along with the drive member (piston).

Or, the clutch for low speed is connected by introducing hydraulic pressure into a hydraulic chamber for the low speed clutch and the clutch for high speed is connected by introducing hydraulic pressure into a hydraulic chamber for the high speed clutch. Further, starting to transmit power to one clutch of the clutch for low speed and the clutch for high-speed is detected by hydraulic pressure in the hydraulic chamber for the clutch for introducing hydraulic pressure when the clutch is connected. Detection of the hydraulic pressure may be carried out mechanically by a hydraulic part for displacing a member by rectified pressure such as a spool valve or the like, or may be carried out electrically by a pressure meter.

That is, detection of hydraulic pressure in the hydraulic chamber for the clutch is electrically carried out by a pressure sensor. Or, there is provided a switching valve switched in accordance with introduction of hydraulic pressure into the hydraulic chamber for the clutch in order to mechanically detect hydraulic pressure in the hydraulic chamber for the clutch. A spool constituting the switching valve is displaced along with introduction of hydraulic pressure into the hydraulic chamber for the clutch. Further, based on displacement of the spool, hydraulic pressure introduced into the hydraulic chamber for the clutch of other clutch is reduced.

When constituted in this way, starting to operate to connect one clutch is firmly detected by a simple structure, in switching the low speed mode and high speed mode, an instance of transmitting power by the two clutches for low speed and high speed (the two clutches are connected) can firmly be produced and the torque shift brought about in the toroidal type continuously variable transmission in switching the mode can be alleviated.

Further, in embodying the invention as described above, preferably, a state of introducing hydraulic pressure into the hydraulic chamber for the low speed clutch is controlled by the switching valve for the low speed clutch having a spool for the low speed clutch displaced in accordance with introduction of hydraulic pressure into a pilot chamber for the low speed clutch. Further, a state of introducing hydraulic pressure into the hydraulic chamber for the high speed clutch is controlled by the switching valve for the high speed clutch having a spool for the high speed clutch displaced in accordance with introduction of hydraulic pressure into a pilot chamber for the high speed clutch. Further, a state of introducing hydraulic pressure into the hydraulic chamber for the low speed clutch and a state of introducing hydraulic pressure into the pilot chamber for the high speed clutch are controlled by a switching valve for shifting having a spool for switching displaced in accordance with introduction of hydraulic pressure into the pilot chamber for switching. Further, a state of introducing hydraulic pressure into the pilot chamber for switching is controlled by an electric switching valve for shifting. Further, the switching valve for the low speed clutch reduces hydraulic pressure introduced into the hydraulic chamber for the low speed clutch in accordance with introduction of hydraulic pressure into the pilot chamber for the low speed clutch and the hydraulic pressure introduced into the pilot chamber for the low speed clutch is made to constitute hydraulic pressure introduced into the hydraulic chamber for the high speed clutch. Further, the switching valve for the high speed clutch reduces hydraulic pressure introduced into the hydraulic chamber for the high speed clutch in accordance with introduction of hydraulic pressure into the pilot chamber for the high speed clutch and hydraulic pressure introduced into the pilot chamber for the high speed clutch is made to constitute hydraulic pressure introduced into the hydraulic chamber for the low speed clutch.

When constituted in this way, by only switching a single piece of an electromagnetic valve for shifting, thereafter, it is mechanically detected that operation of connecting one clutch is started based on switching of the switching valve of the hydraulic type (displacement of the spool in accordance with introduction of hydraulic pressure into the pilot chamber of the spool valve) and in switching the low speed mode and high speed mode, an instance of transmitting power by the two clutches for low speed and for high speed (two clutches are connected) can firmly be produced.

In embodying the invention, for example, there is used the switching valve for the high speed clutch having an elastic member for the high speed clutch on a side opposed to the pilot chamber for the high speed clutch in the axial direction by interposing the spool for the high speed clutch, wherein the spool for the high speed clutch is displaced against an elastic force of the elastic member for the high speed clutch in accordance with introduction of hydraulic pressure into the pilot chamber for the high speed clutch.

Further, there is used the switching valve for the low speed clutch having an elastic member for the low speed clutch on a side opposed to the pilot chamber for the low speed clutch in the axial direction by interposing the spool for the low speed clutch, wherein the spool for the low speed clutch is displaced against an elastic force of the elastic member for the low speed clutch in accordance with introduction of hydraulic pressure into the pilot chamber for the low speed clutch.

Further, in embodying the invention having the above-described constitution, preferably, the elastic force of the elastic member for the clutch for elastically pressing the spool for clutch, which is integrated to one of the switch valves for the low speed clutch and for the high speed clutch, opened in introducing the hydraulic pressure into the hydraulic chamber for the clutch, which belongs to the clutch (for high speed) that should not be connected in starting a vehicle, is set to be large in a running state and small in a non-running state.

Therefore, preferably, the elastic member for the clutch is constituted by a compression coil spring for the clutch. Further, the compression coil spring for the clutch is provided between the spool for the clutch and the pressing piston displaceably provided in the axial direction at inside of the cylinder provided at a position opposed to the pilot chamber for the clutch in the axial direction by interposing the spool for the clutch. Further, when the running state is selected, the pressing piston is displaced to the side of the spool for the clutch by the hydraulic pressure introduced into the cylinder portion to increase the elastic force of the compression coil spring for the clutch. In contrast thereto, when the hydraulic pressure in the cylinder portion is excluded by selecting the non-running state, the pressing piston is displaced to a side of being remote from the spool for the clutch to reduce the elastic force for the compression coil spring for the clutch.

When constituted in this way, in switching the low speed mode and the high speed mode in the running state, the moment in which the both clutches of the low speed clutch and the high speed clutch are connected can firmly be produced and when the running state is selected from the non-running state, the clutch which should not be connected under the state can be prevented from being connected although the moment is a short period of time.

Further, in embodying the invention, preferably, there is provided a manual switching valve capable of switching a running mode (running state) and a nonrunning mode (nonrunning state) by a shift lever installed at a driver's seat. Further, not only with regard to an elastic force of an elastic member for a clutch of a clutch which is not to be connected in starting in the switch valves of the respective low speed and high speed clutches but also with regard to an elastic force of an elastic member for the clutch integrated to the switching valve for the clutch opened in introducing hydraulic pressure into the hydraulic pressure chamber for the clutch belonging to the clutch to be connected in starting, the elastic force is increased in a state of switching the manual switching valve to the running mode and reduced in a state of switching the manual switching valve to the nonrunning mode.

When constituted in this way, in running at high speed (although not preferable), a driver selects the nonrunning mode {neutral (N) range} for operational failure or running by inertia and thereafter returns the state to the running mode {drive (D) range} while staying in the high speed running state, the clutch (clutch for low speed) not to be connected under the state can be prevented from being connected although the time period is short.

In this case, preferably, a signal indicating a vehicle speed is inputted to a controller, the controller connects one clutch of the clutch for low speed and the clutch for high speed in accordance with the vehicle speed at a time point of switching from the nonrunning mode to the running mode, that is, the clutch for high speed in running at a high speed (for example, a case equal to or faster than 30 km/h) and the clutch for low speed in running at low speed (for example, a case of less than 30 km/h). The other clutch is made to stay in an unconnected state.

Further, in embodying the invention, preferably, there is used the switching valve for the clutch opened in introducing hydraulic pressure into the hydraulic chamber for the clutch belonging to the clutch not to be connected at least in starting having a reaction force chamber. The reaction chamber is integrated to a side opposed to the pilot chamber for the clutch constituting the switching valve for the clutch in the axial direction by interposing the spool for the clutch constituting the switching valve for the clutch. Further, hydraulic pressure in the reaction force chamber for pressing the spool for the clutch to a side of the pilot chamber for the clutch based on hydraulic pressure introduced to inside thereof is set to be large in the running state and small in the nonrunning state.

In this case, for example, hydraulic pressure outputted from a portion communicating with a delivery port of a pressurizing pump and controlled to a predetermined pressure by a pressure control valve of an electric type is introduced into the reaction force chamber.

Or, hydraulic pressure reduced by passing a pressure reducing valve after having been delivered from the delivery port of the pressurizing pump is introduced into the reaction force chamber by passing the pressure control valve of the electric type or an opening/closing valve.

Or, hydraulic pressure reduced by passing a pressure reducing valve after having been delivered from the delivery port of the pressurizing pump is introduced into the reaction force chamber by passing a valve of a hydraulic type switched based on the pressure in the hydraulic chamber for the clutch belonging to the clutch connected in the clutch for high speed and the clutch for low speed.

Also by constituting in this way, in switching the low speed mode and the high speed mode in running, the instance of connecting the two clutches of the clutch for the low speed and the clutch for the high speed can firmly be produced and when the running state is selected from the nonrunning state, the clutch which is not to be connected under the state can be prevented from being connected although a time period is short.

Further, in embodying the invention, preferably, there is provided a manual switching valve switched to the running mode (running state) and the non running mode (nonrunning state) by the shift lever installed at the driver's seat. Further, not only with regard to hydraulic pressure of the clutch which is not to be connected in starting in the switching valves of the respective low speed and high speed clutches, but also with regard to hydraulic pressure in the reaction force chamber of the switching valve for the clutch opened in introducing hydraulic pressure into the hydraulic chamber for the clutch belonging to the clutch to be connected in starting, the hydraulic pressure is increased in the state of switching the manual switching valve to the running mode and reduced in the state of switching the manual switching valve to the nonrunning state.

When constituted in this way, in running at high speed, when the driver selects the nonrunning state and thereafter returns the state to the running state while staying in the high speed running state, the clutch (clutch for low speed) which is not to be connected under the state can be prevented from being connected although the time period is short.

Also in this case, preferably, a signal indicating the vehicle speed is inputted to the controller, one clutch of the clutch for low speed and the clutch for high speed is connected in accordance with a vehicle speed at a time point of switching from the nonrunning mode to the running mode and other clutch is made to stay in the unconnected state.

Further, in embodying the invention, for example, there is used the switching valve for the high speed clutch having the reaction force chamber for the high speed clutch on the side opposed to the pilot chamber for the high speed clutch in the axial direction by interposing the spool for the high speed clutch, wherein the spool for the high speed clutch is displaced against hydraulic pressure introduced into the reaction chamber for the high speed clutch in accordance with introduction of hydraulic pressure into the pilot chamber for the high speed clutch.

Further, there is used the switching valve for the low speed clutch having the reaction chamber for the low speed clutch on the side opposed to the pilot chamber for the low speed clutch in the axial direction by interposing the spool for the low speed clutch, wherein the spool for the low speed clutch is displaced against hydraulic pressure introduced into the reaction force chamber for the low speed clutch in accordance with introduction of hydraulic pressure into the pilot chamber for the low speed clutch.

Further, in embodying the invention, preferably, a pressure receiving area on a side of the pilot chamber for the high speed clutch is made to be wider than a pressure receiving area on a side of the reaction force chamber for the high speed clutch in the spool for the high speed clutch and the same hydraulic pressure is made to be able to introduce into the pilot chamber for the high speed clutch and the reaction force chamber for the high speed clutch.

Further, a pressure receiving area on a side of the pilot chamber for the low speed clutch is made to be wider than a pressure receiving area on a side of the reaction chamber for the low speed clutch in the spool for the low speed clutch and the same hydraulic pressure is made to be able to introduce into the pilot chamber for the low speed clutch and the reaction force chamber for the high speed clutch.

When constituted in this way, regardless of a variation in hydraulic pressure, the switching valve for the high speed clutch and the switching valve for the low speed clutch can firmly be switched.

In embodying the invention, for example, hydraulic pressures introduced into the pilot chamber for the high speed clutch, the reaction force chamber for the high speed clutch, the pilot chamber for the low speed clutch and the reaction force chamber for the low speed clutch are made to be hydraulic pressures introduced into the two hydraulic chambers for the high speed clutch and the low speed clutch.

Further, preferably, a ratio of the pressure receiving area on the side of the reaction force chamber for the high speed clutch to the pressure receiving area on the side of the pilot chamber for the high speed clutch as well as a ratio of the pressure receiving area on the side of the reaction force chamber for the low speed clutch and the pressure receiving area on the side of the pilot chamber for the low speed clutch are both set to be equal to or larger than 0.4 and less than 1.

Further, preferably, there is provided a rattle preventing spring for the high speed clutch for pressing the spool for the high speed clutch to the side of the pilot chamber for the high speed clutch in the reaction force chamber for the high speed clutch. Further, there is provided a rattle preventing spring for the low speed clutch for pressing the spool for the low speed clutch to the side of the pilot chamber for the low speed clutch in the reaction force chamber for the low speed clutch.

Further, in embodying the invention, preferably, the switching valve for the low speed clutch reduces hydraulic pressure introduced into the hydraulic chamber for the low speed clutch in accordance with introduction of hydraulic pressure into the pilot chamber for the low speed clutch and constitutes hydraulic pressure introduced into the pilot chamber for the low speed clutch to be hydraulic pressure introduced into the hydraulic chamber for the high speed clutch. Further, the switching valve for the high speed clutch reduces hydraulic pressure introduced into the hydraulic chamber for the high speed clutch in accordance with introduction of hydraulic pressure into the pilot chamber for the high speed clutch and constitutes hydraulic pressure introduced into the pilot chamber for the high speed clutch to be hydraulic pressure introduced into the hydraulic chamber for the low speed clutch.

When constituted in this way, by switching a single piece of the electric switching valve for shifting, thereafter, based on a delay time period of switching the valve of the hydraulic type, a time period of simultaneously transmitting the power by the two clutches can be produced for a short period of time. Therefore, a structure facilitating control and difficult to be failed can be realized at low cost.

Further, in embodying the invention, preferably, there is provided first resisting means constituting a resistance against passing pressurized oil and retarding pressure rise in the pilot chamber for the low speed clutch in comparison with pressure rise in the hydraulic chamber for the high speed clutch in the midst of a first pressure introducing path for introducing hydraulic pressure introduced into the hydraulic chamber for the high speed clutch into the pilot chamber for the low speed clutch. Further, there is provided second resisting means for constituting a resistance against passing pressurized oil and retarding pressure rise in the pilot chamber for the high speed clutch in comparison with pressure rise in the hydraulic chamber for the low speed clutch in the midst of a second hydraulic pressure introducing path for introducing hydraulic pressure introduced into the hydraulic chamber for the low speed clutch into the hydraulic chamber for the high speed clutch.

When constituted in this way, a delay time period of switching the valve of the hydraulic type is ensured and the time period of simultaneously transmitting the power by the two clutches for low speed and high speed can firmly be produced.

Further, in the case of embodying the invention having the above-described constitution, preferably, at a middle of the hydraulic pressure discharging path on the side of the low speed clutch, there is provided a throat on the side of the low speed clutch constituting a resistance against flow of the pressurized oil passing the hydraulic pressure discharge path on the side of the low speed clutch. Further, at a middle of the hydraulic pressure discharge path on the side of the high speed clutch, there is provided a throat on the side of the high speed clutch constituting a resistance against flow of the pressurized oil passing the hydraulic pressure discharging path on the side of the high speed clutch.

When constituted in this way, the time period required for switching the two clutches from the connected state to the non-connected state can be increased and a short time period of the time period of simultaneously transmitting the power by the both clutches can be produced by a simple structure.

Further, in the case of embodying the invention having the above-described constitution, further preferably, a single hydraulic pressure discharge path is constituted by merging a downstream portion of the hydraulic pressure discharge path on the side of the low speed clutch and a downstream portion of the hydraulic pressure discharge path on the side of the high speed clutch. Further, a single throat provided at a portion of the single hydraulic pressure discharge path is provided with both of a function as the throat on the side of the low speed clutch and a function as the throat on the side of the high speed clutch.

When constituted in this way, the constitution for producing a short time period of the time period of simultaneously transmitting the power by the both clutches can further be simplified by prolonging the time period required for switching the both clutches from the connected state to the non-connected state.

Further, in the case of embodying the invention, preferably, at a portion constituting the single low pressure side hydraulic path by merging the pressure introducing path on the side of the low speed clutch and the pressure discharging path on the side of the low speed clutch at a vicinity of the hydraulic chamber for the low speed clutch, there are provided a check valve on the side of the low speed clutch opened in introducing the hydraulic pressure into the hydraulic chamber for the low speed clutch and closed in discharging the hydraulic pressure from inside of the hydraulic chamber for the low speed clutch and a throat on the side of the low speed clutch in parallel with each other. Further, at a portion of constituting the single high pressure side hydraulic pressure path by merging the pressure introducing path on the side of the high speed clutch and the pressure discharging path on the side of the high speed clutch at a vicinity of the hydraulic chamber for the high speed clutch, there are provided a check valve on the side of the high speed clutch opened in introducing the hydraulic pressure into the hydraulic chamber for the high speed clutch and closed in discharging the hydraulic pressure from inside of the hydraulic chamber for the high speed clutch and the throat on the side of the high speed clutch in parallel with each other.

Even by constituting in this way, a short time period of the time period of simultaneously transmitting the power by the both clutches can be produced by prolonging the time period required for switching the both clutches from the connected state to the non-connected state by a simple structure.

Further, in the case of embodying the invention, preferably, at a middle of the hydraulic pressure discharging path on the side of the low speed clutch, there is provided an electric valve on the side of the speed clutch of an electromagnetic valve or the like for cutting flow of the pressurized oil passing the hydraulic pressure discharging path on the side of the low speed clutch by a desired time period. Further, at a middle of the hydraulic pressure discharging path on the side of the high pressure clutch, there is provided an electric valve on the side of the high speed clutch of an electric magnetic valve or the like for cutting flow of the pressurized oil passing the hydraulic pressure discharging path on the side of the high speed clutch by a desired time period.

Even by constituting in this way, the short time period of the time period of simultaneously transmitting the power by the both clutches can be produced by prolonging the time period required for switching the both clutches from the connected state to the non-connected state by a simple structure.

In the case of embodying the invention having such a constitution, preferably, a single hydraulic pressure discharging path is constituted by merging a downstream portion of the hydraulic pressure discharging path on the side of the low speed clutch and a downstream portion of the hydraulic pressure discharging path on the side of the high speed clutch. Further, a single electric valve of an electric magnetic valve or the like provided at a portion of the single hydraulic pressure discharging path is provided with both of a function as an electric valve on the side of the low speed clutch and an electric valve on the side of the high speed clutch.

When constituted in this way, the constitution for producing the short time period of the time period of simultaneously transmitting the power by the both clutches can further be simplified by prolonging the time period required for switching the both clutches from the connected to the non-connected state.

Further, in the case of embodying the invention, preferably, the invention is used as a transmission for a vehicle and a time period in which an electric valve of an electromagnetic valve or the like cuts flow of the pressurized oil passing the hydraulic pressure discharging path can be controlled in accordance with a situation of running the vehicle.

In this case, as the situation of running the vehicle utilized for controlling to open and close the electric valve, there are conceivable one kind or two or more kinds selected from a vehicle speed, an accelerator opening degree, an acceleration degree, a deceleration degree, the torque passing the toroidal-type continuously variable transmission and the like.

When the time period of cutting of the pressurized oil passing the hydraulic pressure discharging path by the electric valve is controlled in accordance with the situation of running the vehicle, the impact produced in changing the speed can further be alleviated by further finely connecting and disconnecting the both clutches.

Further preferably, there is provided a shifting manual switch valve achieving a function the same as that of the shifting electric switch valve manually in parallel with the shifting electric switch valve and there is provided a selecting manual switch valve for selecting either of the shifting electric switch valve and the shifting manual switch valve.

When constituted in this way, in failing the shifting electric switch valve, it is also possible to ensure a minimum running function which is needed in bringing the vehicle to a repair shop by running the vehicle by itself by enabling to change the low speed mode and the high speed mode manually.

Embodiment 1

Figure 29:
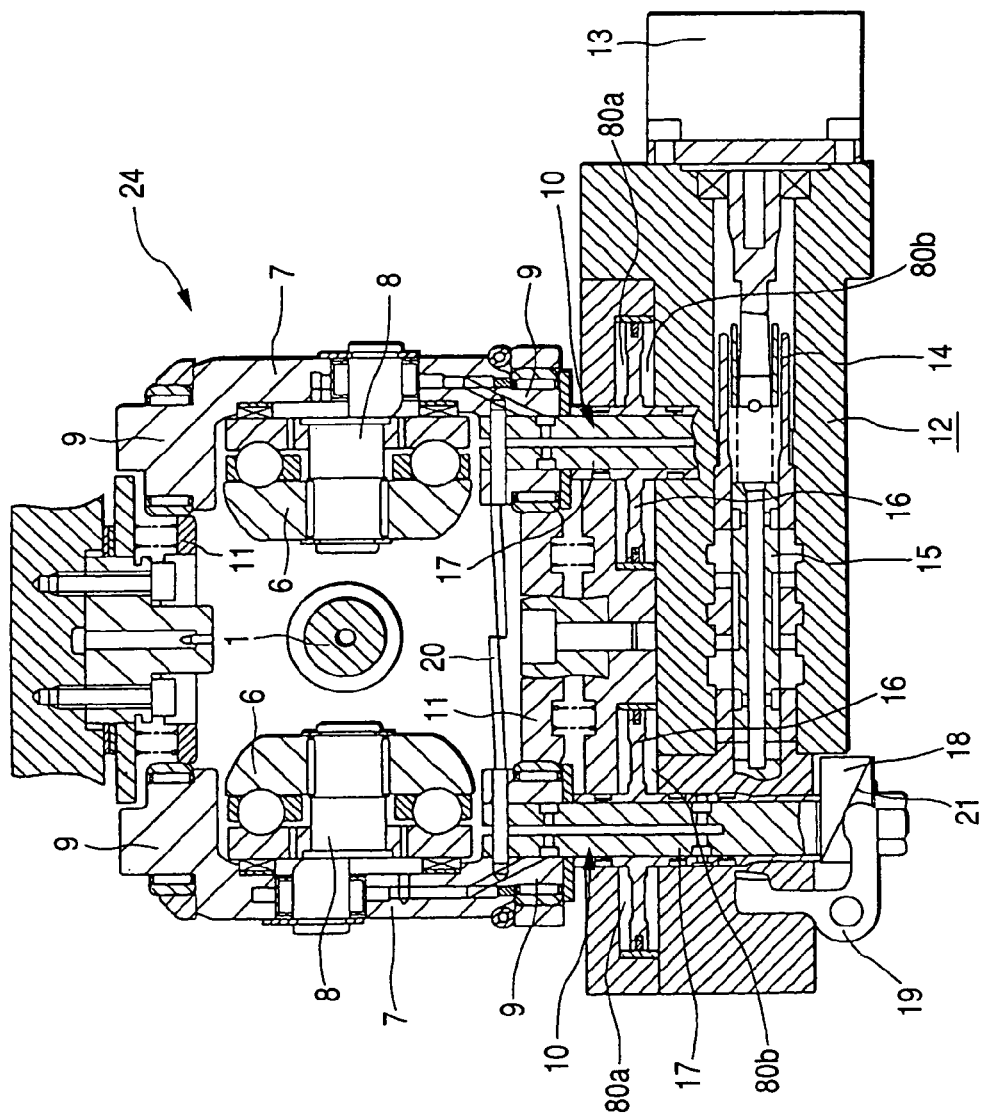
FIG. 29 is a sectional view taken along a line E-E of FIG. 16.

FIGS. 1 through 6 show Embodiment 1 of the invention. The embodiment shows a case of applying the invention to a continuously variable transmission apparatus of a geared neutral type. Further, in addition to a function of restraining an abrupt variation in a transmission ratio based on a torque shift in switching modes, there is effectively carried out a control of controlling a torque applied to an output shaft to a desired value when a transmission ratio of a total of the continuously variable transmission apparatus is extremely increased in order to stop the output shaft while rotating an input shaft. Further, although the continuously variable transmission apparatus shown in FIG. 1 is provided with a function similar to that of the above-described continuously variable transmission apparatus known in the prior art shown in FIG. 29, performance of integrating a portion of the planetary gear type transmission 25b is promoted by devising a structure of the portion of the planetary gear type transmission 25b.

Respective pairs of planetary gear elements 52a, 52b, 53a, 53b are rotatably supported by both side faces of a carrier 26a rotated along with the input shaft 1 and the pair of input side disks 2, 2. Among the respective planetary gear elements 52a, 52b, 53a, 53b, the planetary gear elements 52a, 52b and 53a, 53b constituting the pairs are brought in mesh with each other, the planetary gear elements 52a, 53a on an inner diameter side are brought in mesh with a first and a second sun gear 55, 56 fixedly provided to a hollow rotating shaft 31a coupled to the output side disk 5a and a transmitting shaft 54 and planetary gear elements 52a, 53b on an outer diameter side are brought in mesh with a ring gear 34a, respectively. Further, the hollow rotating shaft 31 and the transmitting shaft 54 are supported to be able to rotate independently from each other and concentrically with input shaft 1.

Meanwhile, planetary gear elements 59a, 59b are rotatably supported by a second carrier 58 provided at a surrounding of a third sun gear 57 fixedly connected to other end portion (right end portion of FIG. 1) of the transmitting shaft 54. Further, the second carrier 58 is fixedly provided to a base end portion (left end portion of FIG. 1) of an output shaft 37b arranged concentrically with an input shaft 1. Further, the respective planetary gear elements 59a, 59b are brought in mesh with each other, the planetary gear element 59a on an inner diameter side is brought in mesh with the third sun gear 57 and the planetary gear element 59b on an outer diameter side is brought in mesh with a second ring gear 38a provided rotatably at a surrounding of the second carrier 58, respectively. Further, the ring gear 34a and the second carrier 58 are made to be engageable and disengageable to and from each other by a low speed clutch 39b and the second ring gear 38a and a fixed portion of a housing or the like are made to be engageable and disengageable to and from each other by a high speed clutch 40b.

In the case of the continuously variable transmission apparatus constituted in this way, in a state of connecting the low speed clutch 39b and disconnecting the high speed clutch 40b, power of the input shaft 1 is transmitted to the output shaft 37b via the ring gear 34a. Further, by changing a transmission ratio of the toroidal-type continuously variable transmission 24, a transmission ratio $e_{CVT}$ of a total of the continuously variable transmission apparatus, that is, a speed ratio between the input shaft 1 and the output shaft 37b is changed. A relationship between a transmission ratio $e_{CVU}$ of the toroidal-type continuously variable transmission 24 and the transmission ratio $e_{CVT}$ of the total of the continuously variable transmission at this occasion is represented by Equation (1) shown below when a ratio of a teeth number $m_{34}$ of the ring gear 34a to a teeth number $m_{55}$ of the first sun gear 55 is designated by notation $i_1$ ($=m_{34}/m_{55}$).

$$e_{CVT}=(e_{CVU}+i_1-1)/i_1 \quad (1)$$

Figure 2:
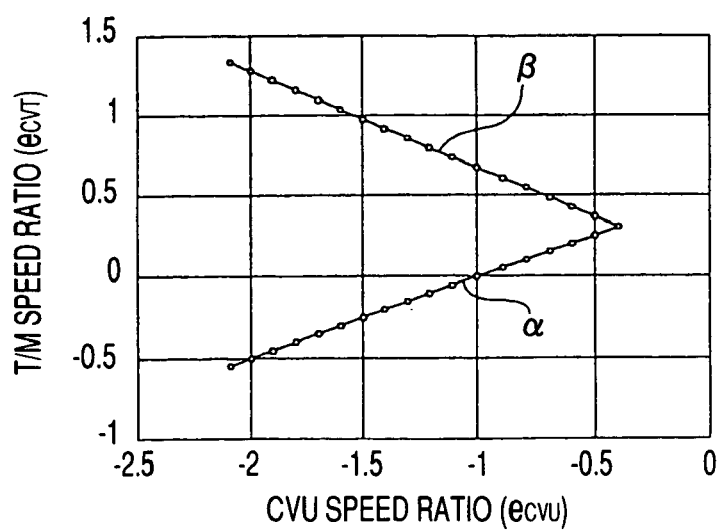
FIG. 2 is a diagram showing a relationship between a transmission ratio of a total of the continuously variable transmission apparatus (T/M) and a transmission ratio of a toroidal-type continuously variable transmission unit (CVU) integrated to the continuously variable transmission apparatus.

Further, when the ratio $i_1$ of the teeth numbers is, for example, 2, the relationship of the two transmission ratios $e_{CVU}$, $e_{CVT}$ is changed as shown by a line segment α of FIG. 2.

In contrast thereto, in a state of disconnecting the low speed clutch 39b and connecting the high speed clutch 40b, power of the input shaft 1 is transmitted to the output shaft 37b via the respective planetary gear elements 52a, 52b, the ring gear 34a, the respective planetary gear elements 53a, 53b, the transmitting shaft 54, the respective planetary gear elements 59a, 59b, and the second carrier 58. Further, by changing the transmission ratio $e_{CVU}$ of the toroidal-type continuously variable transmission 24, the transmission ratio $e_{CVT}$ of the total of the continuously variable transmission apparatus is changed. A relationship between the transmission ratio $e_{CVU}$ of the toroidal-type continuously variable transmission 24 and the transmission ratio $e_{CVT}$ of the total of the continuously variable transmission apparatus at this occasion is as represented by Equation (2) shown below. Further, in Equation (2), notation $i_1$ designates the ratio ($m_{34}/m_{55}$) of the teeth number $m_{34}$ of the ring gear 34a to the teeth number $m_{55}$ of the first sun gear 55, notation $i_2$ designates a ratio ($m_{34}/m_{56}$) of the teeth number $m_{34}$ of the ring gear 34a to the teeth number $m_{56}$ of the second sun gear 56, and notation $i_3$ designates a ratio ($m_{38}/m_{57}$) of a teeth number $m_{38}$ of the second ring gear 38a to the teeth number $m_{57}$ of the third sun gear 57, respectively.

$$e_{CVT}=\{1/(1-i_3)\}\cdot\{1+(i_2/i_1)(e_{CVU}-1)\} \quad (2)$$

Further, a relationship between the two transmission ratios $e_{CVU}$, $e_{CVT}$ when $i_1=2$, $i_2=2.2$ and $i_3=2.8$ in the respective ratios is changed as shown by a line segment β of FIG. 2.

In operating the continuously variable transmission apparatus constituted and operated as described above, at a portion of connecting the line segments α, β shown in FIG. 2, the low speed mode and the high speed mode are switched based on connection and disconnection of the low speed clutch 39b and the high speed clutch 40b. Further, based on the switching, as described above, a direction and a magnitude of the torque passing the toroidal-type continuously variable transmission 24 are changed. Hence, by a hydraulic circuit as shown by FIG. 3, in changing the modes, a time period of connecting both clutches of the low speed clutch 39e and the high speed clutch 40b is set by a short time period.

For that purpose, in the case of the embodiment, there is used the low speed clutch 39a of a wet multiplate type connected by introducing a hydraulic pressure into a hydraulic chamber 60 for the low speed clutch. Further, there is used the high speed clutch 40b of a wet multiplate type connected by introducing a hydraulic pressure into a hydraulic chamber 61 for the high speed clutch. Further, a hydraulic pressure based on a pressurized oil sucked from an oil storage 62 (oil pan provided at a bottom portion of the continuously variable transmission apparatus), delivered from a pressurizing pump 63 and controlled to a predetermined pressure by a pressure reducing valve 65 to a predetermined pressure after passing a manual switch valve 64 is introduced to either or both of the hydraulic chamber 60 for the low speed clutch and the hydraulic chamber 61 for the high speed clutch.

First, a state of introducing the hydraulic pressure into the hydraulic chamber 60 for the low speed clutch is switched by a switch vale 66 for the low speed clutch. The switch valve 66 for the low speed clutch communicates the hydraulic chamber 60 for the low speed clutch to either of the oil storage 62 and a delivery port of the pressure reducing valve 65 in accordance with a displacement in an axial direction of a spool 67 for the low speed clutch. Further, in order to displace the spool 67 for the low speed clutch in the axial direction, one end (right end of FIG. 3) in the axial direction of the spool 67 for the low speed clutch is provided with a compression coil spring 68 for the low speed clutch constituting an elastic member for the low speed clutch and other end (left end of FIG. 3) in the axial direction is provided with a pilot chamber 69 for the low speed clutch, respectively.

Figure 3:
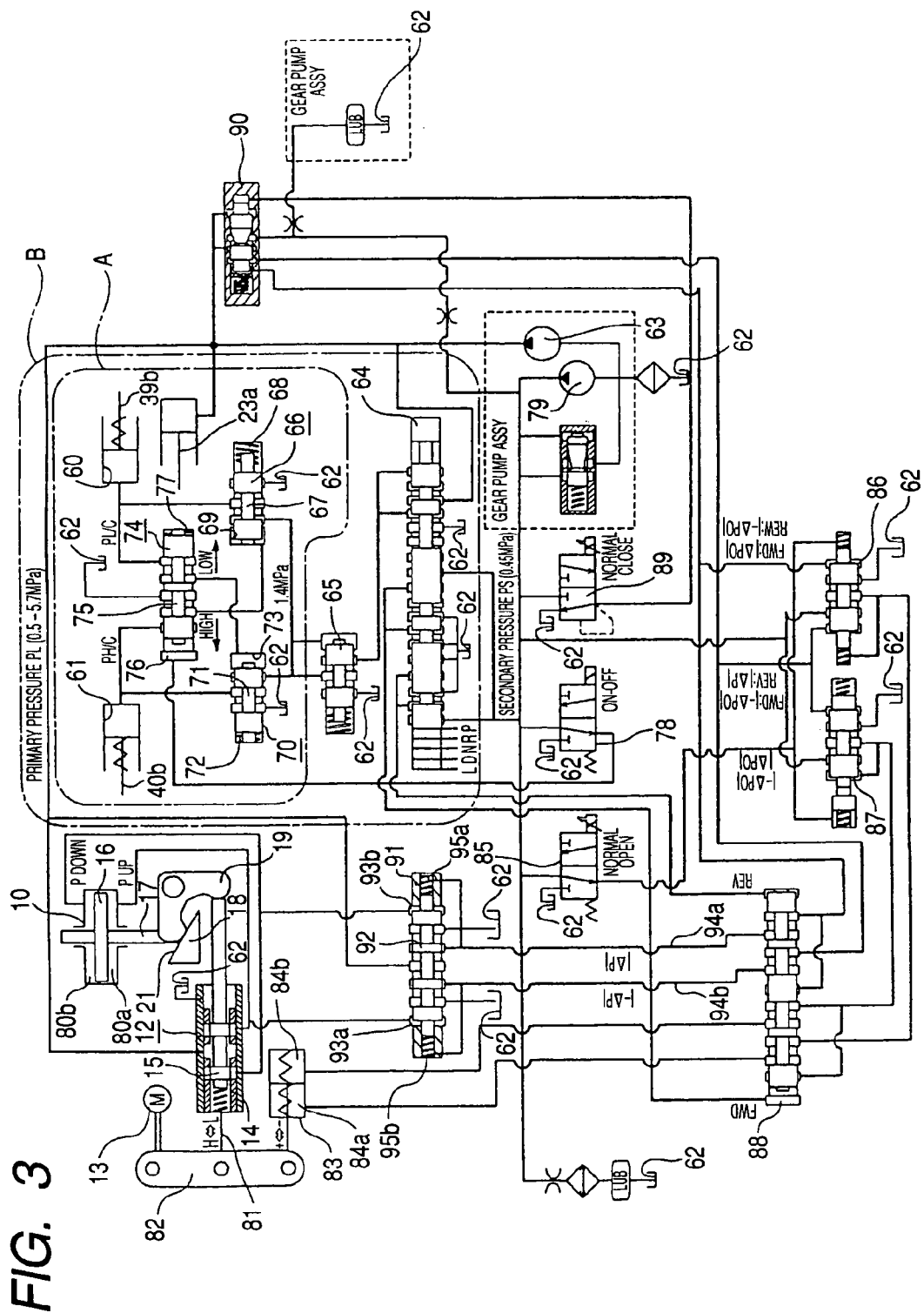
FIG. 3 is a hydraulic circuit diagram for controlling a transmission ratio shown in Embodiment 1 of the invention.

According to the switch valve 66 for the low speed clutch, in a state of stopping to introduce the hydraulic pressure into the pilot chamber 69 for the low speed clutch (open to the oil storage 62), the spool 67 for the low speed clutch is displaced to a state shown in FIG. 3 base on an elastic force of the compression coil spring 68 for the low speed clutch to introduce the hydraulic pressure into the hydraulic chamber 60 for the low speed clutch. Under the state, the low speed clutch 39b is brought into a connected state. In contrast thereto, in a state of introducing the hydraulic pressure into the pilot chamber 69 for the low speed clutch, the spool 67 for the low speed clutch is displaced to a side reverse to that of the state shown in FIG. 3 against the elastic force of the compression coil spring 68 for the low speed clutch to communicate the hydraulic chamber 60 for the low speed clutch to the oil storage 62. Under the state, the low speed clutch 39b is brought into a non-connected state.

Further, a state of introducing the hydraulic pressure into the hydraulic chamber 61 for the high speed clutch is switched by a switch valve 70 for the high speed clutch. The switch valve 70 for the high speed clutch communicates the hydraulic chamber 61 for the high speed clutch to either of the delivery port of the pressure reducing valve 65 and the oil storage 62 in accordance with a displacement in an axial direction of a spool 71 for the high speed clutch. Further, in order to displace the spool 71 for the high speed clutch in the axial direction, a side of one end (left end of FIG. 3) in the axial direction of the spool 71 for the high speed clutch is provided with a compression coil spring 72 for the high speed clutch constituting an elastic member for the high speed clutch and a side of other end (right end of FIG. 3) in the axial direction is provided with a pilot chamber 73 for the high speed clutch, respectively.

According to the switch valve 70 for the high-speed clutch, in a state of stopping to introduce the hydraulic pressure into the pilot chamber 73 of the high speed clutch, the spool 71 for the high speed clutch is displaced to a side reverse to a state shown in FIG. 3 based on an elastic force of the compression coil spring 72 for the high speed clutch to introduce the hydraulic pressure into the hydraulic chamber 61 for the high speed clutch. Under the state, the high speed clutch 40b is brought into a connected state. In contrast thereto, in a state of introducing the hydraulic pressure into the pilot chamber 73 for the high speed clutch, the spool 71 for the high speed clutch is displaced in the state shown in FIG. 3 against the elastic force of the compression coil spring 72 for the high speed clutch to communicate the hydraulic chamber 61 for the high speed clutch to the oil storage 62. Under the state, the high speed clutch 40b is brought into a non-connected state.

Further, a state of introducing the hydraulic pressure to the pilot chamber 60 for the low speed clutch of the switch valve 66 for the low speed clutch and the pilot chamber 73 for the high speed clutch of the switch valve 70 for the high speed clutch is controlled by a shifting switch valve 74. The shifting switch valve 74 introduces the hydraulic pressure to either one of the pilot chamber 69 for the low speed clutch and the pilot chamber 73 for the high speed clutch and simultaneously communicates other thereof to the oil storage 62 in accordance with displacement in an axial direction of a switching spool 75. In order to displace the switching spool 75 in the axial direction, a side of one end (left end of FIG. 3) of the switching spool 75 is provided with a switching pilot chamber 76 and other end side thereof is provided with a switching compression coil spring 77 constituting a switching elastic member, respectively. The shifting switch valve 74 is switched to a state shown in FIG. 3 when the pressurized oil is introduced into the switching pilot chamber 76 to communicate the pilot chamber 69 for the low speed clutch to the oil storage 62 to simultaneously introduces the hydraulic pressure delivered from the switch valve 66 for the low speed clutch to the hydraulic chamber 60 for the low speed clutch to the pilot chamber 73 for the high speed clutch. In contrast thereto, in a state in which the pressurized oil is not introduced to the switching pilot chamber 76 (in which the switching pilot chamber 76 is communicated with the oil storage 62), the state is switched to a side reverse to the state shown in FIG. 3, the pilot chamber 73 for the high speed clutch is communicated to the oil storage 62 and simultaneously, the hydraulic pressure delivered from the switch valve 70 for the high speed clutch to the hydraulic chamber 61 for the high speed clutch is introduced to the hydraulic chamber 69 for the low speed clutch.

Further, a state of introducing the hydraulic pressure to the switching pilot chamber 76 is controlled by an electromagnetic switch valve 78 constituting a shifting electric switch valve. The electromagnetic switch valve 78 is switched to a state of communicating the switching pilot chamber 76 to a delivery port of the second pressurizing pump 79 and a state of communicating to the oil storage 62 by displacing the spool based on electricity conduction to a solenoid. That is, the electromagnetic switch valve 78 displaces the spool to a state shown in FIG. 3 based on an elastic force of the spring to introduce a hydraulic pressure based on a pressurized oil delivered from the delivery port of the second pressurizing pump 79 to the switching pilot chamber 76 when electricity is not conducted to the solenoid. In contrast thereto, when electricity is conducted to the solenoid, the spool is displaced to a side reverse to the state shown in FIG. 3 against the elastic force of the spring to communicate the switching pilot chamber 76 to the oil storage 62.

In the case of the embodiment, the torque shift brought about at the toroidal-type continuously variable transmission 24 is alleviated in switching the modes by producing a moment of connecting both clutches of the low speed clutch 39b and the high speed clutch 40b in switching the low speed mode and the high speed mode by the above-described hydraulic circuit. An explanation will be given as follows of the reason of capable of alleviating the torque shift while explaining operation of shifting from the low speed mode to the high speed mode in reference to FIG. 4 and FIG. 5 in addition to FIG. 3.

Figure 4:
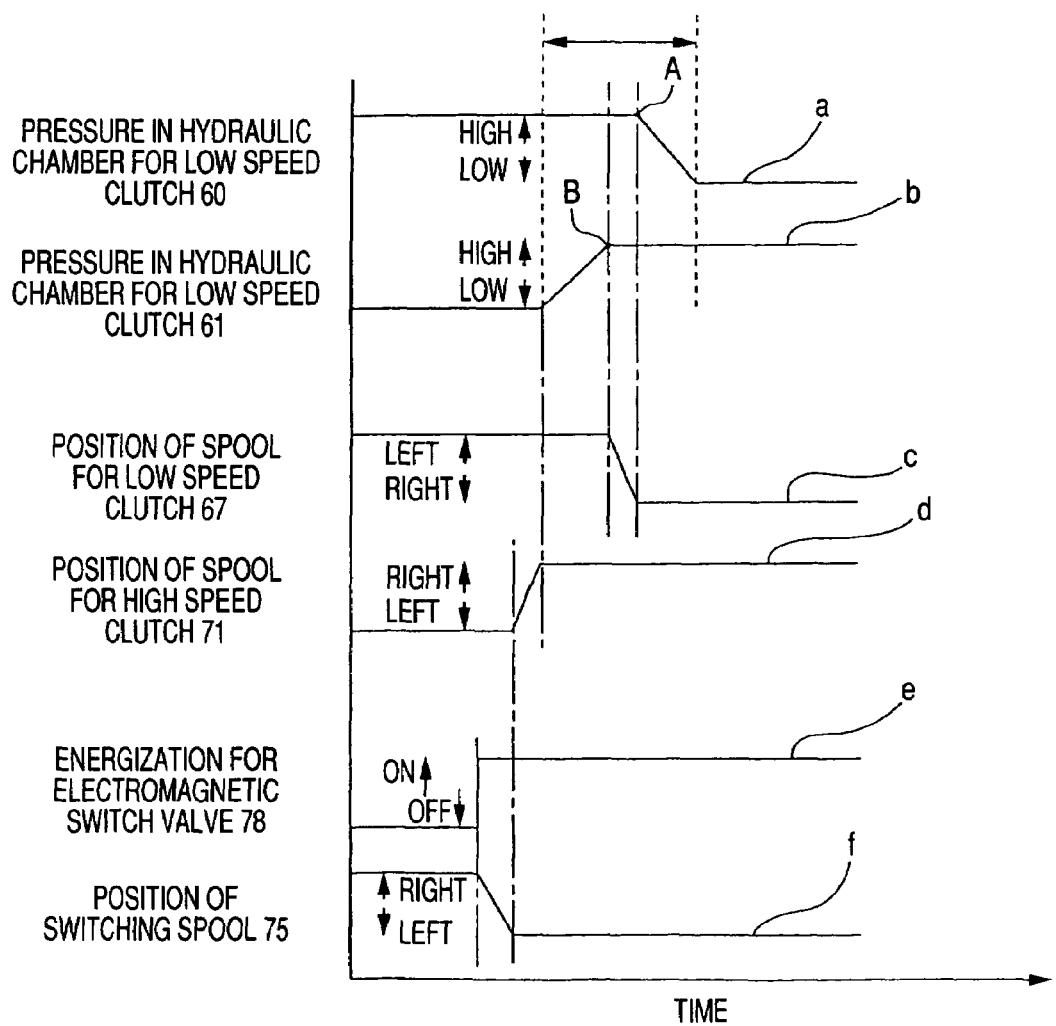
FIG. 4 is a diagram showing a state of operating respective portions in switching modes.
Figure 5A:
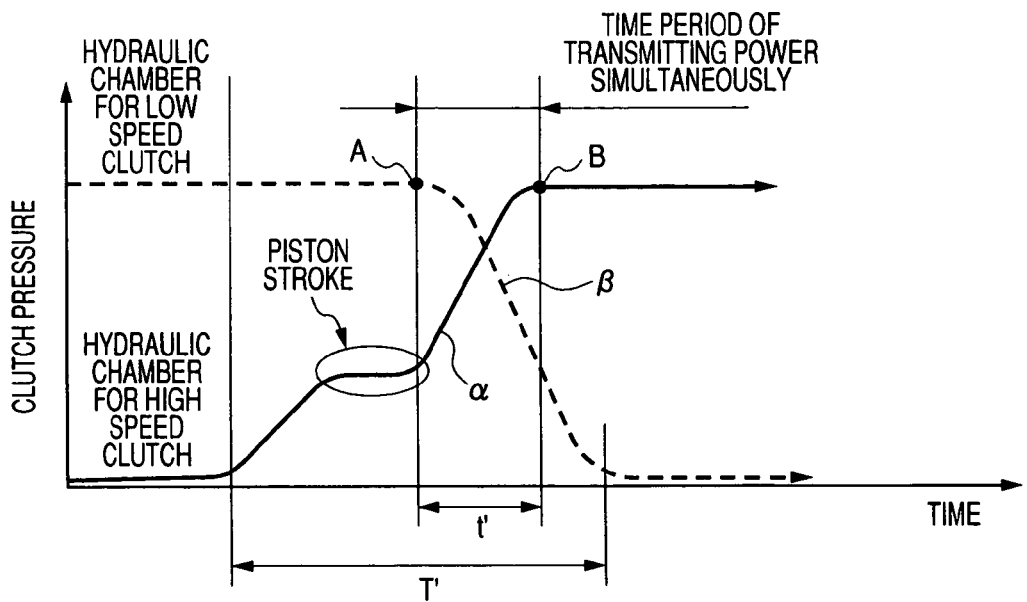
FIGS. 5A and 5B are diagrams showing two examples of changes of the hydraulic pressure in both of the chamber for a low speed clutch and the chamber for a high speed clutch.
Figure 5B:
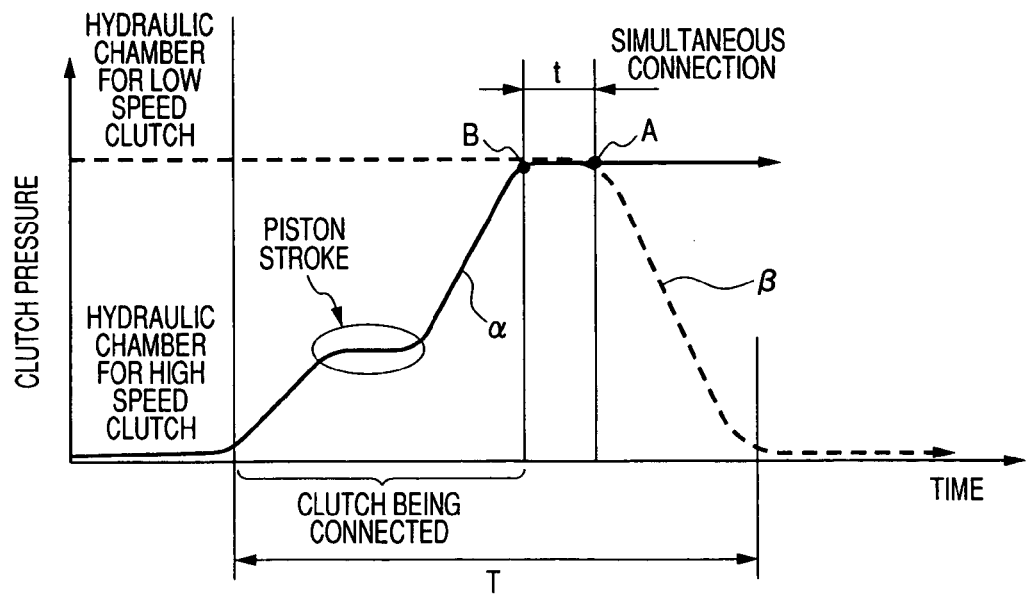

In the low speed mode, as shown by left end portions of bold lines a, b of FIG. 4 and a bold line α and a dashed line β in FIG. 5B, the hydraulic pressure in the hydraulic chamber for the low speed clutch is high and the hydraulic pressure in the hydraulic chamber 61 for the high speed clutch is low. Under the state, the spool 67 for the low speed clutch constituting the switch valve 66 for the low speed clutch is present on the left side of FIG. 3 as shown by a left end portion of a bold line c of FIG. 4 and the spool 71 for the high speed clutch constituting the switch valve 70 for the high speed clutch is present on the left side of FIG. 3 as shown by a left end portion of the bold line d of FIG. 4, respectively. Further, electricity conduction to the electromagnetic switch valve 78 is stopped (OFF) as shown by a left end portion of a bold line e of FIG. 4 and the switching spool 75 constituting the shifting switch valve 74 is present on the light side of the FIG. 3 as shown by a left end portion of a bold line f of FIG. 4.

When a speed of running a vehicle mounted with a continuously variable transmission apparatus is increased, a controller, not illustrated, determines to shift from the low speed mode to the high speed mode and starts conducting electricity to the electromagnetic switch valve 78 as shown by a middle portion of the bold line e of FIG. 4. As a result, the spool of the electromagnetic switch valve 78 is displaced, the switching pilot chamber 76 of the shifting switch valve 74 communicates with the oil storage 62, and the switching spool 75 constituting the shifting switch valve 74 is displaced from right to left of FIG. 3 as shown by a middle portion of the bold line f. Further, prior to starting to conduct electricity to the electromagnetic switch valve 78, the controller substantially nullifies (stops) a rotating speed of the second ring gear 38a by controlling the transmission ratio of the toroidal-type continuously variable transmission 24.

As a result of the displacement of the switching spool 75 from the right side to the left side in FIG. 3, the pilot chamber 73 for the high speed clutch of the switch valve 70 for the high speed clutch is released to the oil storage 62, the spool 71 for the high speed clutch is pressed by the compression coil spring 72 for the high speed clutch and displaced to the right side of FIG. 3 as shown by a middle portion of the bold line d of FIG. 4. Further, the hydraulic pressure is introduced into the hydraulic chamber 61 for the high speed clutch via the switch valve 70 for the high speed clutch. The hydraulic pressure in the hydraulic chamber 61 for the high speed clutch is increased while narrowing clearances present among a plurality of sheets of clutch plates constituting the high speed clutch 40b and therefore, a time period to some degree is required in increasing the hydraulic pressure in the hydraulic chamber 61 for the high speed clutch as shown by middle portions of the bold line b of FIG. 4 and the bold line a in FIG. 5B. Further, switching of the switch valve 66 for the low speed clutch based on introduction of the hydraulic pressure the same as that of the hydraulic chamber 61 for the high speed clutch is retarded.

That is, during some period of time after starting to introduce the hydraulic pressure into the hydraulic chamber 61 for the high speed clutch, energy of the hydraulic pressure is consumed for displacing the piston for narrowing the clearances among the respective clutch plates and sufficient energy is not supplied to the pilot chamber 69 for the low speed clutch of the switch valve 66 for the low speed clutch. The spool 67 for the low speed clutch constituting the switch valve 66 for the low speed clutch starts displacing to the right of FIG. 3 after the hydraulic pressure in the pilot chamber 69 for the low speed clutch is increased more than being compatible with the elastic force of the compression coil spring 68 for the low speed clutch. Therefore, the spool 67 for the low speed clutch is displaced to the right side of FIG. 3 after the hydraulic pressure in the hydraulic chamber 61 for the high speed clutch is sufficiently increased as shown by a middle portion of the bold line c of FIG. 4. Further, the hydraulic pressure in the hydraulic chamber 60 for the low speed clutch starts to be reduced after the spool 67 for the low speed clutch is sufficiently displaced to the right side of FIG. 3 as shown by middle portions of the bold line a of FIG. 4 and the bold line α in FIG. 5B and the low speed clutch 39b is disconnected in a state in which the hydraulic pressure in the hydraulic chamber 60 for the low speed clutch is sufficiently reduced.

As is apparent by comparing point A at which the bold line a of FIG. 4 and the dashed line β in FIG. 5B representing the oil pressure in the hydraulic chamber 60 for the low speed clutch starts to be reduced and the low speed clutch 39b starts to be disconnected and point B at which the bold line b of FIG. 4 and the bold line α in FIG. 5B representing the hydraulic pressure in the hydraulic chamber 61 of the high speed clutch finishes to increase and the high speed clutch 40b finishes to be connected, in the case of the embodiment, a moment in which the driving power is transmitted by the two clutches 39b, 40b simultaneously (a moment of connecting the two clutches 39b, 40b simultaneously) is present although the moment is the short period of time. Therefore, the torque shift produced at the toroidal-type continuously variable transmission 24 in switching the modes can be alleviated.

That is, in the state of simultaneously connecting the two clutches 39b, 40b, there is constituted a state in which all of the power inputted to the input shaft 1 is transmitted by the planetary gear type transmission 25b and a torque (passing torque) passing the toroidal-type continuously variable transmission 24 is substantially nullified. Further, from the state of transmitting the torque from the output side disk 5a to the input side disks 2, 2 in the low speed mode heretofore, the mode is shifted to the high speed mode after temporarily nullifying the passing torque by connecting the two clutches 39b, 40b. In the high speed mode, a direction of transmitting the torque is reversed from that in the low speed mode and the torque is transmitted from the input side disks 2, 2 to the output side disk 5a.

In this way, in the case of the embodiment, the apparatus is operated for a short period of time by temporarily nullifying the torque passing the toroidal-type continuously variable transmission 24 when the mode is shifted from the low speed mode to the high speed mode and the direction of the torque passing the toroidal-type continuously variable transmission 24 is reversed. Further, there is recovered the state in which the transmission ratio of the toroidal-type continuously variable transmission 24 is not influenced by the passing torque (neutral state). The torque shift is produced dividedly in two stages between the low speed mode heretofore and the neutral state and between the neutral state and the new high speed mode. That is, in the respective stages, a variation in the transmission ratio to the toroidal-type continuously variable transmission 24 in accordance with a variation in the passing torque is produced and the slip rate of the traction portion is changed. The large torque shift is not abruptly produced between the low speed mode and the high-speed mode. As a result, a variation in the transmission ratio of the total of the continuously variable transmission apparatus based on the torque shift of the toroidal-type continuously variable transmission 24 is made to be gradual and the strange feeling given to the passenger starting from the driver can be alleviated. Further, durability of a constituent part of the driving system can be promoted by preventing the driving system from being applied with the impact. Also in shifting from the high speed mode to the low speed mode, the torque shift can similarly be alleviated except that the respective portions are reversely operated. Further, in this case, the controller stops conducting electricity to the electromagnetic switch valve 78 after making a rotating speed of the ring gear 34a and a rotating speed of the second carrier 58 substantially coincide with each other based on controlling the transmission ratio of the toroidal-type continuously variable transmission 24.

Further, in the case of the embodiment, the following effects of (1) through (3) are also achieved.

(1) A strange feeling can be prevented from being given to a driver by shortening a time period required for switching the mode. That is, in the case of a structure described in JP-A-9-210191, it is intended to simultaneously introduce hydraulic pressure into the pressure chambers for the clutches of the two clutches for high speed and for low speed in switching the mode to finish to simultaneously connect the two clutches. Further, also in the case of the embodiment, the time period of finishing to simultaneously connect the two clutches in this way can also be ensured. In such a case, pressures in the pressure chambers for the clutches of the two clutches are changed as shown by a bold line α and a broken line β of FIG. 5(B) and a time period T required for connecting and disconnecting the two clutches for switching the mode is prolonged. In contrast thereto, in the case of the embodiment, by adjusting lengths and inner diameters of hydraulic pipes, the pressure receiving areas of the respective pilot chambers 69, 73 for the low speed clutch and for the high speed clutch, elastic constants of the respective compression coil springs 68, 72 for the low speed clutch and for the high speed clutch and the like, as shown by FIG. 5A, even when during a time period of finishing to disconnect connection of the clutch 39b for low speed, the clutch 39b for low speed and the clutch 40b for high speed are not completely connected simultaneously, an instance t' in which power is transmitted simultaneously by the two clutches 39b, 40b can be set. When such a setting is carried out, as shown by FIG. 5A, a time period T' required for connecting and disconnecting the two clutches 39b, 40b for switching the mode can be shortened.

(2) Further, as described above, it is not necessarily needed to simultaneously and completely connect the two clutches 39b, 40b in switching the mode and therefore, an increase in the efficiency of the total of the continuously variable transmission apparatus can be achieved by restraining an amount of pressurized oil necessary for switching the mode to be small and restraining an amount of working the pump for supplying the pressurized oil to be small.

(3) Further, in the case of the structure of the embodiment, when the controller switches only a single piece of the electromagnetic switch valve 78, thereafter, the time period of simultaneously transmitting the power by the two clutches can be produced for a short period of time based on delay time periods in switching the shifting switch valve 74, the switch valve 66 for the low speed clutch and the switch valve 70 for the high speed clutch all of which are hydraulic type valves. Further, it is not necessary to stop the spool of each valve while it is shifting. Therefore, a structure facilitated to control and difficult to fail can be realized at low cost. Further, a length of the time period of simultaneously transmitting the power by the low speed clutch 39b and the high speed clutch 40b based on the delay time periods can be controlled by the elastic forces of the two compression coil springs 68, 72 for the low speed clutch and the high speed clutch included in the two switch valves 66, 70 for the low speed clutch and the high speed clutch. Further, the length of the time period can also be controlled by providing throats at portions between the two switch valves 66, 70 for the low speed clutch and the high speed clutch and the shifting switch valve 74 (For example, a, b of FIG. 3) and pertinently restricting opening degrees of the throats.

Further, it is also possible to ensure a minimum running function which is needed in bringing the vehicle to a repair shop by running the vehicle by itself by enabling to change the low speed mode and the high speed mode manually in failing the electromagnetic switch valve 78 by providing a shifting manual switch valve achieving a function the same as that of the electromagnetic switch valve manually in parallel with the electromagnetic switch valve 78 although illustration thereof is omitted. In this case, at a branch portion of a parallel pipeline provided with the shifting manual switch valve and a main pipeline provided with the electromagnetic switch valve 78, there is provided a selecting manual switch valve of a three way valve or the like for manually switching the parallel pipeline and the main pipeline.

Further, the hydraulic circuit shown in FIG. 3 is provided with a function of strictly controlling the torque passing the toroidal-type continuously variable transmission 24 and a function of restraining power required for driving the respective pressurizing pumps 63, 79 to be low when the transmission ratio of the continuously variable transmission apparatus is at a maximum (near to infinity) in the state of the low speed mode. The reason of providing the function of strictly controlling the torque in the functions is as follows. That is, as is apparent from the line segment a of FIG. 2, the continuously variable transmission apparatus shown in FIG. 1 can produce a state of so-to-speak infinite transmission ratio for stopping the output shaft 37b in a state of rotating the input shaft 1. In the case of the continuously variable transmission apparatus, in the state in which the transmission ratio is infinite or near thereto, that is, the state in which the output shaft 37b is stopped while rotating the input shaft 1 or is rotated at a very low speed, the torque passing the toroidal-type continuously variable transmission 24 becomes larger than the torque applied from the engine constituting the drive source to the input shaft 1. Therefore, in stopping the vehicle or running the vehicle at very low speed, the torque inputted from a drive source to the input shaft 1 needs to restrict properly such that the torque passing the toroidal-type continuously variable transmission 24 does not become excessively large (more excessively small).

Further, in running at very low speed, in the state near to the state of stopping the output shaft 37b, that is, the state in which the transmission ratio of the continuously variable transmission apparatus is very large and the rotational speed of the output shaft 37b is much slower than the rotational speed of the input shaft 1, the torque applied to the output shaft 37b is considerably varied by a small variation in the transmission ratio of the continuously variable transmission apparatus. Therefore, in order to ensure smooth running operation, the torque inputted from the drive source to the input shaft 1 still needs to restrain properly.

Figure 6:
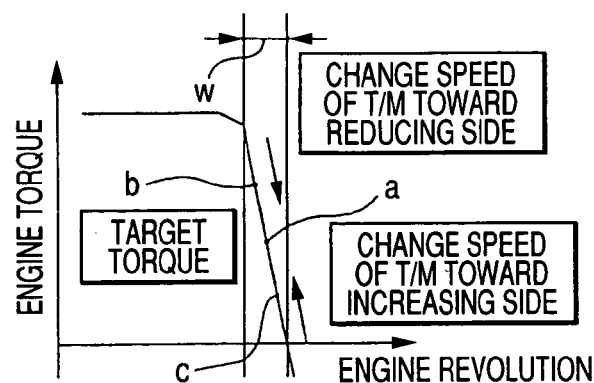
FIG. 6 is a diagram for explaining a state of changing the transmission ratio of the total of the continuously variable transmission apparatus in accordance with a rotational speed and a torque of an engine.

Therefore, according to the hydraulic circuit shown in FIG. 3, operation as shown by FIG. 6 is carried out in order to properly restrain the torque inputted from the drive source to the input shaft 1. In the operation, first, a rotating speed of an engine constituting the drive source is grossly controlled to restrain to point a within a range w of FIG. 6. Along therewith, there is set the transmission ratio of the toroidal-type continuously variable transmission 24, which is needed for making a rotational speed of the input shaft 1 of the continuously variable transmission apparatus coincide with a controlled rotational speed of the engine. The setting operation is carried out based on Equation (1), mentioned above. That is, in the state of the low speed mode, the transmission ratio of the toroidal-type continuously variable transmission 24 is set by Equation (1), mentioned above, in order to constitute the rotational speed of the input shaft 1 by a necessary value in correspondence with the rotational speed of the output shaft 37b.

Further, there is measured a pressure difference between the pair of hydraulic members 10a, 10b (refer to FIGS. 3, 18) constituting the hydraulic type actuators 10, 10 for displacing the trunnions 7, 7 integrated to the toroidal-type continuously variable transmission 24 in the axial direction of the pivoting shafts 9, 9 by a hydraulic pressure sensor, not illustrated. The operation of measuring the hydraulic pressure is carried out by grossly controlling the rotational speed of the engine (however, in a state of maintaining the rotational speed constant) and in a state of setting the transmission ratio of the toroidal-type continuously variable transmission 24 by Equation (1) in correspondence therewith, as described above. Further, the torque $T_{CVU}$ passing the toroidal-type continuously variable transmission 24 is calculated by the pressure reference calculated based on the measuring operation. That is, since the pressure difference is proportional to the torque $T_{CVU}$ passing the toroidal-type continuously variable transmission 24 so far as the transmission ratio of the toroidal-type continuously variable transmission 24 stays to be constant, the torque $T_{CVU}$ can be calculated by the pressure difference.

Meanwhile, the torque $T_{CVU}$ can also be calculated from Equation (3) shown below.

$$T_{CVU} = e_{CVU} T_{IN} / \{e_{CVU} + (i_1 - 1)\eta_{CVU}\} \quad (3)$$

In Equation (3), notation $e_{CVU}$ designates the transmission ratio of the toroidal-type continuously variable transmission 24, notation $T_{IN}$ designates the torque inputted from the engine to the input shaft 1, notation $i_1$ designates the ratio of the teeth number $m_{34}$ of the ring gear 34a to the teeth number $m_{55}$ of the first sun gear 55 and notation $\eta_{CVU}$ designates an efficiency of the toroidal-type continuously variable transmission 24, respectively.

Hence, based on a torque $T_{CVU1}$ actually passing the toroidal-type continuously variable transmission 24 and a passing torque $T_{CVU2}$ constituting a target calculated from Equation (3), a deviation $\Delta T$ ($T_{CVU1} - T_{CVU2}$) between the actually passing torque $T_{CVU1}$ and the target value $T_{CVU2}$. Further, the transmission ratio of the toroidal-type continuously variable transmission 24 is controlled in a direction of resolving the deviation $\Delta T$ (making $\Delta T$ is 0).

Figure 28:
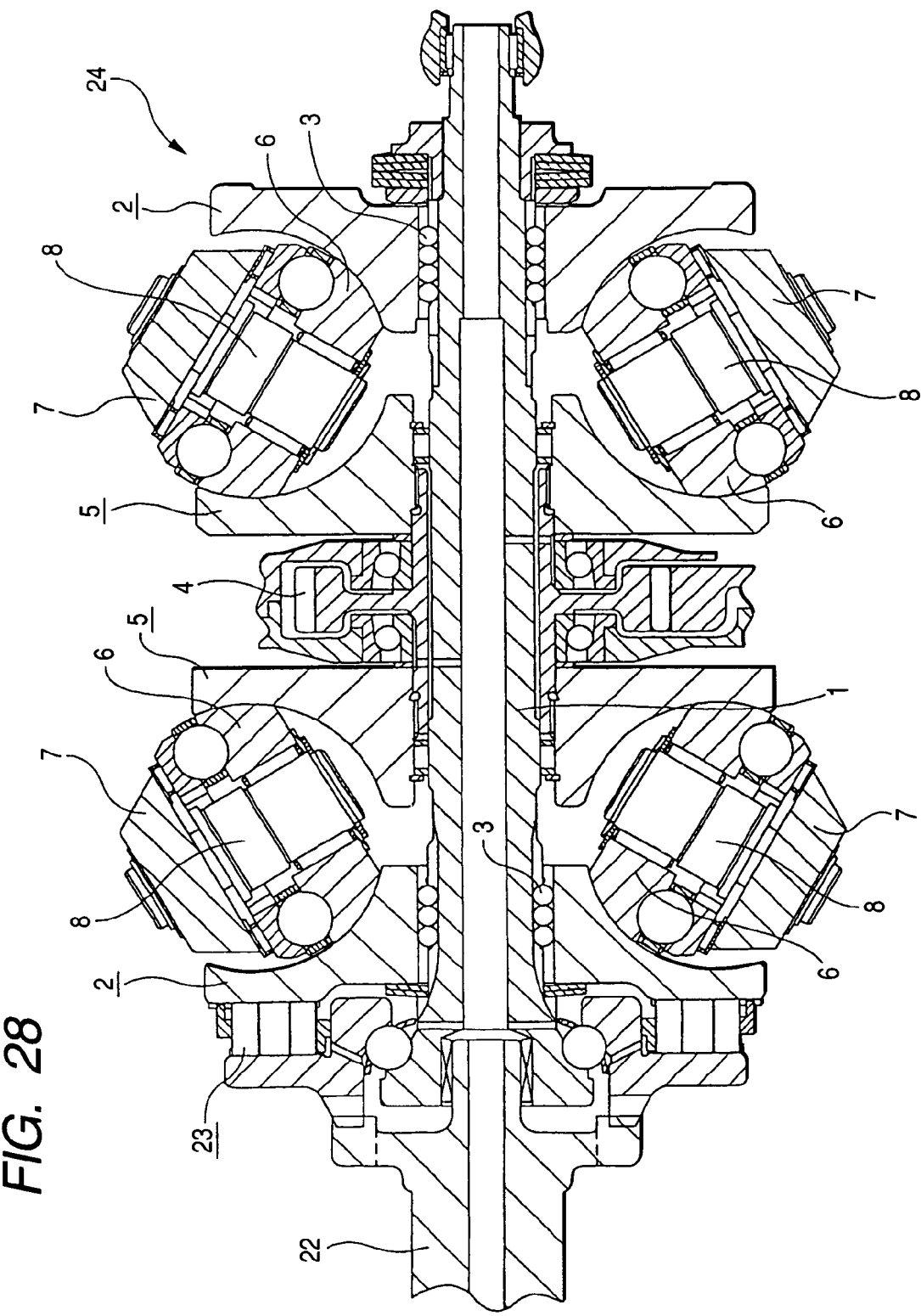
FIG. 28 is a sectional view taken along a line D-D of FIG. 27.
Figure 30:
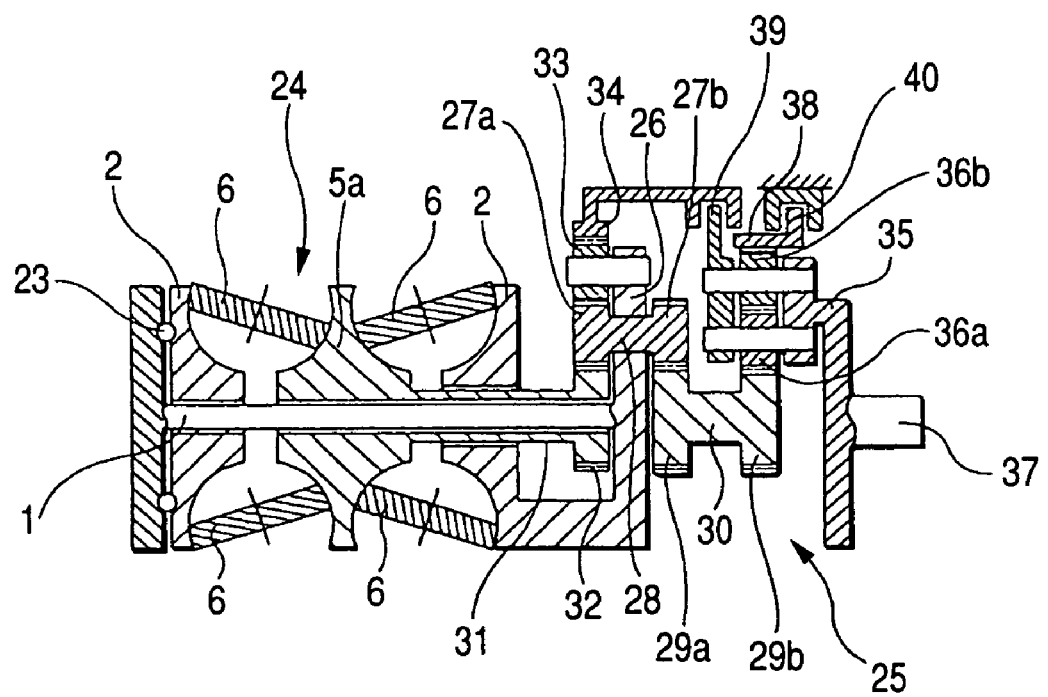
FIG. 30 is an outline sectional view showing a first example of a continuously variable transmission apparatus known in a related art.

For example, consider a case in which as shown by FIG. 6, in a region of restraining the torque $T_{CVU1}$ (measured value) actually passing the toroidal-type continuously variable transmission 24 to the target value $T_{CVU2}$, the torque $T_{IN}$ of driving the input shaft 1 by the engine is changed in a direction of being reduced rapidly as the rotational speed of the input shaft 1 is increased. A characteristic of the engine is easily provided even in the low speed rotating region so far as the engine is an electronically controlled engine. In the case of providing such an engine characteristic and when the measured value $T_{CVU1}$ of the torque is provided with a deviation in a direction in which the respective input side disks 2, 2 receive the torque from the respective power rollers 6, 6 (refer to FIG. 28 through 30) in comparison with the target value $T_{CVU2}$, the transmission ratio of the total of the continuously variable transmission apparatus is displaced to a speed reducing side in order to increase the rotational speed of the engine for reducing the torque $T_{IN}$ for driving the input shaft 1. Therefore, the transmission ratio of the toroidal-type continuously variable transmission 24 is changed to a speed increasing side.

For example, in FIG. 6, when the target value $T_{CVU2}$ is present at point a and the measured value $T_{CVU1}$ is present at point b, there is constituted a state of providing a deviation in the direction in which the respective input side disks 2, 2 receive the torque from the power rollers 6, 6. Hence, the transmission ratio $e_{CVT}$ of the total of the continuously variable transmission apparatus is changed to the speed reducing side by changing the transmission ratio $e_{CVU}$ of the toroidal-type continuously variable transmission 24 to the speed increasing side. In accordance therewith, the rotational speed of the engine is increased to reduce the torque. On the contrary, when the measured value $T_{CVU1}$ is present at point c of the drawing, there is constituted a state of providing a deviation in the direction in which the respective input side disks 2, 2 apply torque to the power rollers 6, 6. In this case, contrary to the above-described case, the transmission ratio $e_{CVT}$ of the total of the continuously variable transmission apparatus is changed to the speed increasing side by changing the transmission ratio $e_{CVU}$ of the toroidal-type continuously variable transmission 24 to the speed reducing side. In accordance therewith, the rotational speed of the engine is reduced to increase the torque.

In the following, the above-described operation is repeatedly carried out until the torque $T_{CVU1}$ actually passing the toroidal-type continuously variable transmission 24 calculated from the pressure difference coincides with the target value $T_{CVU2}$. That is, the above-described operation is repeatedly carried out when the torque $T_{CVU1}$ passing the toroidal-type continuously variable transmission 24 cannot be made to coincide with the target value $T_{CVU2}$ only by controlling to change the speed of the toroidal-type continuously variable transmission 24 by one time operation. As a result, in the torque $T_{IN}$ of the engine for driving to rotate the input shaft 1, the torque $T_{CVU1}$ passing the toroidal-type continuously variable transmission 24 can be made to be proximate to the target value $T_{CVU2}$. Further, such operation is carried out automatically and in a short period of time by instruction from a microcomputer integrated to the controller of the continuously variable transmission apparatus.

The control for restraining the torque $T_{CVU1}$ actually passing the toroidal-type continuously variable transmission 24 to point a shown in FIG. 6 constituting the target value $T_{CVU2}$ in this way is divided in two stages, first, the rotational speed of the engine is controlled grossly, that is, to the rotational speed which seems to provide the target value $T_{CVU2}$ and thereafter, the transmission ratio of the toroidal-type transmission 24 is controlled in accordance with rotational speed. Therefore, the torque $T_{CVU1}$ actually passing the toroidal-type continuously variable transmission 24 can be restrained to the target value $T_{CVU2}$ without bringing about overshooting (and hunting accompanied thereby), or even when the overshooting is assumedly brought about, by restraining the overshooting to be low to a degree which is not problematic practically.

The hydraulic circuit shown in FIG. 3 is provided with the function for making the torque $T_{cvu1}$ actually passing the toroidal-type continuously variable transmission 24 coincide with the target value $T_{CVU2}$ as described above (torque controlling function) other than the function of alleviating the torque shift produced in changing the mode, as described above, as well as a function of restraining power for driving the respective pressurizing pumps 63, 79 to be low (power reducing function). For that purpose, according to the hydraulic circuit, the pressurized oil is made to be able to charge and discharge to and from the pair of the chambers 80a, 80b constituting the hydraulic type actuator 10 for displacing the trunnions 7 in the axial directions (up and down direction of FIGS. 3, 29) of the pivoting shafts 9, 9 (refer to FIG. 29) via the transmission ratio control valve 12 The sleeve 14 constituting the transmission ratio control valve 12 is made to be able to drive to displace in the axial direction via a rod 81 and a link arm 82 by the stepping motor 13. Further, the spool 15 constituting the transmission ratio control valve 12 is engaged with the trunnion 7 via the link arm 19, the precess cam 18 and the rod 17 and is made to be able to drive to displace in the axial direction (left and right direction of FIGS. 3, 29) in accordance with displacement in the axial direction (up and down direction of FIG. 29) and a pivoting displacement of the trunnion 7. The above-described constitution is basically the same as that of the transmission ratio control mechanism of the toroidal-type continuously variable transmission unit which has been known in the prior art.

Particularly, in the case of the embodiment, in order to provide the torque controlling function, the sleeve 14 is driven by the stepping motor 13 and driven also by a hydraulic type pressure difference cylinder 83. That is, a front end portion of the rod 81 a base end portion of which is coupled to the sleeve 14 is axially supported by a middle portion of the link arm 82 and pins pushed and pulled by the stepping motor 13 or the pressure difference cylinder 83 are engaged with long holes (that are longitudinal in a upward and downward direction of FIG. 3) formed at both end portions of the link arm 82. When one of the pins is pushed or pulled, other of the pins is operated as a fulcrum. By such a constitution, the sleeve 12 is displaced in the axial direction by the stepping motor 13 and also by the pressure difference cylinder 83. In the case of the embodiment, by displacing the sleeve 12 by the pressure difference cylinder 83, in accordance with the torque $T_{CVU}$ passing the toroidal-type continuously variable transmission 24, the transmission ratio $e_{CVU}$ of the toroidal-type continuously variable transmission 24 is finely controlled.

For that purpose, in the case of the embodiment, the pressurized oil is charged and discharged to and from a pair of hydraulic chambers 84a, 84b provided at the pressure difference cylinder 83 by a first and a second pressure difference control valve 86, 87 controlled by a load electromagnetic valve 85 via a forward and rearward switch valve 88. The load electromagnetic valve 85 is an electromagnetic proportional valve of a normally open type and is provided with a function of introducing the hydraulic pressure substantially proportional to an applied voltage to the first and the second pressure difference control valves 86, 87 present on the downstream side. Further, a valve opening pressure of a pressurizing pressure control valve 90 is made to be able to control based on opening and closing an electromagnetic valve 89 of a normally closed type. Further, states of communicating respective portions are made to be able to switch by the manual switching valve 64 operated by a shift lever provided at a driver seat.

Further, a difference of the hydraulic pressures of the pair of hydraulic chambers 80a, 80b provided at the actuator 10 for displacing the trunnion 7 (refer to FIGS. 28, 29) is outputted by a pressure difference output valve 91 to introduce into the pressurizing pressure control valve 90. A spool 92 constituting the pressure difference output valve 91 is displaced in an axial direction in accordance with pressures in the pair of hydraulic chambers 80a, 80b provided by interposing the piston 16 of the actuator 10 introduced into a pair of hydraulic chambers 93a, and 93b. Further, the hydraulic pressure is introduced to a pressure introducing paths 94a (94b) respective end portions of which are connected to the pressure difference output valve 91 and reaction chambers 95a (95b) provided at the portions opposed to both end faces of the spool 92 by whether the hydraulic pressure introduced into one of the pilot portions 93a (93b) is higher than the hydraulic pressure introduced into other of the pilot portions 93b (93a).

For example, consider a state in which the hydraulic pressure in the hydraulic chamber 80a for the actuator 10 on one side is higher than that of the hydraulic chamber 80b on other side. Under the state, the hydraulic pressure introduced into the pilot chamber 93a becomes higher than the hydraulic pressure introduced into the other pilot portion 93b, the spool 92 is moved to the right side of FIG. 3, and the pressure difference output valve 91 is switched. As a result, the pressurized oil delivered from the pressurizing pump 63 is introduced to the first pilot portion of the pressurizing pressure control valve 90 via the pressure introducing path 94a on one side (right side of FIG. 3). Further, along therewith, the pressurized oil is introduced into the first and the second pressure difference control valves 86, 87, the pressure difference cylinder 83 is displaced via the forward and rearward switch valve 88 and the sleeve 14 of the transmission ratio control valve 12 is finely displaced.

In contrast thereto, when the hydraulic pressure in the other hydraulic chamber 80b of the actuator 10 becomes higher than that of the one hydraulic chamber 80a, the hydraulic pressure introduced into the other pilot portion 93b becomes higher than the hydraulic pressure introduced into the one pilot portion 93a, the spool 92 is moved to the left side of FIG. 3 and the pressure difference output valve 91 is switched reversely to the above-described state. As a result, the pressurized oil delivered from the pressurizing pump 63 is introduced to the second pilot portion of the pressurizing pressure control valve 90 via the pressure introducing path 94b on the other side (left side of FIG. 3). Further, along therewith, the pressurized oil is introduced into the first and the second pressure difference control valves 86, 87 to displace the pressure difference cylinder 83 via the forward and rearward switch valve 88.

In either of the cases, the pressurized oil introduced into the pressure introducing paths 94a, 94b is introduced also to the reaction chambers 95a, 95b of the pressure difference output valve 91 to pressurize the end face in the axial direction of the spool 92. Therefore, a force for communicating the pipeline communicated to the pressurizing pump 63 and the pressure introducing path 94a (94b) by displacing the spool 92 in the axial direction is proportional to a difference $|\Delta P|$ of the hydraulic pressures introduced into the pair of pilot portions provided at the pressure difference output valve 91. As a result, the hydraulic pressure introduced into the first and the second pilot portions of the pressurizing pressure control valve 90 is proportional to the difference $|\Delta P|$ of the hydraulic pressures in the hydraulic chambers 80a, 80b in the actuator 10, that is, power passing the toroidal-type continuously variable transmission 24 (refer to FIG. 1).

Figure 27:
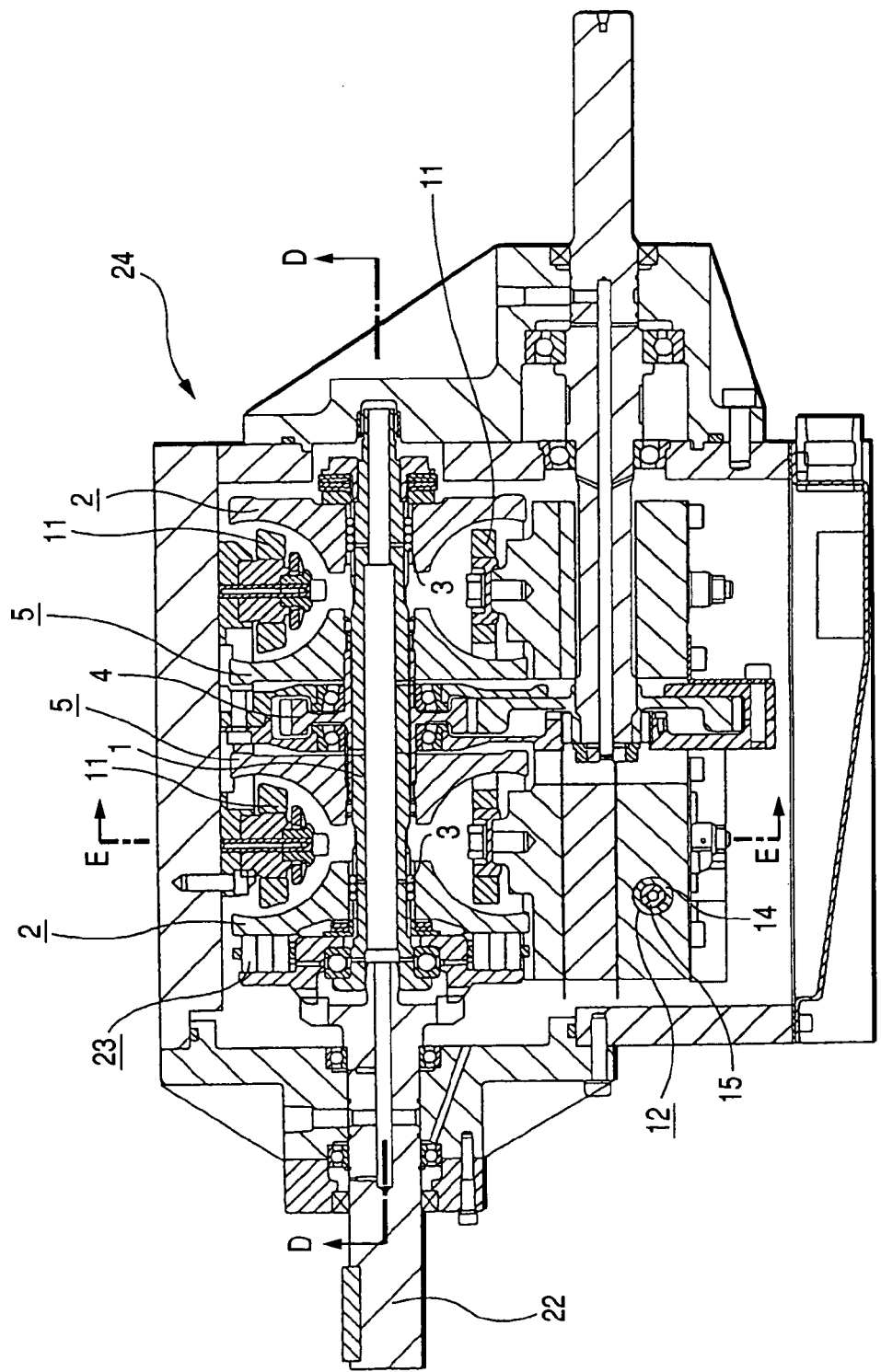
FIG. 27 is a sectional view showing an example of a toroidal-type continuously variable transmission known in a prior art.

Further, the higher the oil pressure introduced into the first and the second pilot portions, the higher the valve opening pressure of the pressurizing pressure control valve 90 provided for providing the power reducing function. Further, the higher the valve opening pressure of the pressurizing pressure control valve 90, the higher the hydraulic pressure introduced into the hydraulic type pressing apparatus 23a provided in place of the mechanical type pressing apparatus 23 (refer to FIGS. 27, 28). Therefore, the larger the power passing the toroidal-type continuously variable transmission 24, the larger the hydraulic pressure introduced into the pressing apparatus 23a and therefore, the pressing force produced by the pressing apparatus 23a. Further, along therewith, an amount of a lubricant delivered from the pressurizing pressure control valve 90 is increased and an amount of the lubricant transmitted to the respective portions of the toroidal-type continuously variable transmission 24 is increased. Therefore, the efficiency of the total of the continuously variable transmission apparatus can be promoted by preventing power for driving the pressurizing pumps 63, 79 for delivering the lubricant from being consumed wastefully.

Further, in the above-described hydraulic pressure control circuit, an amount of displacing the spool 15 constituting the transmission ratio control valve 12 by the pressure difference cylinder 83 and therefore, the transmission ratio of the above-described toroidal-type continuously variable transmission 24 is finely controlled by controlling a state of conducting electricity to the load electromagnetic valve 85 of the normally open type. Specifically, a controlling computer sets a target value of the torque transmitted to the output shaft 37b in accordance with various vehicle states of an accelerator opening degree, a position of a select lever (position of switching the manual switch valve 64), a braking state and the like. Further, the lower the target value, the higher the voltage applied to the load electromagnetic valve 15, the smaller the opening degree of the load electromagnetic valve 85 (smaller the moment of opening the valve) to thereby reduce the hydraulic pressure introduced into the first and the second pressure difference control valves 86, 87. As a result, the hydraulic pressure introduced into the pressure difference cylinder 83 via the first and the second pressure difference control valves 86, 87 is reduced and an amount of correcting the transmission ratio of the toroidal-type continuously variable transmission 24 by the pressure difference cylinder 83 is reduced. Under the state, so far as the spool 15 of the transmission ratio control valve 12 is not displaced by the stepping motor 13, the torque transmitted to the output shaft 37b is reduced (to a degree which is not sufficient for running the automobile).

Conversely, the higher the target value, the lower the voltage applied to the load electromagnetic valve 85, the larger the opening degree of the load electromagnetic valve 85 (the larger the moment of opening the valve) to thereby increase the hydraulic pressure introduced into the first and the second pressure difference control valves 86, 87 (for example, 0.45 MPa which is a line pressure). As a result, the hydraulic pressure introduced into the pressure difference cylinder 83 via the first and the second pressure difference control valves 86, 87 is increased and the amount of correcting the transmission ratio of the toroidal-type continuously variable transmission 24 by the pressure difference cylinder 83 is increased. Under the state, even when the spool 15 of the transmission ratio control valve 12 is not displaced by the stepping motor 13, the torque transmitted to the output shaft 37b is increased to a degree sufficient for running the automobile at low speed so far as a brake pedal is not depressed, or a parking brake is not operated.

In the case of the embodiment, since the load electromagnetic valve 85 of the normally open type is used, when electricity conduction to the load electromagnetic valve 85 is cut (applied voltage becomes null) by a failure in an electric control circuit, the hydraulic pressure introduced into the pressure difference cylinder 83 becomes a maximum value and the amount of correcting the transmission ratio of the toroidal-type continuously variable transmission 24 by the pressure difference cylinder 83 becomes a maximum value. As a result, in the failure of the electric control circuit, the torque transmitted to the output shaft 37b can be increased to a degree of capable of running the automobile at low speed. Further, the automobile failed on the road can be moved to a safe location of a road shoulder or the like. In other words, in the failure of the electric control circuit, when the manual switch valve 64 is switched to a running state (L, D, R position), the torque to the degree of capable of running the automobile at low speed can be applied to the output shaft 37b. Further, in such a case, it is preferable to inform the driver of occurrence of the failure by an alarm light, an alarm buzzer or the like provided on a dashboard in front of the driver seat to issue an alarm for preventing the driver from driving the vehicle more than necessary for escaping.

Figure 7:
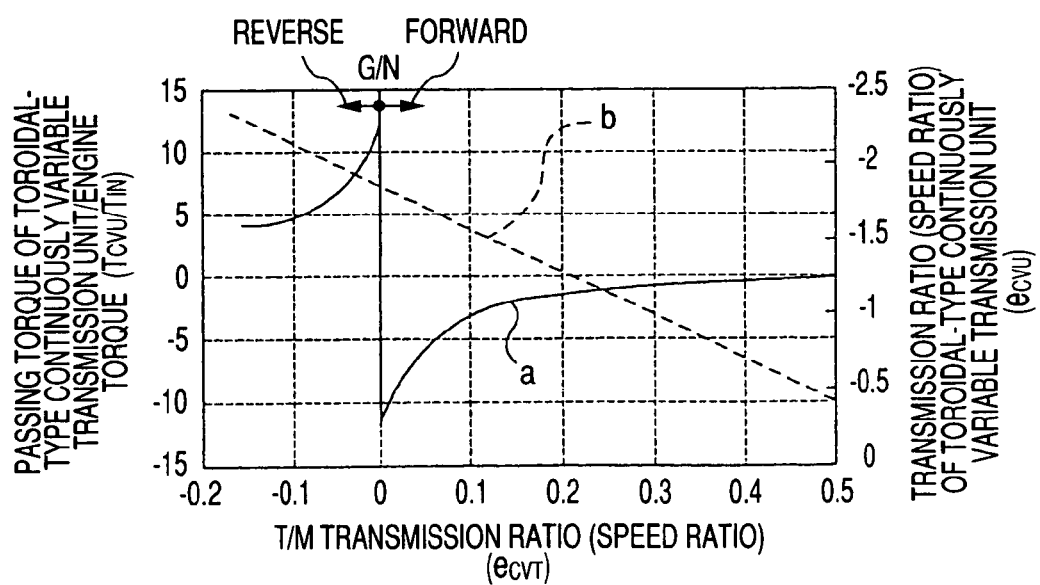
FIG. 7 is a diagram showing a relationship between a passing torque and a transmission ratio with regard to the toroidal-type continuously variable transmission unit and the transmission ratio of the total of the continuously variable transmission apparatus in a low speed mode.

Further, FIG. 7 shows a relationship among a ratio of the torque $T_{CVU}$ passing the toroidal-type continuously variable transmission 24 to the torque $T_{IN}$ of the engine for driving to rotate the input shaft 1 (left side ordinate) and the transmission ratio and $e_{CVT}$ of the total of the continuously variable transmission apparatus (abscissa) and the transmission ratio $e_{CVU}$ of the toroidal-type continuously variable transmission 24 (right side ordinate) provided in the low speed mode of the continuously variable transmission apparatus constituted and operated as described above. A bold line a indicates a relationship between the ratio of the passing torque $T_{CVU}$ to the drive torque (engine torque) TIN and the transmission ratio $e_{CVT}$ of the total of the continuously variable transmission apparatus and a broken line b indicates a relationship between the two transmission ratios $e_{CVT}$ and $e_{CVU}$, respectively. In the case of the embodiment, the transmission ratio $e_{CVU}$ of the toroidal-type continuously variable transmission 24 is restrained in order to restrain the torque $T_{CVU1}$ actually passing the toroidal-type continuously variable transmission 24 to a target value ($T_{CVU2}$) represented by a point on the bold line a in a state of restraining the transmission ratio of the total of the continuously variable transmission apparatus in a predetermined range.

Embodiment 2

Figure 8:
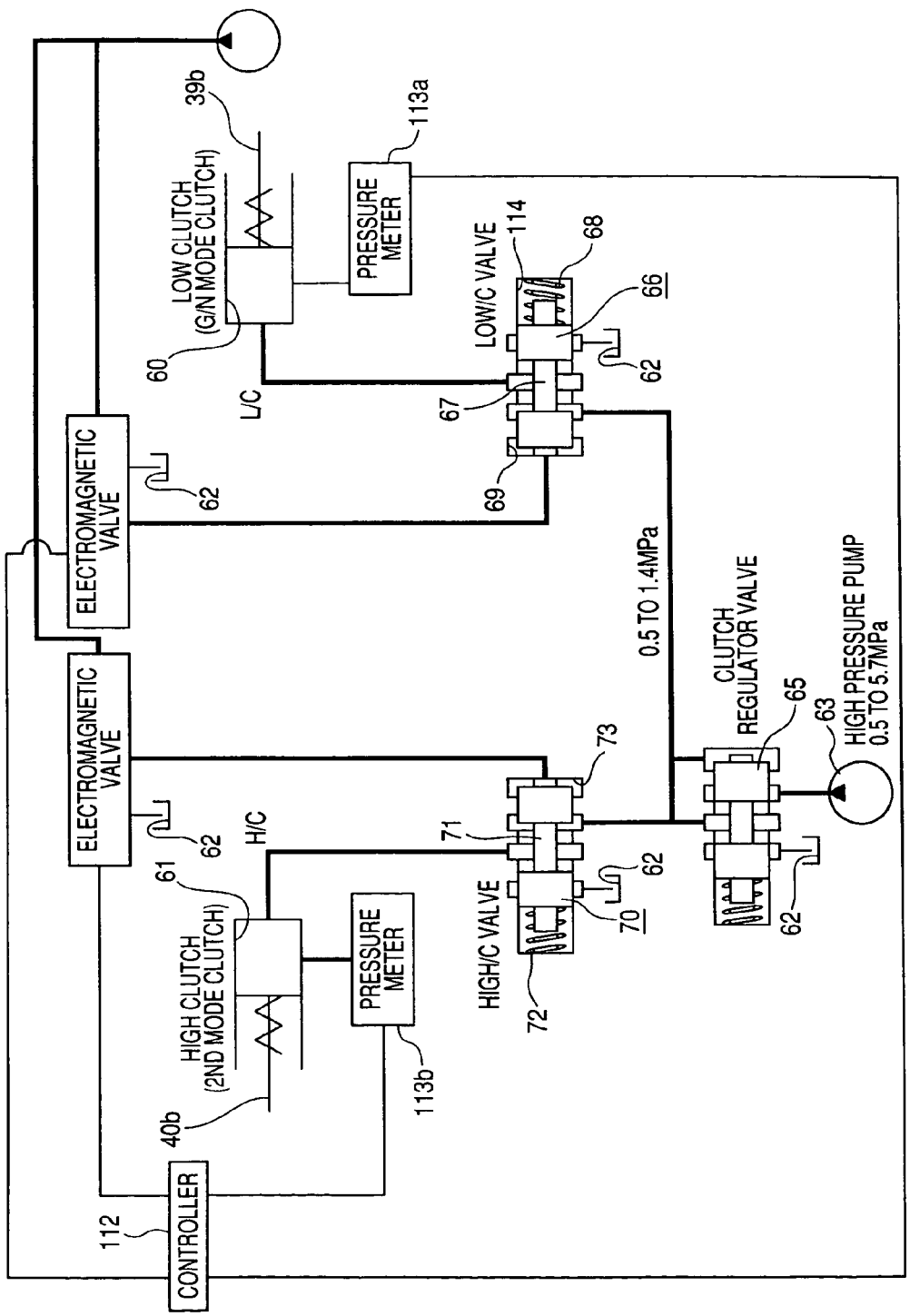
FIG. 8 is a hydraulic circuit diagram substantially in correspondence with a portion A of FIG. 3 showing Embodiment 2 of the invention.

FIG. 8 shows Embodiment 2 of the invention. Also in the case of the embodiment, the transmission ratio of the toroidal type continuously variable transmission 24 (refer to FIG. 1) is adjusted prior to starting to connect one clutch of the clutch 39b for low speed and the clutch 40b for high speed which has not been connected by a controller 112 in switching the low speed mode and high speed mode. Successively, the one clutch is started to connect after making rotational speeds of a pair of members connected via the one clutch substantially coincide with each other. Further, when power transmission of the one clutch is started, operation of disconnecting connection of other clutch which has been connected is started. Further, by providing such a function, there is set an instance of transmitting power simultaneously by the two clutches 39b and 40b during a time period until connection of the other clutch is disconnected after the one clutch has started to transmit power.

Particularly, in the case of the embodiment, starting of power transmission by the one clutch is detected by hydraulic pressure at inside of the hydraulic chamber for the clutch for introducing hydraulic pressure in connecting the clutch. For that purpose, in the case of the embodiment, hydraulic pressure at inside of the hydraulic chamber 60 for the low speed clutch belonging to the clutch 39b for low speed is made to be electrically detectable by a pressure meter 113a constituting a pressure sensor and hydraulic pressure at inside of the hydraulic chamber 61 for the high speed clutch belonging to the clutch 40b for high speed is made to be electrically detectable by a pressure meter 113b constituting a pressure sensor. As is apparent from the bold line b of FIG. 4 and the bold lines α of FIGS. 5A and 5B explained in Embodiment 1, mentioned above, starting of power transmission of the one clutch which has not been connected can be grasped by observing hydraulic pressure at inside of the hydraulic chamber for the clutch belonging to the clutch. Hence, when it is determined that power transmission of the one clutch which has not been connected is started based on a signal from either of the pressure meter 113a (or 113b), the controller 112 disconnects connection of the other clutch which has been connected.

As a result, also in the case of the embodiment, similar to the case of Embodiment 1, mentioned above, as shown by FIG. 5A, the instance of simultaneously transmitting power by the two clutches is firmly produced and the torque shift brought about in the toroidal type continuously variable transmission in switching the mode can be alleviated.

Further, although illustration is omitted, in order to detect that power transmission of the one clutch which has not been connected is started, the detection can also be carried out by detecting a stroke (displacement) of a piston which is a driving member for connecting the clutch by a displacement meter of a potentiometer or the like installed at the piston or a portion displaced along with a piston.

Further, whereas in the case of the embodiment, starting of power transmission by the respective clutch 39b, 40b for low speed and for high speed is electrically detected by the pressure meters 113a, 113b constituting the pressure sensors as described above, in the case of the structure of Embodiment 1 shown in FIGS. 1 through 7, mentioned above, starting of power transmission by the respective clutches 39b, 40b for low speed and for high speed is mechanically detected by the respective switching valves 66, 70 for the low speed clutch and for high speed clutch switched in accordance with introduction of hydraulic pressure into the respective hydraulic chambers 60, 61 for the low speed clutch and for the high speed clutch of the respective clutches 39b, 40b. Further specifically, in the case of the structure of Embodiment 1, mentioned above, by setting elastic forces of the respective compression coil springs 68, 72 for the low speed clutch and for the high speed clutch constituting the respective switching valves 66, 70 for the low speed clutch and for the high speed clutch such that after starting power transmission by one clutch (for example, the clutch 40b for high speed) of the clutch 39b for low speed and the clutch 40b for high speed which has not been connected, connection of other clutch (for example, the clutch 39b for low speed) which has been connected is disconnected, the above-described respective switching valves 66, 70 are provided with a function equivalent to that of detecting starting of power transmission by the one clutch 40b (39b). That is, hydraulic pressures necessary for connecting the respective clutch 39b, 40b for low speed and for high speed are determined by magnitudes of elastic forces of the springs (return springs) 121a, 121b (refer to FIG. 3) for the clutches for bringing the respective clutches 39b, 40b into an unconnected state. In other words, at the time point at which products of hydraulic pressures in the hydraulic chambers 60, 61 of the clutches of the respective clutches 39b, 40b by the pressure receiving areas of the pistons constituting the respective clutches 39b, 40b become larger than the elastic forces of the springs 121a, 121b of the clutches of the respective clutches 39b, 40b, operation of connecting the respective clutches 39b, 40b is started to start transmitting power. Therefore, when the elastic forces of the respective compression coil springs 68, 72 for the low speed clutch and for the high speed clutch are set such that connection of the other clutch 39b (40b) is disconnected by hydraulic pressure equal to or larger than hydraulic pressure necessary for displacing the piston of the one clutch 40b (39b) to a position of starting to transmit power, starting of power transmission by the one clutch 40b (39b) is mechanically detected by the switching valve 70 (66) (without using the pressure sensors) and connection of the other clutch 39b (40b) can be disconnected by the switching valve 70 (66).

Further, in the case of a structure of pressing the respective spools 67, 71 in an opening direction by hydraulic pressures introduced into respective reaction force chambers 114, 115 for the low speed clutch and for the high speed clutch as in Embodiments 5 through 7 shown in FIGS. 15 through 19, mentioned later, by setting the ratios of the pressure receiving areas of the respective reaction force chambers 114, 115 and the respective pilot chambers 69, 73 for the low speed clutch and for the high speed clutch, connection of the other clutch 39b (40b) is disconnected by hydraulic pressure equal to or larger than hydraulic pressure necessary for displacing the piston of the one clutch 40b (39b) to the position of starting to transmit power. When constituted in this way, even in the structure in which the respective switching valves 66, 70 for the low speed clutch and for the high speed clutch are provided with the reaction force chambers 114, 115, by the respective switching valves 66, 70 starting of power transmission by the one clutch 40b (39b) is mechanically detected (without using the pressure sensors) and connection of the other clutch 39b (40b) can be disconnected by the respective switching valves 66, 70.

Embodiment 3

Figure 9:
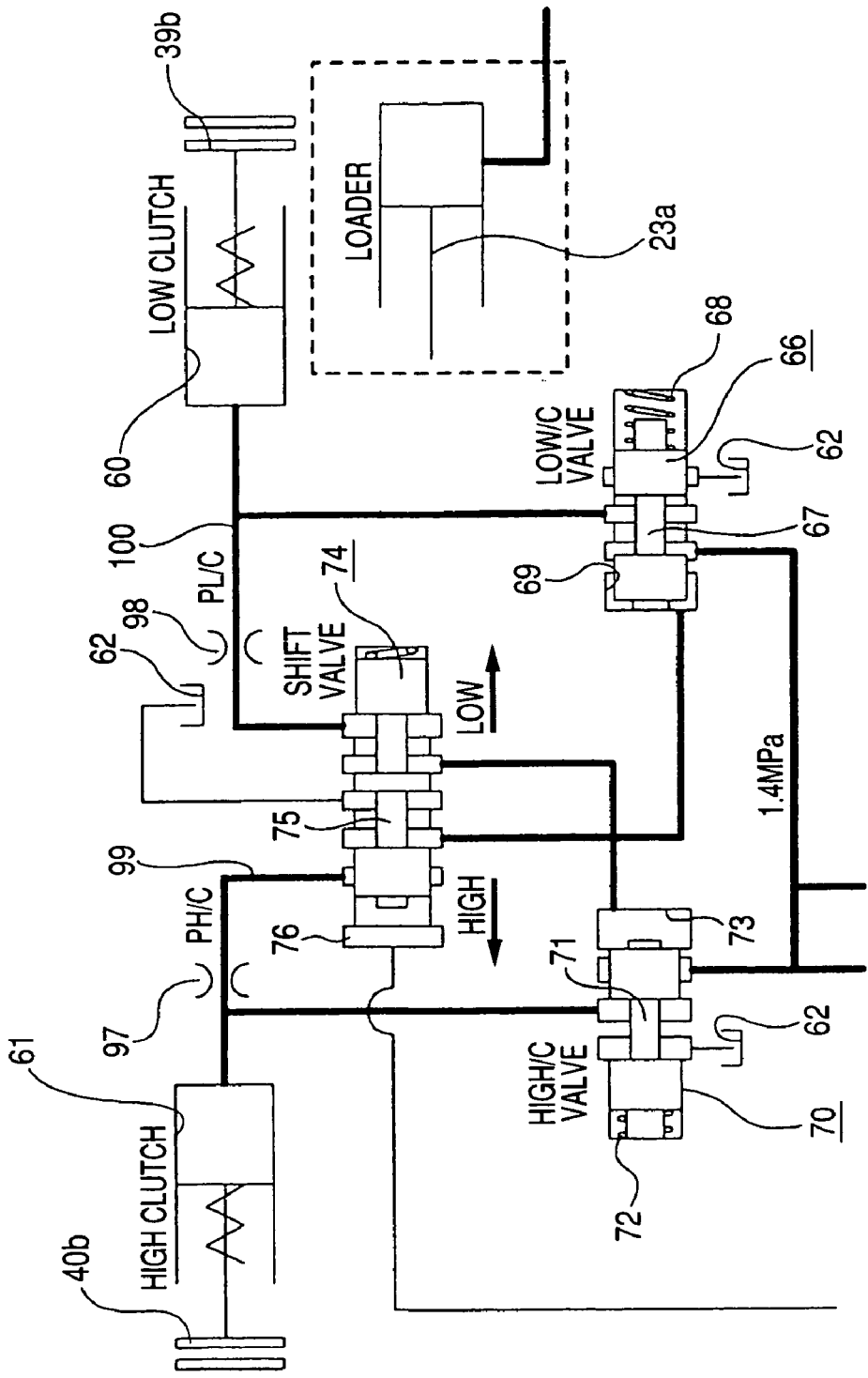
FIG. 9 is a hydraulic circuit diagram in correspondence with a portion A of FIG. 3 showing Embodiment 3 of the invention.

FIG. 9 shows Embodiment 3 of the invention. In the case of the embodiment, by providing a first throat 97 constituting first resisting means and a second throat 98 constituting second resisting means, there is firmly provided a time period from when one clutch of the two low speed and high speed clutches 39b, 40b, which has been disconnected to when other clutch thereof which has been connected is disconnected.

For that purpose, the first throat 97 is provided at a middle of a first pressure introducing path 99 for introducing the hydraulic pressure introduced into the hydraulic chamber 61 for the high speed clutch into the pilot chamber 69 for the low speed clutch belonging to the switch valve 66 for the low speed clutch via the shift switch valve 74. The first throat 97 having any structure can be utilized so far as the first throat 97 is a member constituting a resistance against flow of the pressurized oil of an orifice, a capillary tube or the like. The first throat 97 constitutes a resistance against introduction of the hydraulic pressure introduced into the hydraulic chamber 61 for the high speed clutch belonging to the high speed clutch 40b into the pilot chamber 69 for the low speed clutch and an increase in the pressure in the pilot chamber 69 for the low speed clutch is retarded in comparison with an increase in the pressure in the hydraulic chamber 61 for the high speed clutch.

Therefore, when the hydraulic pressure is introduced into the hydraulic chamber 61 for the high speed clutch in accordance with switching from the low speed mode to the high speed mode, the hydraulic pressure in the hydraulic chamber 61 for the high speed clutch swiftly rises and the high speed clutch 40b is immediately connected. In contrast thereto, rise of the hydraulic pressure in the pilot chamber 69 for the low speed clutch is retarded based on presence of the first throat 97 and switching of the switch valve 66 for the low speed clutch is retarded. As a result, a reduction in the hydraulic pressure in the hydraulic chamber 60 for the low speed clutch for the low speed clutch 39b is retarded and during the time period, both of the low speed clutch 39b and the high speed clutch 40b stay to be connected.

Further, the second throat 98 is provided at a middle of a second pressure introducing path 100 for introducing the hydraulic pressure introduced into the hydraulic chamber 60 for the low speed clutch into the pilot chamber 73 for the high speed clutch belonging to the switch valve 70 for the high speed clutch via the shifting switch valve 74. The second throat 98 is constituted by a structure similar to that of the first throat 97 and constitutes a resistance against introduction of the hydraulic pressure introduced into the hydraulic chamber 60 for the low speed clutch belonging to the low speed clutch 39b into the pilot chamber 73 for the high speed clutch to thereby retard an increase in the pressure in the pilot chamber 73 for the high speed clutch in comparison with an increase in the pressure in the hydraulic chamber 60 for the low speed clutch.

Therefore, when the hydraulic pressure is introduced into the hydraulic chamber 60 for the low speed clutch in accordance with switching from the high speed mode to the low speed mode, the hydraulic pressure in the hydraulic chamber 60 for the low speed clutch rapidly rises, whereby the low speed clutch 39b is immediately connected. In contrast thereto, rise of the hydraulic pressure in the pilot chamber 73 for the high speed clutch is retarded based on presence of the second throat 98 and switching of the switch valve 70 for the high speed clutch is retarded. As a result, a reduction in the hydraulic pressure in the hydraulic chamber 61 for the high speed clutch of the high speed clutch 40b is retarded and during the time period, both of the high speed clutch 40b and the low speed clutch 39b stay to be connected.

As described above, in the case of the embodiment, there is firmly provided a time period from when one clutch of the two low speed and high speed clutches 39b, 40b which has been disconnected to when other clutch thereof which has been connected is disconnected. That is, the time period of simultaneously transmitting the power by the low speed and high speed clutches 39b, 40b, (between A and B in the above-mentioned FIGS. 4 and 5) can firmly be produced by ensuring the delay time period of switching the hydraulic type valve.

Constitution and operation thereof other than providing the first throat 97 and the second throat 98 are similar to those of Embodiment 1, mentioned above, and therefore, duplicated illustration and explanation will be omitted. Further, the first and the second throats 97, 98 may be provided between the shifting switch valve 74 and the respective pilot chambers 69, 73 for the low speed clutch and for the high speed clutch in the first and the second pressure introducing paths 99, 100. However, in this case, it is preferable to provide check valves which are opened when the hydraulic pressure in the respective pilot chambers 69, 73 are discharged in parallel with the first and the second throats 97, 98. The reason is that time periods required for connecting the respective low speed and high speed clutches 39b, 40b are shortened by swiftly reducing the hydraulic pressures in the respective pilot chambers 69, 73 by switching the modes. In contrast thereto, when the first and the second throats 97, 98 are provided between the shifting switch valve 74 and the respective hydraulic chambers 60, 61 for the low speed clutch and for the high speed clutch in the first and the second pressure introducing paths 99, 100 as shown by FIG. 9, the check valves are not needed, which is advantageous in view of a reduction in cost and ensuring an installing space.

Embodiment 4

FIGS. 10 through 14 show Embodiment 4 of the invention. In the case of the embodiment, the elastic force of the compression coil spring 72 for the high speed clutch constituting the elastic member for the high speed clutch for elastically pressing the spool 71 for the high speed clutch integrated to a switch valve 70a for the high speed clutch related to the high speed clutch 40b which is the clutch which is not to be connected in starting the vehicle, is made variable. Specifically, the embodiment is constituted such that in the running state (running mode), that is, in the case in which the manual switch valve 64 switched by the shift lever provided by the driver seat is switched to any of L (low range), D (drive range), and R (reverse range), the elastic force of the compression coil spring 72 for the high speed clutch is made to be large and in the non-running state, that is (non-running mode), in the case in which the manual switch valve 64 is switched to either of N (neutral range) and P (parking range), the elastic force of the compression coil spring 72 for the high speed clutch is set to be small.

The reason that according to the embodiment, the elastic force of the compression coil spring 72 for the high speed clutch is made variable as described above is as follows. As described above, in order to prevent an abrupt variation in the transmission ratio from being brought about in switching the low speed mode and the high-speed mode, it is effective to produce the time period of simultaneously connecting the low speed clutch 39b and the high speed clutch 40b by a short period of time. In the case of the structure of Embodiment 1 shown by FIG. 3 which is constituted with such a purpose, in order to firmly produce the time period of simultaneously transmitting the power by the two clutches 39b, 40b, it is preferable to increase the elastic forces of the respective compression coil springs 68, 72 for the low speed clutch and the high speed clutch integrated to the respective switch valves 66, 70 for the low speed clutch and the high speed clutch.

Figure 13:
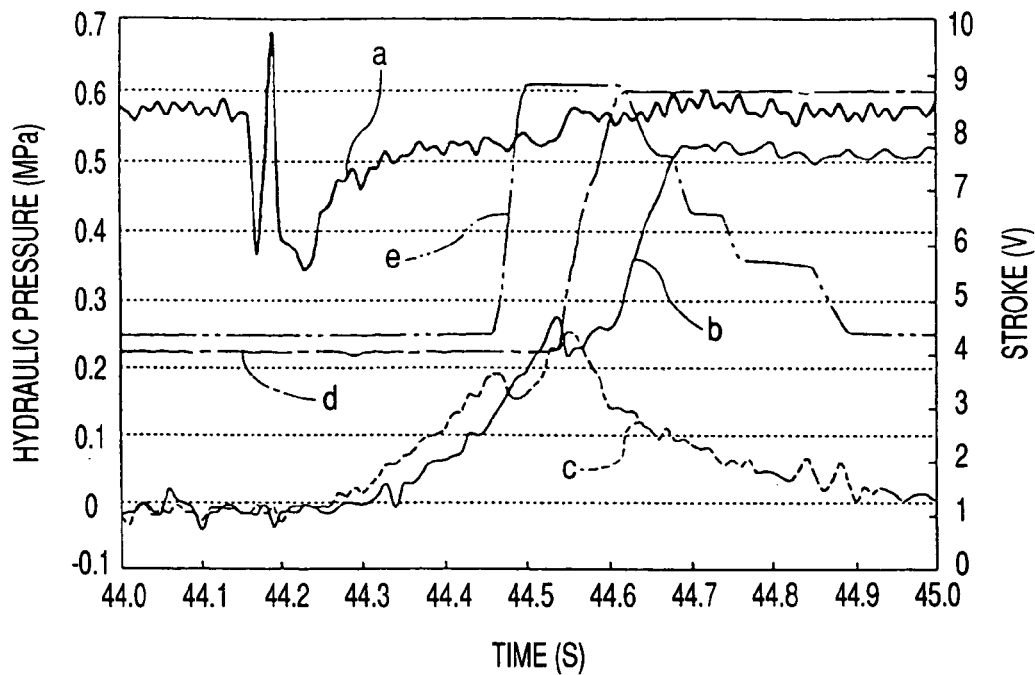
FIG. 13 is a diagram showing movements of respective portions in switching from a non-running state to a running state in a state of increasing an elastic force of a compression coil spring for a high speed clutch.
Figure 14:
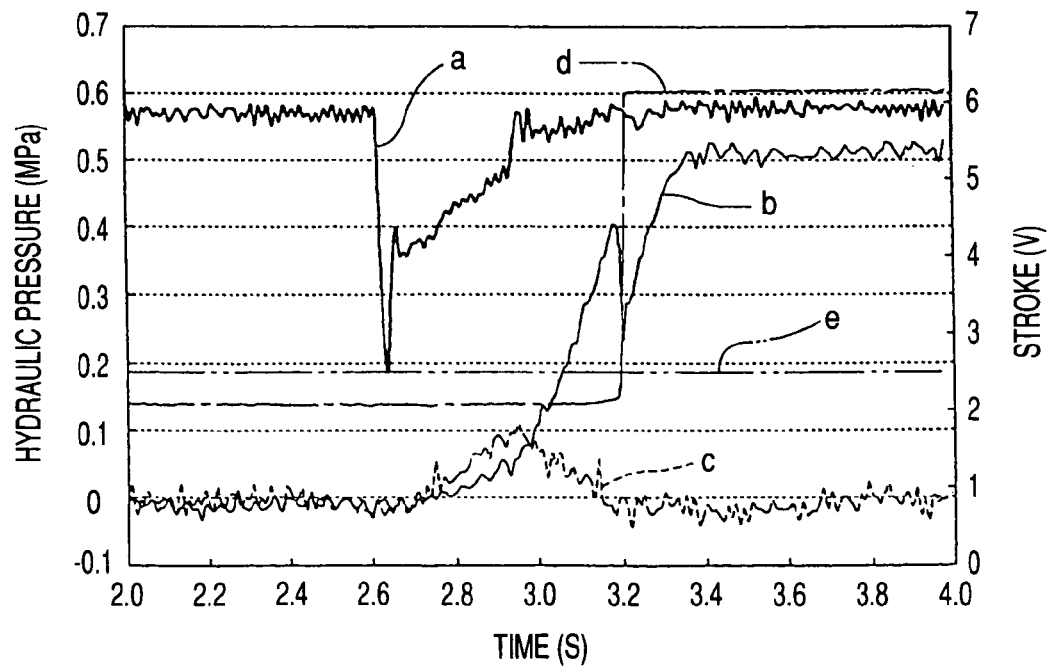
FIG. 14 is a diagram showing movements of respective portions in switching from the non-running state to the running state in a state of reducing the elastic force of the same.

When the elastic forces of the respective compression coil spring 68, 72 are small, depending on a structure of a hydraulic pipe, there is a possibility that the respective spools 67, 71 for the low speed clutch and the high speed clutch integrated to the respective switch valves 66, 70 are displaced at an early stage, the pressure in the hydraulic chamber of the clutch which has been connected is discharged in a short period of time so that the time period of simultaneously transmitting the power by the two clutches 39b, 40b cannot be provided. FIGS. 13 through 14 show a result of an experiment which is carried out with respect to a state of switching the manual switch valve 64 from the non-running state to running state in this regard. FIG. 13 of the drawings show a case in which the compression coil spring 72 for the high speed clutch is large and FIG. 14 shows a case in which the elastic force is small, respectively. Further, in FIGS. 13 through 14, a bold line a shows a hydraulic pressure at a portion of a delivery port of the pressurizing pump 63 (see FIG. 3), a slender line b shows a hydraulic pressure in the hydraulic chamber 60 for the low speed clutch, a broken line c shows a hydraulic pressure in the hydraulic chamber 6 for the high speed clutch, a one-dotted chain lined shows a movement of the low speed clutch 39b (stroke of actuator), and a two-dotted chin line e shows a movement of the high speed clutch 40b, respectively. As is apparent from FIGS. 13 through 14, when the elastic forces of the respective compression coil springs 68, 72 are excessively small, the time period of simultaneously connecting the two clutches 39b, 40b is not provided, however, when the elastic forces of the respective compression coil springs 68, 72 are increased, the time period of simultaneously connecting the two clutches 39b, 40b is provided.

Figure 11:
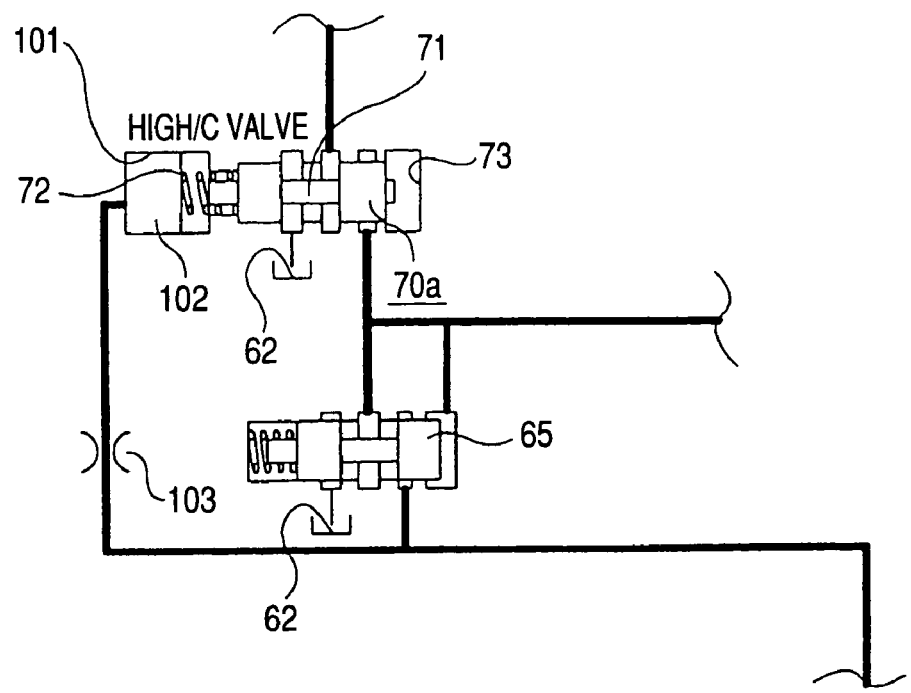
FIG. 11 is a diagram in correspondence with a portion C of FIG. 10 showing a non-running state.

However, when the elastic forces of the respective compression coil springs 68, 72 are simply increased, there poses a new problem that impact is applied in starting the vehicle. That is, in the case in which the manual switch valve 64 is switched from N or P position to any of L, D, R positions in order to start a vehicle which has been in a stationary state, when the elastic forces of the respective coil springs 68, 72 are large as shown by FIG. 11, there is produced the time period of simultaneously connecting the two clutches 39b, 40b although the time period is short. Meanwhile, at a moment of switching the manual switch valve 64 from N or P position to any of N, D, R in order to start the vehicle, the transmission ratio of the toroidal-type continuously variable transmission 24, 24a (FIGS. 1, 30, 31) becomes a transmission ratio pertinent for starting.

Figure 31:
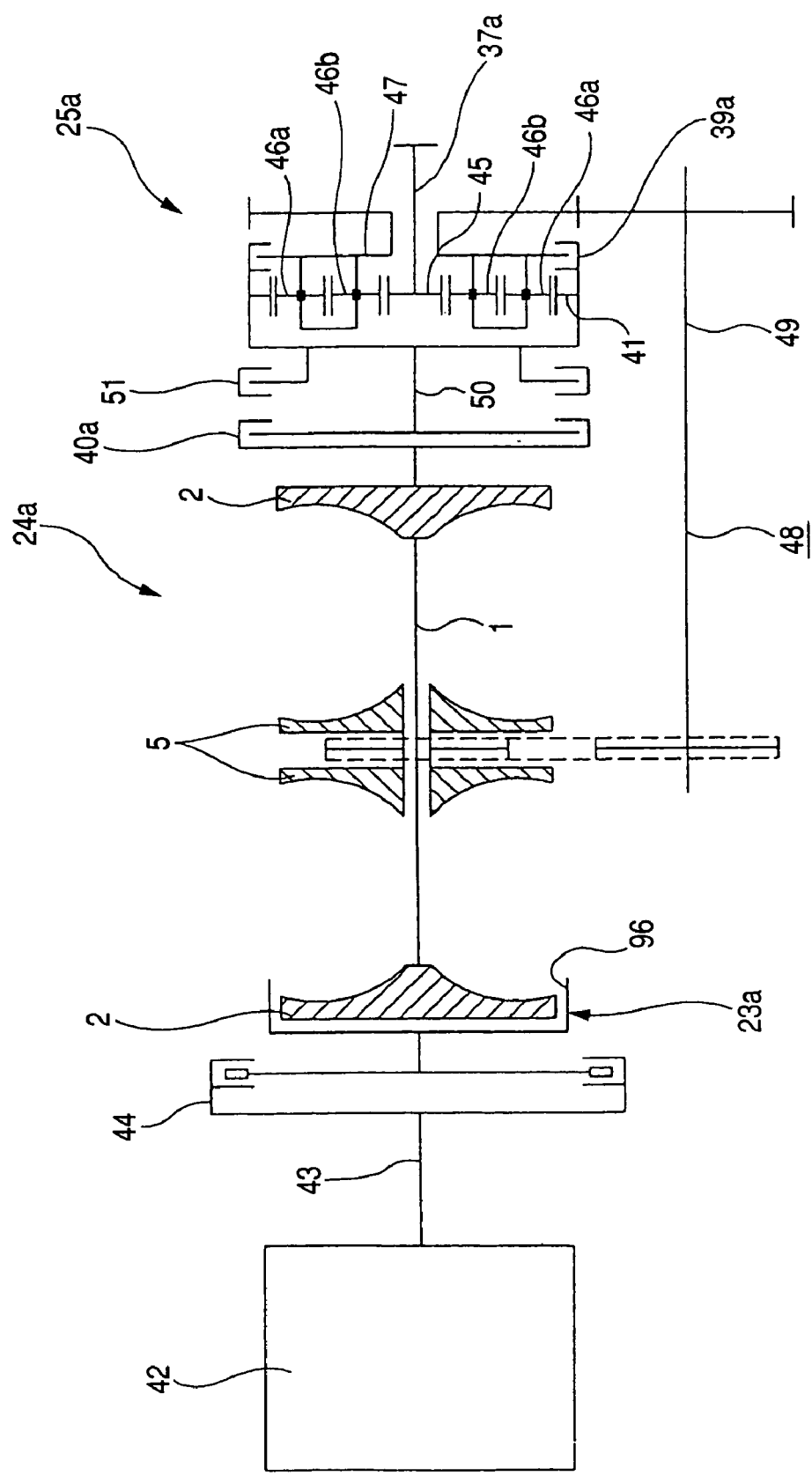
FIG. 31 is an outline sectional view showing a second example of the same.

For example, in the case of the continuously variable transmission apparatus of the geared neutral type shown in FIG. 1, 30, the transmission ratio of the toroidal-type continuously variable transmission 24 is present comparatively on the speed increasing side and in the case of the continuously variable transmission apparatus of the power split type shown in FIG. 31, the transmission ratio of the toroidal-type continuously variable transmission 24a is present on the mostly speed reducing side. Also in the case of either of the continuously variable transmissions, the transmission ratio of the toroidal-type continuously variable transmission 24, 24a in starting significantly differs from that of the state of changing the modes for connecting or disconnecting the two clutches 39b, 40b. When the two clutches 39b, 40b are simultaneously connected under the state even in a short period of time, an excessive force is exerted to each portion of the constitution of the continuously variable transmission apparatus, an impact giving unpleasant feeling to the passenger starting from the driver is brought about and durability of each member of the constitution is reduced.

In contrast thereto, in the case of the embodiment, the elastic force of the compression coil spring 72 for the high speed clutch integrated to the switch valve 70a for the high speed clutch for controlling to introduce the pressurized oil into the hydraulic chamber 61 for the high-speed clutch belonging to the high speed clutch 40b, is increased only in a running state of changing the modes. Conversely, the elastic force of the compression coil spring 72 for the high speed clutch related to the high speed clutch 40b which is not to be connected in starting is made to be small in the non-running state and in switching from the non-running state to starting, the high speed clutch 40b is prevented from being connected. The elastic force of the compression coil spring 68 for the low speed clutch integrated to the switch valve 66 for the low speed clutch for controlling to introduce the pressurized oil into the hydraulic chamber 60 for the low speed clutch belonging to the low speed clutch 39b may stay to be large and therefore, a control mechanism is not particularly provided.

Figure 10:
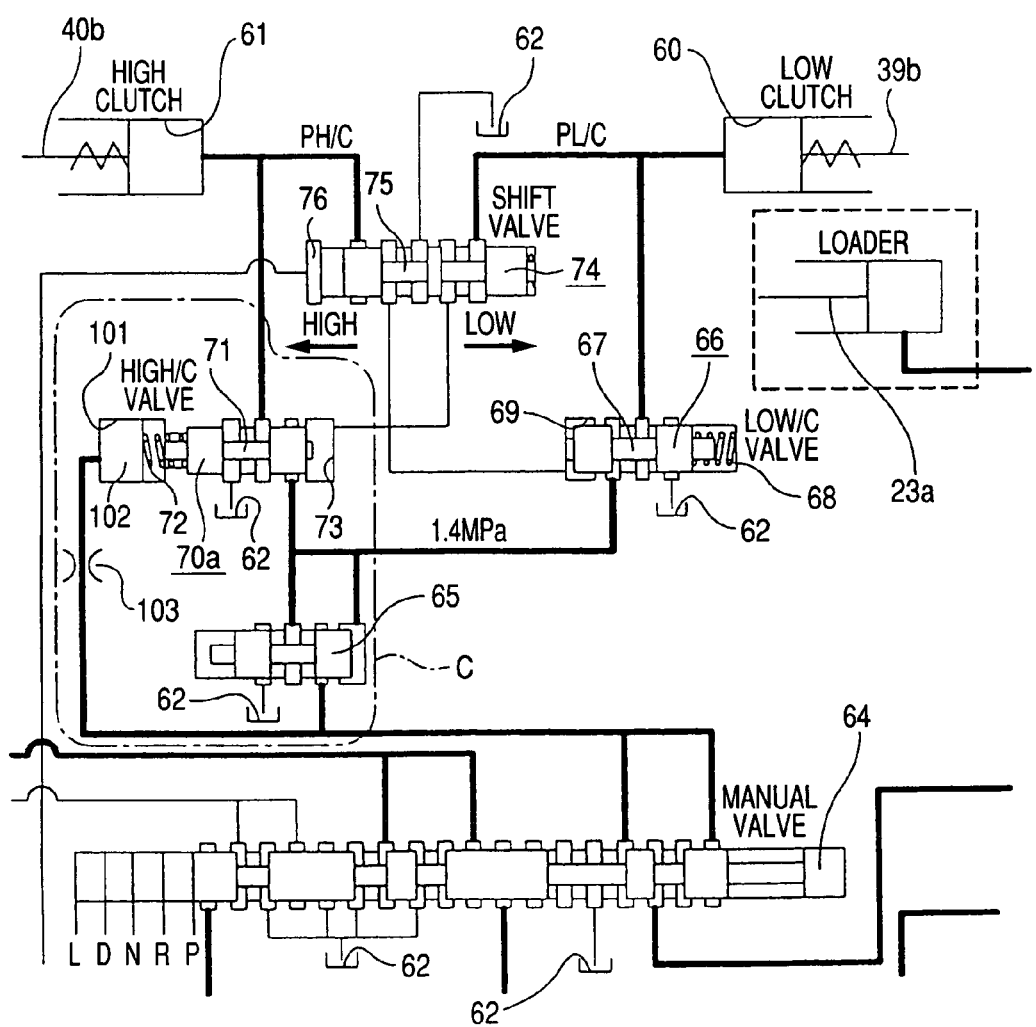
FIG. 10 is a hydraulic circuit diagram in correspondence with a portion B of FIG. 3 showing Embodiment 4 of the invention.
Figure 12:
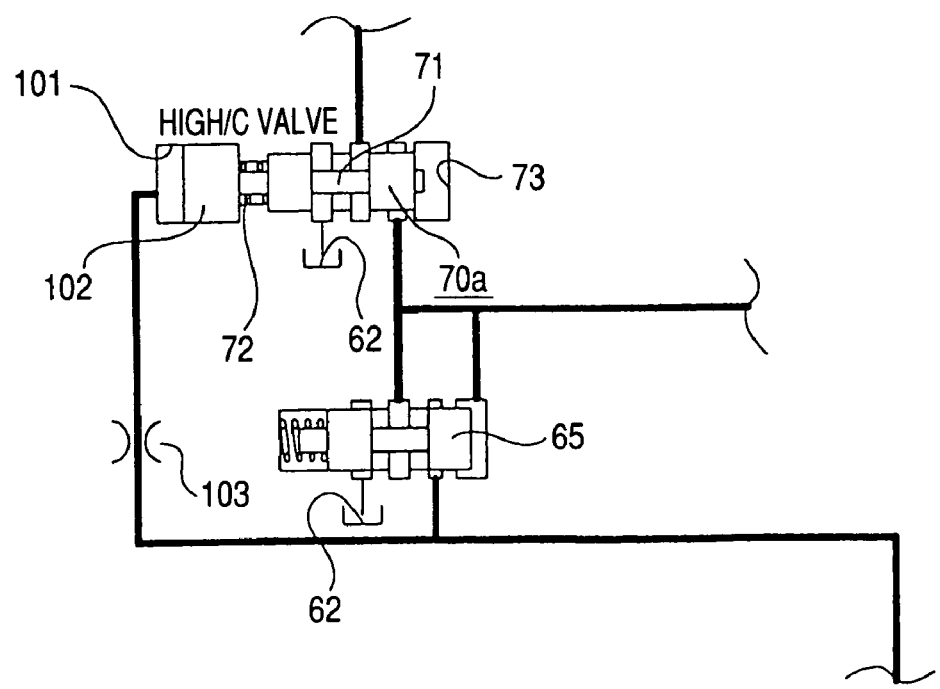
FIG. 12 is a diagram similar to FIG. 11 showing a running state.

In order to control the elastic force of the compression coil spring 72 for the high speed clutch, in the case of the embodiment, a cylinder portion 101 is provided at an end portion of the switch valve 70a for the high speed clutch at a position in the axial direction opposed to the pilot chamber 73 for the high speed clutch by interposing the spool 71 for the high speed clutch and a pressing piston 102 is provided in the cylinder portion 101 displaceably in an axial direction (left and right direction of FIGS. 10 through 12). The length in the axial direction of the cylinder portion 101 is made to be slightly longer than that of the pressing piston 102 and the pressing piston 102 is displaceable in the axial direction by an amount of a difference between the lengths. Further, the compression coil spring 72 for the high speed clutch is arranged between the pressing piston 102 and the spool 71 for the high speed clutch. Further, a portion in the cylinder portion 101 on a side opposed to the spool 71 for the high speed clutch is made to be able to introduce the pressurized oil from the manual switch valve 64 via a throat 103.

That is, the pressurized oil is introduced to the portion in the cylinder portion 101 on the side opposed to the spool 71 for the high speed clutch in the state in which the manual switch valve 64 is switched to the running state (L, D, R position) In contrast thereto, in a state in which the manual switch valve 64 is switched to the non-running state (N, P position), the portion in the cylinder portion 101 on the side opposed to the spool 71 for the high speed clutch is released to the oil storage 62. Further, the throat 103 is provided for delaying a displacement of the pressing piston 102 to for firmly prevent the high speed clutch 40b from being connected in switching the manual switch valve 64 from the non-running state to the running state for starting.

In the case of the embodiment, in order to constitute the switch valve 70a of the high speed clutch as described above, in the non-running state, as shown by FIG. 11, the pressing piston 102 is pressed by the compression coil spring for the high speed clutch to move to an end portion of the cylinder portion 101 on a side remote from the spool 71 for the high speed clutch (left side of FIG. 11). Under the state, the elastic force of the compression coil spring 72 for the high speed clutch is reduced, and even at the moment of switching the manual switching valve 64 from the non-running state (N, P position) to the running state (L, D, R position), as shown by FIG. 14, the high speed clutch 40b is not connected even for a short period of time.

In contrast thereto, in the running state, the pressing piston 102 is moved to an end portion of the cylinder portion 101 on a side of the spool 71 for the high speed clutch (right side of FIG. 12) due to a hydraulic pressure introduced in the cylinder portion 101, as shown in FIG. 12. Under the state, the elastic force of the compression coil spring 72 for the high speed clutch is increased. As a result, in switching, for example, from the high speed made to the low speed mode, the time period of simultaneously connecting the two clutches 39b, 40b is firmly provided. As described above, the elastic force of the compression coil spring 68 for the low speed clutch integrated to the switch valve 66 for the low speed clutch is large and therefore, even in switching from the low speed mode to the high speed mode, the time period of simultaneously connecting the two clutches 39b, 40b can firmly be provided.

Embodiment 5

Figure 15:
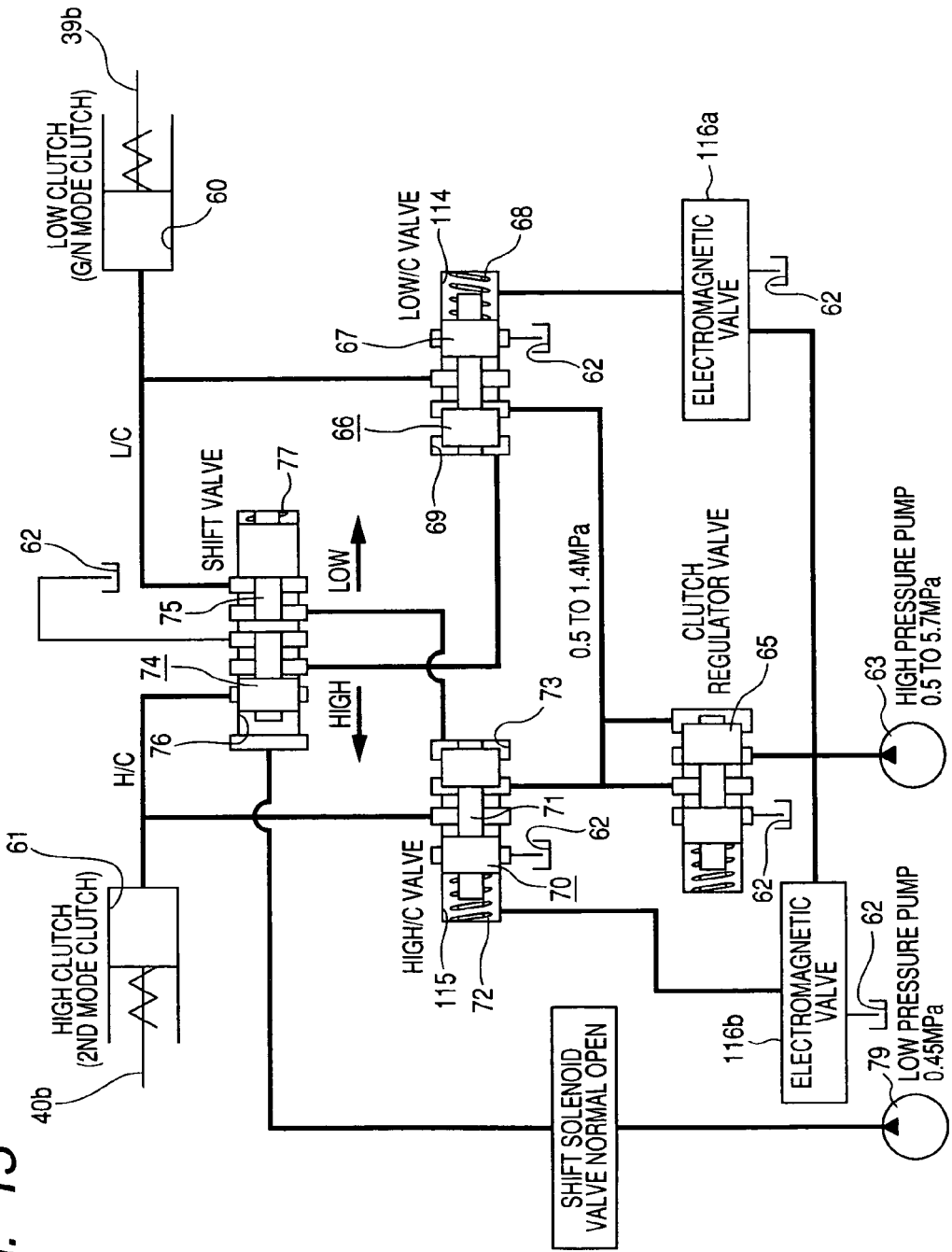
FIG. 15 is a diagram similar to FIG. 8 showing Embodiment 5 of the invention.

FIG. 15 shows Embodiment 5 of the invention. In the case of the embodiment, the two spools 67, 71 for the low speed clutch and for the high speed clutch constituting the two switching valves 66, 70 for the low speed clutch and for the high speed clutch are pressed in a closing direction also by hydraulic pressure introduced into the two reaction force chambers 114, 115 for the low speed clutch and for the high speed clutch in addition to the elastic forces of the compression coil springs 68, 72 respectively for the low speed clutch and for the high speed clutch. Therefore, value opening pressures of the switching valves 66, 70 for the low speed clutch and the high speed clutch, that is, hydraulic pressures necessary for being introduced into the two pilot chambers 69, 73 respectively for the low speed clutch and for the high speed clutch for communicating the hydraulic chamber 60 for the low pressure clutch or the hydraulic chamber 61 for the high pressure clutch to the oil storage 62 are adjustable based on the hydraulic pressures introduced into the two reaction force chambers 114, 115 for the low speed clutch and for the high speed clutch.

In the case of the embodiment, hydraulic pressures constituted by controlling hydraulic pressure at a portion of a delivery port of the pressurizing pump 63 on the high pressure side to predetermined pressures by pressure control valves 116a, 116b of an electric type having a pressure controlling function of an electromagnetic proportional valve or the like are introduced into the two reaction chambers 114, 115 for the low speed clutch and for the high speed clutch. Further, hydraulic pressures controlled by a single pressure control valve may be introduced into the two reaction force chambers 114, 115. The two reaction force chambers 114, 115 are present on sides opposed to the pilot chambers 69, 73 for the low speed clutch and for the high speed clutch in axial directions by interposing the two spools 67, 71 for the low speed clutch and for the high speed clutch and therefore, the higher the hydraulic pressures introduced into the two reaction force chambers 114, 115, the higher the valve opening pressures of the two switching valves 66, 70 for the low speed clutch and for the high speed clutch. The valve opening pressures of the two switching valves 66, 70 are adjusted in view of design by hydraulic pressures introduced into the two reaction force chambers 114, 115 and pressure receiving areas of two end portions of the two spools 67, 71 in axial directions.

Also in the case of the embodiment, there is provided the manual switching valve 64 (refer to FIG. 3) switched to the running mode (running state) and the nonrunning mode (nonrunning state) by the shift lever installed at the driver's seat. Further, when the manual switching valve 64 is switched to the nonrunning mode (nonruning state=P range or N range), pressurized oil is stopped to be introduced into the two reaction force chambers 114, 115. Under the state, the valve opening pressures of the two switching valves 66, 70 for the low speed clutch and for the high speed clutch are lowered. Further, even when the manual switching valve 64 is switched to the running mode (running state=D range or R range) from the state, as is apparent from FIG. 14, mentioned above, only the clutch necessary in the running state at the time point is connected. In other words, also the clutch which is not to be connected in the running state at the time point is not connected. Therefore, by preventing the two clutches 39, 40 for low speed and for high speed from being connected simultaneously at the instance of switching from the nonrunning state to the running state without switching the low speed mode and the high speed mode, an unpleasant feeling can be prevented from being given to a passenger or durabilities of respective constituent portions can be prevented from being deteriorated by bringing about impact.

Further, in the case of the embodiment, reason of not only lowering the valve opening pressure of the switching valve for the high speed clutch but also lowering the valve opening pressure of the switching valve 66 for the low speed clutch when the manual switching valve 64 is brought into the nonrunning state is for considering a case in which the driver selects the nonrunning mode {neutral (N) range} for operational failure or running inertia in running at high speed (although not preferable). In such a case, after selecting the nonrunning mode, when the nonrunning mode is returned to the running mode {drive (D) range} while staying in the running state at high speed, in the case in which the clutch (the clutch 39b for low speed) which is not be connected under the state is connected although the time period is short, the above-described impact is brought about. In contrast thereto, in the case of the embodiment, when the manual switching valve 64 is brought into the nonrunning state, not only the valve opening pressure of the switching valve 70 for the high speed clutch is lowered but also the valve opening pressure of the switching valve 66 for the low speed clutch is lowered and therefore, the above-described impact can be prevented from being applied by preventing the clutch 39b for low speed from being connected when the manual switching valve 64 is returned to the running mode.

Further, there is also conceivable a case in which the manual switching valve 64 is brought into the nonrunning state in running not only in running at high speed but also in running at low speed. Therefore, when the manual switching valve 64 is returned to the running state in running, one clutch of the clutch 39b for low speed and the clutch 40b for high speed is connected in accordance with a vehicle speed (or rotational speed of an engine) at a time point of switching from the nonrunning mode to the running mode. For that purpose, the controller for controlling to connect and disconnect the two clutches 39b, 40b is inputted with a signal indicating the vehicle speed (or the rotational speed of the engine). Further, the controller switches the shifting switch valve 74 by the electromagnetic switching valve 78 (refer to FIG. 3) in accordance with switching from the nonrunning mode to the running mode and connects the clutch 40b for high speed in running at speed (for example, in a case of being equal or faster than 30 km/h) and connects the clutch 39b for low speed in running at low speed (for example, in a case of being less than 30 km/h). The other clutch is made to stay to be in the unconnected state. Even when either of the clutches is connected, in the case of switching to the nonrunning mode as described above, the valve opening pressures of the two switching valves 66, 70 for the low speed clutch and for the high speed clutch are low and therefore, only the necessary clutch is connected and the clutch which is not to be connected is not connected (there is not an instance of simultaneously connecting the two clutches 39b, 40b).

Embodiment 6

Figure 16:
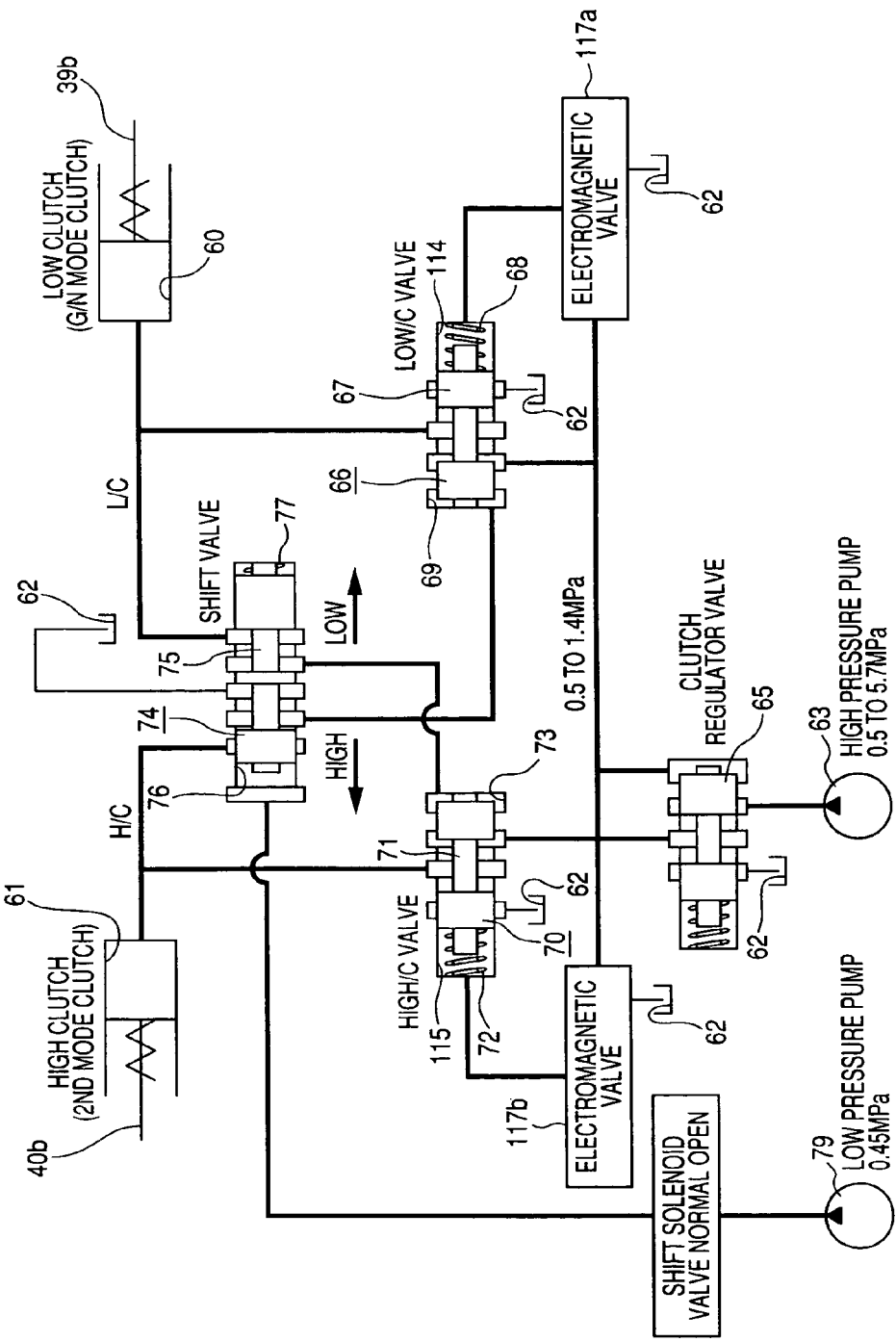
FIG. 16 is a diagram similar to FIG. 8 showing Embodiment 6 of the invention.

FIG. 16 shows Embodiment 6 of the invention. In the case of the embodiment, hydraulic pressure delivered from the pressurizing pump 63 on the high pressure side and lowered by passing the pressure reducing valve 65 is introduced into the two reaction force chambers 114, 115 for the low speed clutch and for the high speed clutch in accordance with releasing electromagnetic valves 117a, 117b. The hydraulic pressure introduced into the two reaction force chambers 114, 115 may be constituted by passing a single electromagnetic valve. Further, although the electromagnetic valve may be a pressure control valve, the electromagnetic valve may be an opening/closing valve for switching only to ON-OFF. The other constitution and operation are similar to those of Embodiment 6, mentioned above.

Embodiment 7

Figure 17:
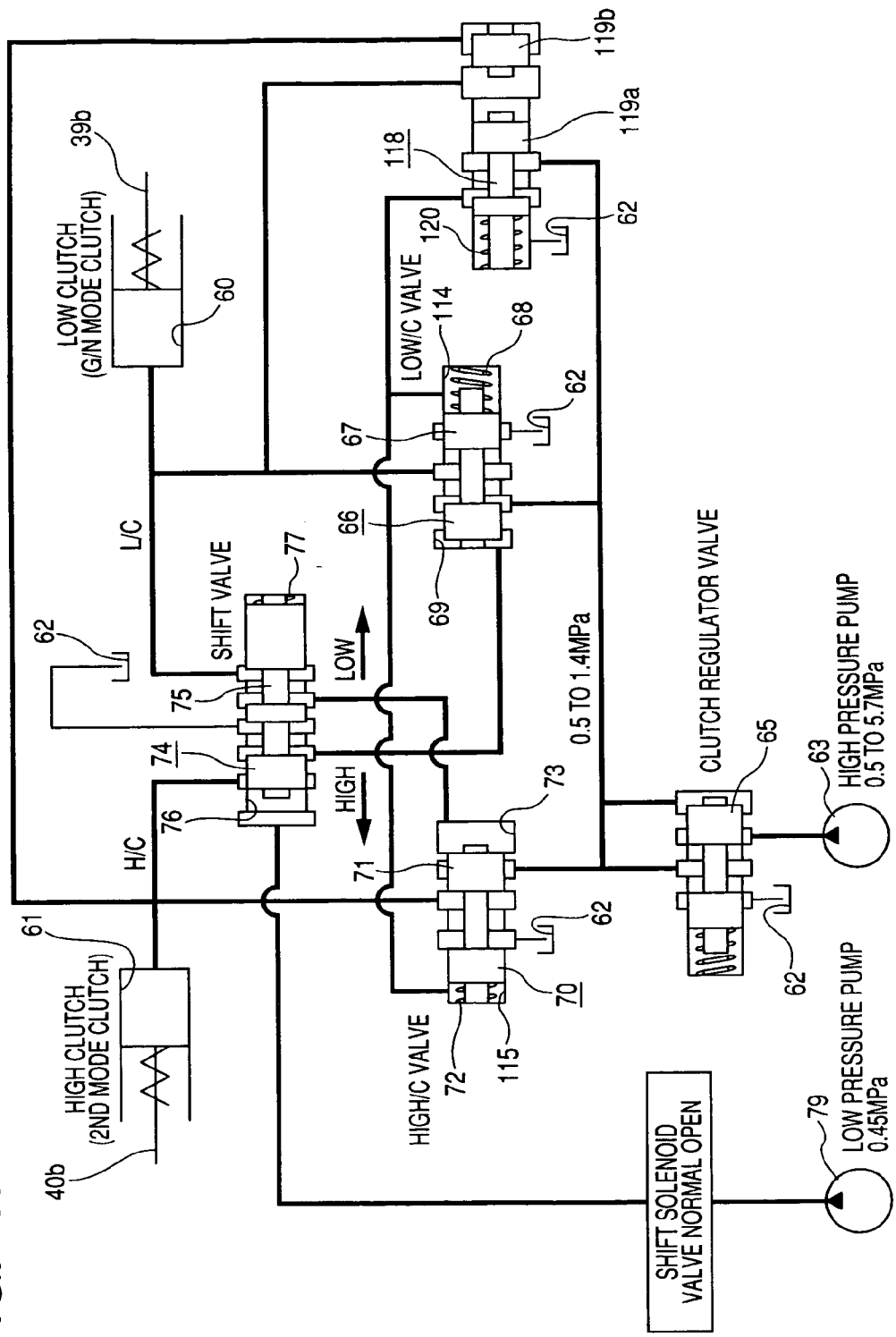
FIG. 17 is a diagram similar to FIG. 8 showing Embodiment 7 of the invention in a low speed mode.
Figure 18:
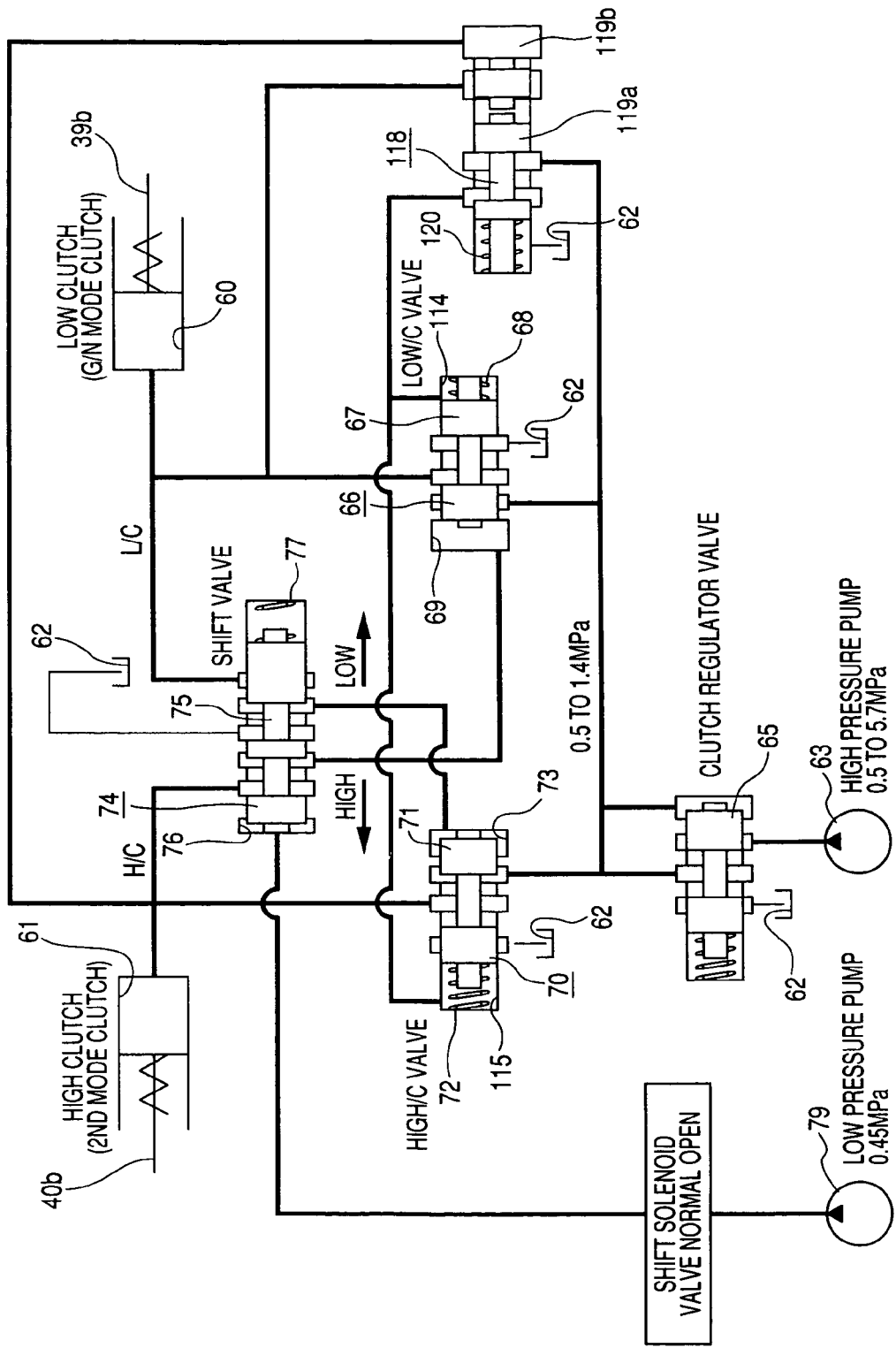
FIG. 18 is a diagram similar to FIG. 17 in a high speed mode.
Figure 19:
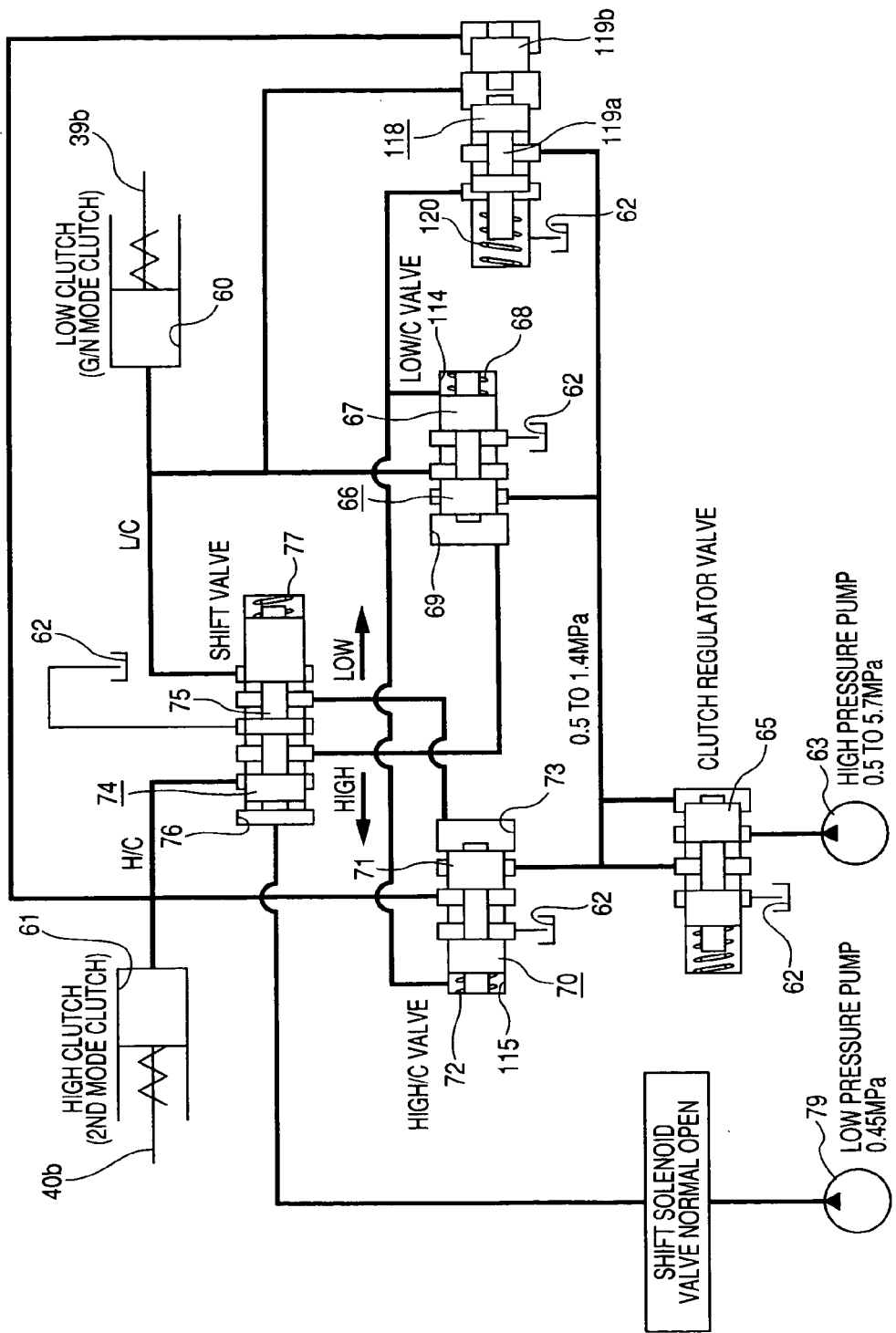
FIG. 19 is a diagram similar to FIG. 17 in an untraveling mode.

FIGS. 17 through 19 show Embodiment 7 of the invention. Also in the case of the embodiment, similar to Embodiment 6, mentioned above, the hydraulic pressure delivered from the pressurizing pump 63 on the high pressure side and lowered by passing the pressure reducing valve 65 is introduced into the two reaction force chambers 114, 115 for the low speed clutch and for the high speed clutch provided at the two switching valves 66, 70 for the low speed clutch and for the high speed clutch. However, in the case of the embodiment, the introduction is constituted to carry out purely hydraulically. That is, in the case of the embodiment, when the manual switching valve 64 (refer to FIG. 3) selects the running state (running mode) by the shift lever installed at the driver's seat, so far as there are present hydraulic pressures in the hydraulic chambers 60, 61 for the clutches belonging to the connected clutches of the clutch 39b for low speed and the clutch 40b for high speed, hydraulic pressure adjusted to a predetermined pressure by the pressure reducing valve 65 is constituted to introduce into the two reaction chambers 114, 115 for the low speed clutch and for the high speed clutch via a hydraulic pressure introducing valve 118 switched hydraulically.

The above-described hydraulic pressure introducing valve 118 is provided with a pair of spools 119a, 119b which are movable remotely and proximately and a single piece of compression coil spring 120.

In the low speed mode, when hydraulic pressure is present at inside of the hydraulic chamber 60 and hydraulic pressure is not present in the hydraulic chamber 61 for the high speed clutch, according to the hydraulic pressure introducing valve 118, as shown by FIG. 17, the two spools 119a, 119b are displaced in directions of being remote from each other. Under the state, hydraulic pressure controlled to the predetermined pressure by the pressure reducing valve 65 is introduced into the two reaction chambers 114, 115 for the low speed clutch and for the high speed clutch by passing the hydraulic pressure introducing valve 118. Therefore, the valve opening pressures of the two switching valves 66, 70 for the low speed clutch and for the high speed clutch, that is, hydraulic pressures necessary for being introduced to the two pilot chambers 69, 73 respectively for the low speed clutch and for the high speed clutch for communicating the hydraulic chamber 60 for the low speed clutch or the hydraulic chamber 61 for the high speed clutch to the oil storage 62 is increased. As a result, in switching from the low speed mode to the high speed mode, an instance of simultaneously transmitting power by the clutch 39b for low speed and the clutch 40b for high speed can firmly be realized.

Further, in the high speed mode, when hydraulic pressure is present in the hydraulic chamber 61 for the high speed clutch and hydraulic pressure is not present in the hydraulic chamber 60 for the low speed clutch, according to the hydraulic pressure introducing valve 118, as shown by FIG. 18, the two spools 119a, 119b are displaced against the compression coil spring 120 in a state of butting the two spools 119a, 119b. Also under the state, hydraulic pressure controlled to the predetermined pressure by the pressure reducing valve 65 is introduced into the two reaction force chambers 114, 115 for the low speed clutch and for the high speed clutch by passing the hydraulic pressure introducing valve 118. Therefore, the valve opening pressures of the two switching valves 66, 70 for the low speed clutch and for the high speed clutch, that is, hydraulic pressures necessary for being introduced into the two pilot chambers 69, 73 respectively for the low speed clutch and for the high speed clutch for communicating the hydraulic chamber 60 for the low speed clutch or the hydraulic chamber 61 for the high speed clutch to the oil storage 62 is increased. As a result, in switching from the high speed mode to the low speed mode, an instance of simultaneously transmitting power by the clutch 39b for low speed and the clutch 40b for high speed can firmly be realized.

In contrast thereto, when the manual switching valve 64 selects the nonunning state (nonrunning mode) and hydraulic pressure is not present in either of the two hydraulic chambers 60, 61 for the low speed clutch and for the high speed clutch, according to the hydraulic pressure introducing valve 118, as shown by FIG. 19, the two spools 119a, 119b are displaced (to the right side of FIG. 19) based on the compression coil spring 120 in a state of butting the two spools 119a, 119b. Under the state, the two reaction force chambers 114, 115 for the low speed clutch and for the high speed clutch are communicated to the oil storage 62 and the valve opening pressures of the two switching valves 66, 70 for the low speed clutch and for the high speed clutch are lowered. As a result, in switching from the nonrunning state to the running state, the clutch which is not to be connected under the state is prevented from being connected although time interval is short and the impact can be prevented from being brought about.

Constitutions of operation of the other portions are similar to those of Embodiments 5, 6, mentioned above.

Embodiment 8

Figure 20:
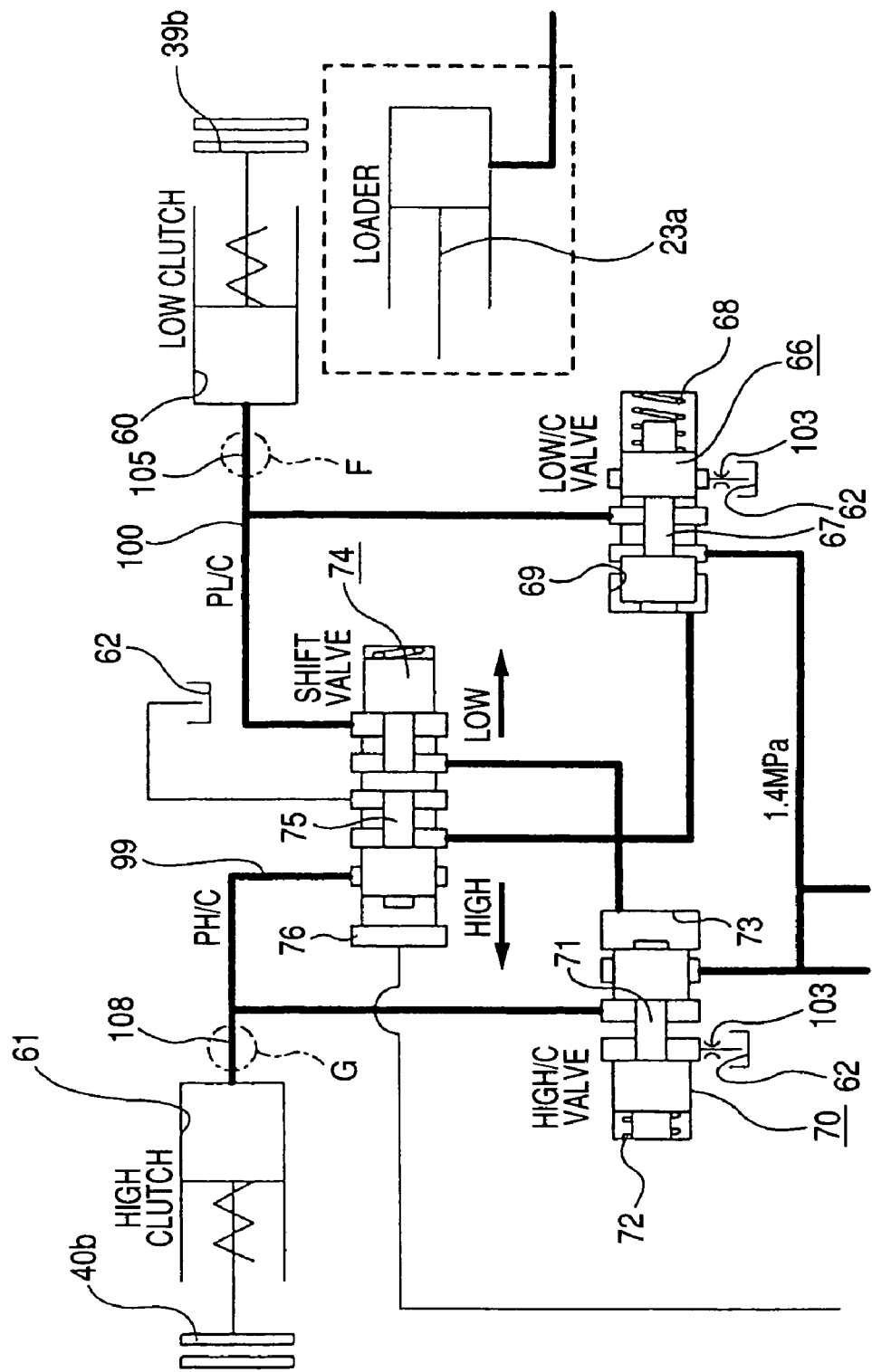
FIG. 20 is a diagram similar to FIG. 9 showing Embodiment 8 of the invention.

Next, FIG. 20 shows Embodiment 8 of the invention. In the case of the embodiment, there are provided throats 103 of orifices, throttle valves, capillary tubes or the like respectively between the switch valve 66 for the low speed clutch and the oil storage 62 and between the switch valve 70 for the high speed clutch and the oil storage 62. In the case of the embodiment, by such a constitution, the shifting switch valve 74 is switched and the clutch which has been disconnected is finished to connect before disconnecting the clutch which has been connected.

For example, an explanation will be given of a state immediately after the shifting switch valve 74 is switched to a state shown in FIG. 20 and the two switch valves 66, 70 for the low speed clutch and the high speed clutch are switched to a state shown in the drawing in accordance therewith. Under the state, the pressurized oil passing the pressure reducing valve 65 (refer to FIG. 3) is delivered into the hydraulic chamber 60 for the low speed clutch while passing the switch valve 66 for the low speed clutch without particularly undergoing a resistance to connect the low speed clutch 39b in an extremely short period of time. Meanwhile, the pressurized oil in the hydraulic chamber 61 for the high speed clutch passes the switch valve 70 for the high speed clutch and undergoes a resistance by the throat 103 to be gradually discharged to the oil storage 62.

Therefore, a time period required until disconnecting the high speed clutch 40b is longer than a time period required until connecting the low speed clutch 39b. As a result, the low speed clutch 39b which has been disconnected is finished to connect before disconnecting the high speed clutch 40b which has been connected. When the switching switch valve 74 is switched reversely to the state shown in FIG. 20, the embodiment is similarly operated other than reversing connection and disconnection of the two clutches 39b, 40b, and the high speed clutch 40b which has been disconnected is finished to connect before disconnecting the low speed clutch 39b which has been connected. Therefore, similar to the above-described cases of Embodiments 1 through 7, the torque shift produced in switching the modes can be alleviated. Further, in the case of the embodiment, a structure for simultaneously connecting the two clutches 39b, 40b for a short period of time is realized by simply adding the throat and therefore, a structure facilitated to control and difficult to fail can be realized at low cost. Constitution and operation of other portions are similar to those of Embodiment 1 shown in FIGS. 1 through 7 and therefore, a duplicated explanation will be omitted.

Embodiment 9

Figure 21:
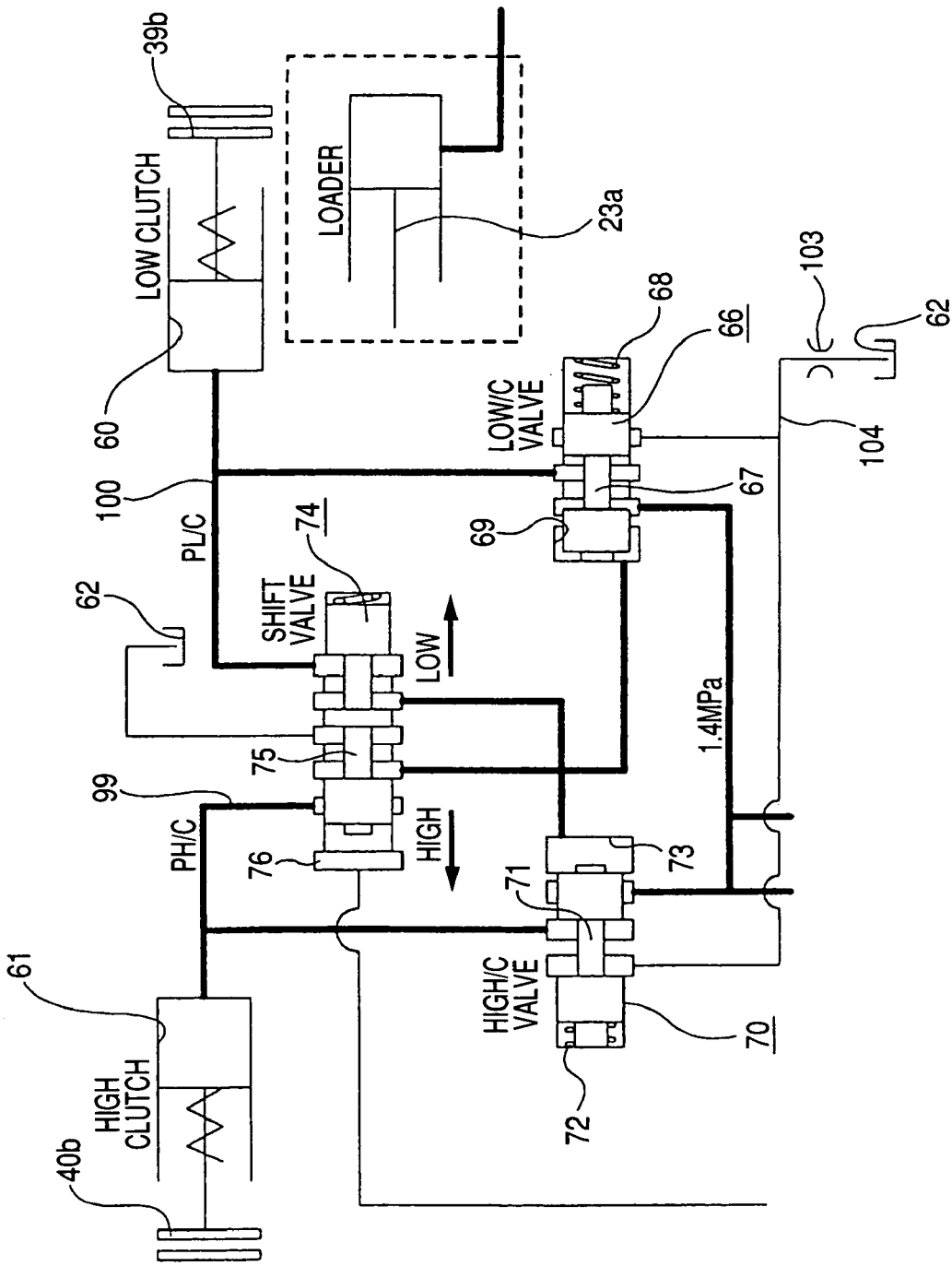
FIG. 21 is a diagram similar to FIG. 9 showing Embodiment 9 of the same.

FIG. 21 shows Embodiment 9 of the invention. In the case of the embodiment, a single hydraulic pressure discharge path 104 is constituted by merging a downstream portion of a hydraulic pressure discharge path on a side of the low speed clutch connecting the switch valve 66 for the low speed clutch and the oil storage 62 and a downstream portion of a hydraulic pressure discharge path on a side of the high speed clutch connecting the switch valve 70 for the high speed clutch and the oil storage 62. Further, a single throat 103 is provided at a portion of the single hydraulic pressure discharge path 104.

In the case of the embodiment having such a constitution, when the switch valve 66 for the low speed clutch or the switch valve 70 for the high speed clutch is switched to a state of communicating the hydraulic chamber 60 for the low speed clutch or the hydraulic chamber 61 for the high speed clutch to the oil storage 62 based on switching of the shifting switch valve 74, the pressurized oil in the hydraulic chamber is discharged to the oil storage 62 via the single throat 103.

In the case of the embodiment, the oil pressures in the two hydraulic pressure chambers 60, 61 can gradually be reduced by the single throat 103 and small-sized and light-weighed formation can be achieved by reducing cost by reducing a number of parts and a number of integrating steps and an installation space.

Embodiment 10

Figure 22:
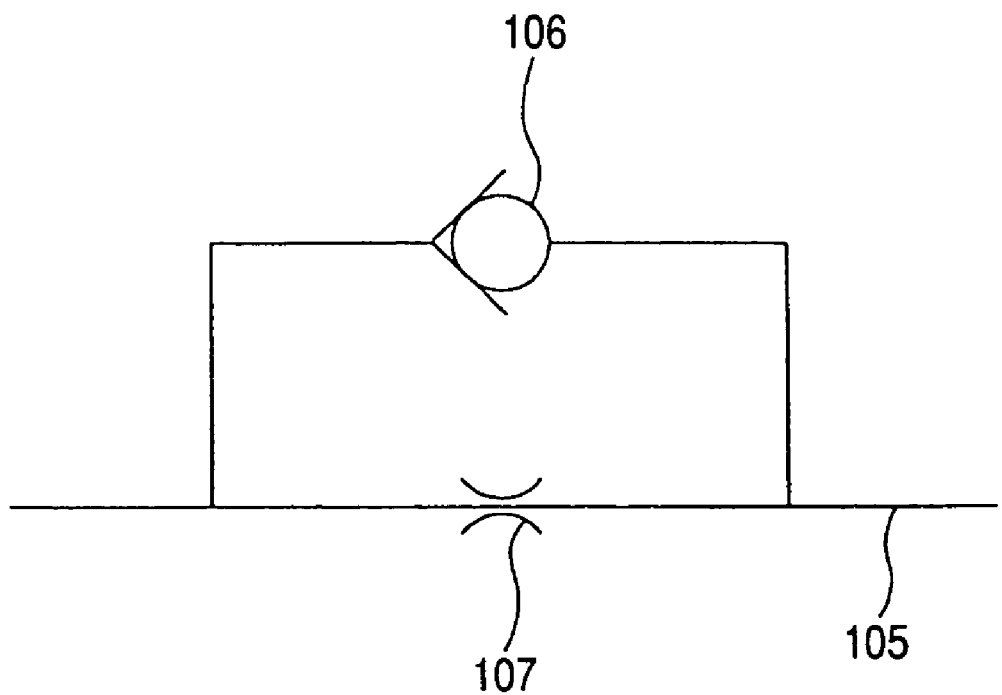
FIG. 22 is a diagram in correspondence with a portion F of FIG. 20 showing Embodiment 10 of the invention.

FIG. 22 shows Embodiment 10 of the invention. In the case of the embodiment, at a vicinity of the hydraulic chamber 60 for the low speed clutch or the hydraulic chamber 61 for the high speed clutch as in a portion F or a portion G of FIG. 13, a structure of a portion of a hydraulic path for charging and discharging a pressurized oil to and from each of the hydraulic chambers 60, 61 is devised. Specifically, instead of smoothly delivering the pressurized oil into the respective hydraulic chambers 60, 61, the hydraulic pressure is gradually discharged from the respective hydraulic chamber 60, 61.

For example, at a portion at a vicinity of the hydraulic chamber 60 for the low speed clutch (F portion of FIG. 20) and constituting a single low pressure side hydraulic path 105 by merging a low speed clutch side pressure introducing path (a second pressure introducing path 100) and a low speed clutch side pressure discharging path, a low speed clutch side check valve 106 which is opened in introducing the hydraulic pressure into the hydraulic chamber 60 for the low speed clutch and closed in discharging the hydraulic pressure from the hydraulic chamber 60 for the low speed clutch and a low speed clutch side throat 107 are provided in parallel with each other. Further, also at a portion at a vicinity of the hydraulic chamber 60 for the high speed clutch and constituting a single high pressure side hydraulic pressure path 108 (G portion of FIG. 13) by merging a high speed clutch side pressure introducing path (a first pressure introducing path 99) and a high speed clutch side pressure discharging path, a high speed clutch side check valve which is opened in introducing the hydraulic pressure into the hydraulic chamber 61 for the high speed clutch and closed in discharging the hydraulic pressure from the hydraulic chamber 61 for the high speed clutch and a high speed clutch side throat (not illustrated) are provided in parallel with each other.

Also in the case of the embodiment constituted in this way, a time period of simultaneously transmitting the power by the two clutches 39b, 40b can be produced for a short period of time by prolonging a time period required for switching the two low speed and high speed clutches 39b, 40b (refer to FIG. 20) from the connected state to the non-connected state by a simple structure.

Embodiment 11

In Embodiment 8 shown in FIG. 20 or Embodiment 9 shown in FIG. 21, in place of the throat 103, an electric valve of an electromagnetic valve or the like for cutting flow of the pressurized oil passing the two hydraulic pressure discharge paths on the side of the low speed clutch and on the side of the high speed clutch by a desired period of time can also be provided. In switching the modes, by making the electric valve closed for a short period of time (for example, about 0.5 through 2 seconds), a time period required for reducing the hydraulic pressure in the hydraulic chamber with regard to the clutch which has been connected is ensured and the time period of simultaneously connecting the two clutches is produced for a short period of time.

In embodying Embodiment 11, the electric valve is controlled to open and close in accordance with one kind or two or more kinds of requirements selected from a situation of running the vehicle, that is, a vehicle speed, an accelerator opening degree, an acceleration degree, a deceleration degree, the torque passing the toroidal-type continuously variable transmission and the like. When the time period of cutting flow of the pressurized oil passing the hydraulic pressure discharging path by the electric valve is controlled in accordance with the situation of running the vehicle, the impact brought about in changing speed can further be alleviated by further finely connecting and disconnecting the two clutches.

Embodiment 12

FIGS. 23 through 25B show Embodiment 12 of the invention. In the case of the embodiment, the structures of the switching valve 66a for the low speed clutch and the switching valve 70b for the high speed clutch are made to differ from those of Embodiment 1 shown in FIGS. 1 through 7, mentioned above. Further, the above-described respective switching valves 66a, 70b are switched as desired regardless of variations in hydraulic pressures introduced into the respective pilot chambers 69a, 73a for the low speed clutch and the high speed clutch of the respective switch valves 66a, 70b.

For that purpose, in the case of the embodiment, the pilot chamber 69a for the low speed clutch and the reaction force chamber 109 for the low speed clutch are provided at two end portions of the switching valve 66a for the low speed clutch in a state of interposing the spool 67a for the low speed clutch from the both sides in the axial direction. Further, pressurized oil delivered from the pressure reducing valve 65 is introduced into the reaction force chamber 109 for the low speed clutch. In contrast thereto, a portion of pressurized oil delivered from the pressure reducing valve 65 and supplied into the pilot chamber 61 for the high speed clutch of the clutch 40b for high speed via the switching valve 70b for the high speed clutch in accordance with switching of the shifting switching valve 74 is delivered into the pilot chamber 69a for the low speed clutch. When a pressure receiving area $S_{L1}$ of the spool 67a for the low speed clutch on a side of the pilot chamber 69a for the low speed clutch and a pressure receiving area $S_{L2}$ of the spool 67a for the low speed clutch on a side of the reaction force chamber 109 of the low speed clutch are compared, the pressure receiving area on the side of the pilot chamber 69a for the low speed clutch is larger ($S_{L1} > S_{L2}$). Specifically, a ratio of the pressure receiving area $S_{L2}$ on the side of the reaction force chamber 109 for the low speed clutch to the pressure receiving area $S_{L1}$ on the side of the pilot chamber 69a for the low speed clutch is made to be equal to or larger than 0.4 and less than 1 ($0.4 \leq S_{L2}/S_{L1} < 1$). Further, inside of the reaction force chamber 109 for the low speed clutch is provided with the rattle preventing spring 111 of a compression coil spring or the like, the spool 67a for the low speed clutch is lightly pressed to the side of the hydraulic chamber 69a for the low speed clutch. An elastic force of the rattle preventing spring 111 is made to be a small value to a degree of preventing rattle of the spool 67a for the low speed clutch regardless of vibration or the like accompanied by running.

Figure 23:
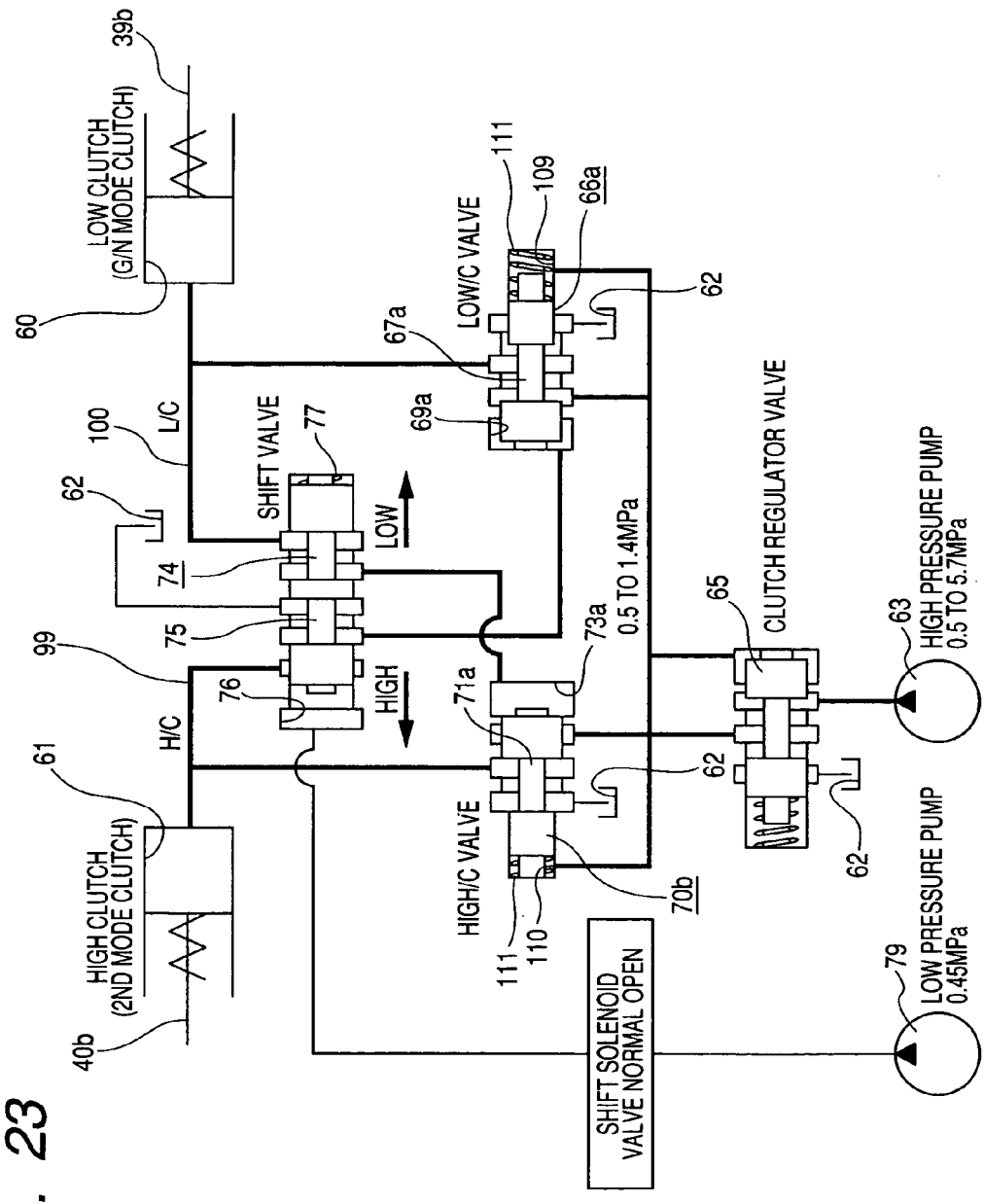
FIG. 23 is a hydraulic circuit diagram in correspondence with a portion A of FIG. 3 showing Embodiment 3 of the invention.

Operation of the switching valve 66a for the low speed clutch having the above-described constitution is as follows. First, when the shifting switch valve 74 is switched to the low speed mode state as shown by FIG. 23, the pilot chamber 69a for the low speed clutch communicates with the oil storage 62 and hydraulic pressure is introduced only to the reaction force chamber 109 for the low speed clutch. As a result, the spool 67a for the low speed clutch is moved to a left end as shown by FIG. 23, and pressurized oil delivered from the pressure reducing valve 65 is delivered into the hydraulic chamber 60 for the low speed clutch of the clutch 39b for low speed. In contrast thereto, when the shifting switch valve 74 switched to the high speed mode state, contrary to the state shown in FIG. 23, pressurized oil is supplied to the hydraulic chamber for the high speed clutch of the clutch 40b for high speed in accordance with switching of the switching valve 70b for the high speed clutch, mentioned below. Further, a portion of the pressurized oil is delivered to the pilot chamber 69a for the low speed clutch via the shifting switch valve 74.

As described above, the pressure receiving area of the spool 67a for the low speed clutch is larger on the side of the pilot chamber 69a for the low speed clutch and smaller on the side of the reaction force chamber 109 for the low speed clutch and therefore, the spool 67a for the low speed clutch is moved to a right end contrary to the state shown in FIG. 23. As a result, the hydraulic chamber for the low speed clutch communicates with the oil storage 62 and connection of the clutch 39b for low speed is disconnected. At this occasion, an instance of disconnecting connection of the clutch 39b for low speed is slightly retarded from an instance of connecting the clutch 40b for high speed similar to the case of Embodiment 1, mentioned above.

Further, the pilot chamber 73a for the high speed clutch and the reaction chamber 110 for the high speed clutch are provided at both end portions of switching valve 70b for the high speed clutch in a state of interposing the spool 71a for the high speed clutch from both sides in the axial direction. Further, pressurized oil delivered from the pressure reducing valve 65 is introduced into the reaction chamber 110 for the high speed clutch. In contrast thereto, a portion of pressurized oil delivered from the pressure reducing valve 65 and supplied into the hydraulic chamber 60 for the low speed clutch of the clutch 39b via the switching valve 66a for the low speed clutch in accordance with switching of the shifting switch valve 74 is delivered into the pilot chamber 73a for the high speed clutch. When a pressure receiving area $S_{H1}$ of the spool 71a for the high speed clutch on a side of the pilot chamber 73a for the high speed clutch and a pressure receiving area $S_{H2}$ of the spool 71a for the high speed clutch on a side of the reaction force chamber 110 for the high speed clutch are compared, the pressure receiving area on the side of the pilot chamber 73a for the high speed clutch is larger ($S_{H1} > S_{H2}$). Specifically, a ratio of the pressure receiving area $S_{H2}$ on the side of the reaction chamber 110 for the high speed clutch to the pressure receiving area $S_{H1}$ on the side of the pilot chamber 73a for the high speed clutch is made to be equal to or larger than 0.4 and less than 1 ($0.4 \leq S_{H2}/S_{H1} < 1$). Further, also inside of the reaction chamber 110 for the high speed clutch is provided with the rattle preventing spring 111 of a compression coil spring or the like similar to the reaction force chamber 109 for the low speed clutch.

Operation of the switching valve 70b for the high speed clutch having the above-described constitution is as follows. First, when the shifting switch valve 74 is switched to the high speed mode state contrary to the state shown in FIG. 23, the pilot chamber 73a for the high speed clutch communicates with the oil storage 62 and hydraulic pressure is introduced only to the reaction force chamber 110 for the high speed clutch. As a result, the spool 71a for the high speed clutch is moved to a right end contrary to the state shown in FIG. 23 and pressurized oil delivered from the pressure reducing valve 65 is delivered into the hydraulic chamber 61 for the high speed clutch of the clutch 40b for high speed. In contrast thereto, when the shifting switch valve 74 is switched to the low speed mode state as shown by FIG. 23, pressurized oil is supplied to the hydraulic chamber 60 of the clutch 39b for low speed in accordance with switching of the switching valve 66a for the low speed clutch. Further, a portion of the pressurized oil is delivered to the pilot chamber 73a for the high speed clutch via the shifting switch valve 74.

As described above, the pressure receiving area of the spool 71a for the high speed clutch is larger on the side of the pilot chamber 73a for the high speed clutch and smaller on the side of the reaction force chamber 110 for the high speed clutch and therefore, the spool 71a for the high speed clutch is moved to a left end as shown by FIG. 23. As a result, the hydraulic chamber 61 for the high speed clutch communicates with the oil storage 62 and connection of the clutch 40b for high speed is disconnected. At this occasion, an instance of disconnecting connection of the clutch 40b for high speed is slightly retarded from an instance of connecting the clutch 39b for low speed similar to the case of Embodiment 1, mentioned above.

In the case of the embodiment constituted as described above, a basic constitution is similar to that of Embodiment 1, mentioned above. A difference therebetween resides in that whereas in the case of Embodiment 1, the forces for pressing the respective spools 67a, 71a for the low speed clutch and for the high speed clutch constituting the respective switching valves 66a, 70b for the low speed clutch and for the high speed clutch are provided from the respective compression coil springs 68, 72 (refer to FIG. 3) for the low speed clutch and for the high speed clutch, in the case of the embodiment, the forces are provided by hydraulic pressures introduced into the respective reaction force chambers 109, 110 for the low speed clutch and for the high speed clutch. By adopting such a constitution, in the case of the embodiment, regardless of variations in the hydraulic pressures, switching of the switching valve 66a for the low speed clutch and the switching valve 70b for the high speed clutch can firmly be carried out. An explanation will be given of the difference in reference to FIGS. 24 through 25.

Figure 24A:
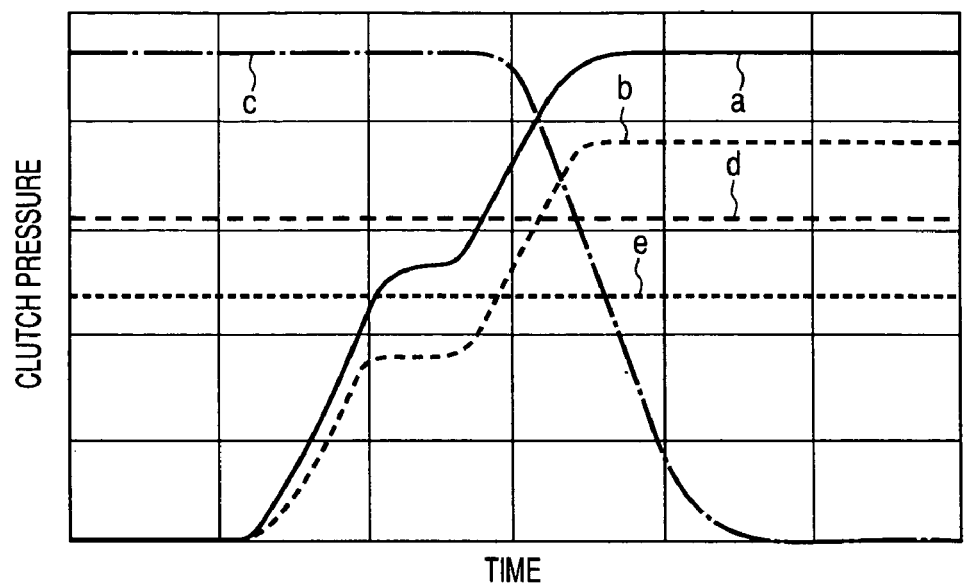
FIGS. 24A and 24B are diagrams showing pressure of each portion when switching the clutch.
Figure 24B:
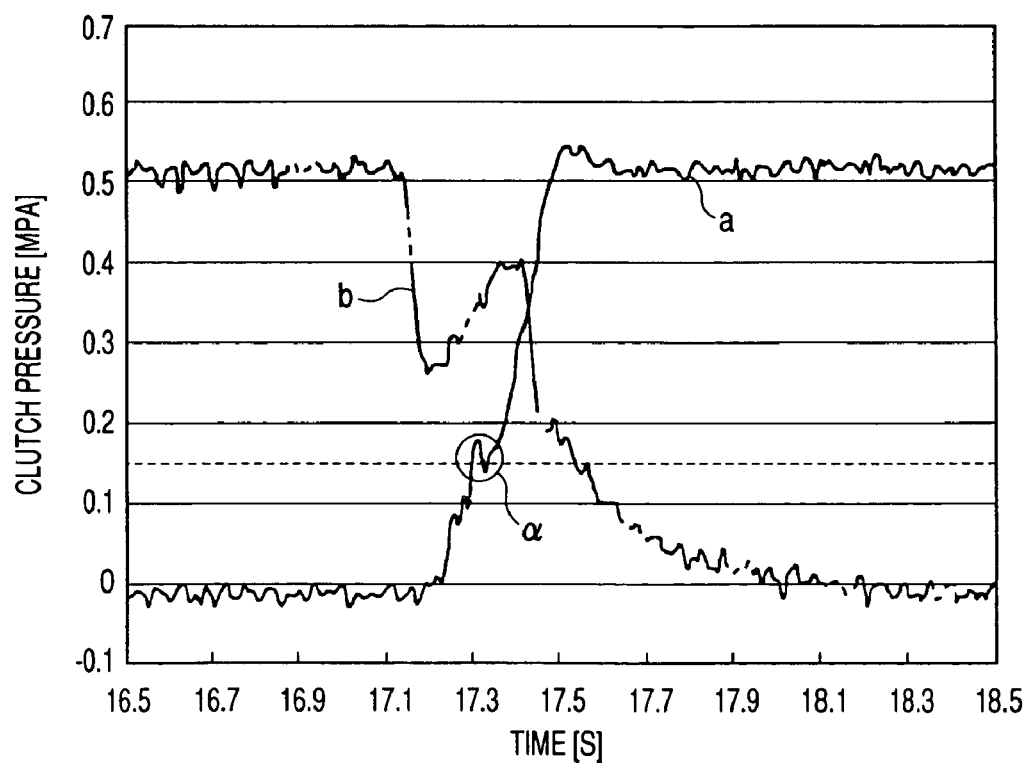

FIGS. 24A and 24B shows changes in hydraulic pressures in the respective hydraulic chambers 60, 61 for the low speed clutch and for the high speed clutch in switching the mode. FIG. 24A shows a theoretical curve and FIG. 24B shows an actually measured result, respectively. In switching the mode, in accordance with switching the shifting switch valve 74, hydraulic pressure of the hydraulic chamber which has been communicated with the oil storage 62 starts to rise as shown by a bold line a, simultaneously with introducing the hydraulic pressure into the hydraulic chamber of either one of the clutches which has not been connected, the hydraulic pressure is introduced into the pilot chamber of the switching valve for the clutch for disconnecting the other clutch which has been connected. However, the rise of the hydraulic pressure in the pilot chamber becomes stagnant (temporarily lowered as shown by α of FIG. 24B) during a time period of displacing a constituent member of the clutch for connecting either one of the clutches which has not been connected.

Further, when the constituent member of either one of the clutches which has not been connected finishes to displace, hydraulic pressure introduced into the pilot chamber further rises and the hydraulic pressure introduced into the pilot chamber becomes larger than a predetermined pressure shown by a broken line b in FIG. 24A, the spool for the clutch starts displacing. The predetermined pressure is a product of a pressure P of the pressurized oil delivered from the pressure reducing valve 65 by a ratio of the pressure receiving area of the spool for the clutch on the side of the reaction force chamber to the pressure receiving area on the side of the pilot chamber ($P \cdot S_{L2}/S_{L1}$ or $P \cdot S_{H2}/S_{H1}$). In this way, when the spool for the clutch with regard to either one of the clutches which has not been connected is displaced and the either one of the clutches starts to be connected, the hydraulic chamber for the clutch with regard to other of the clutches which has been connected is made to communicate with the oil storage 62, hydraulic pressure in the hydraulic chamber for the clutch with regard to other of the clutches which has been connected starts to be lowered as shown by a chain line c of FIG. 24A, and connection of the other of the clutches is disconnected. Further, in the actual case, hydraulic pressure in the hydraulic chamber for the clutch with regard to other of the clutches is temporarily lowered and thereafter rises and starts to lower again as shown by a chain line c in FIG. 24B. The reason of lowering the hydraulic pressure in the hydraulic chamber for the clutch with regard to other of the clutches temporarily in this way is that pressurized oil is consumed for displacing the constituent member of one of the clutches.

At any rate, as is apparent from the bold lines a and chain lines c of FIGS. 24A and 24B, in connecting and disconnecting the one and the other clutches, there is present an instance of connecting the both clutches. Therefore, as is apparent from the explanation of a portion of Embodiment 1, mentioned above, unpleasant feeling is not given to a passenger including a driver by bringing about speed changing shock or the like in switching the mode. Further, since there is not present the instance in which both of the clutches are not connected, the rotational speed of the engine under a no load state does not rise rapidly (over rotated). Further, such a rapid rise of the rotational speed of the engine brings about large impact at an instance of connecting either of the clutches thereafter, gives unpleasant feeing to a passenger and causes to deteriorate durabilities of respective constituent members of the continuously variable transmission apparatus. According to the invention including the embodiment, such a drawback is not brought about.

Further, in the case of the embodiment, even when hydraulic pressure of pressurized oil delivered from the pressure reducing valve 65 is varied by some cause, the respective clutches can firmly be connected and disconnected. That is, regardless of a variation in the hydraulic pressure, after connecting the clutch which has not been connected, connection of the clutch which has been connected can be disconnected. For example, as a result of lowering the hydraulic pressure, hydraulic pressure introduced into the hydraulic chamber with regard to one of the clutches is changed from the bold line a to a broken line d, the predetermined pressure of starting to displace the spool for the clutch with regard to one of the clutches is lowered to the position of a broken line e from the position of the broken line b of FIG. 24A. Further, the two clutches can be connected and disconnected similar to a case in which the hydraulic pressure is not lowered. In this respect, in the case of the embodiment, reliability can be improved in comparison with a case of Embodiment 1, mentioned above, in which hydraulic pressures for switching the respective switching valves 66, 70 for the low speed clutch and for the high speed clutch are restricted by the elastic forces of the respective compression coil springs 68, 72 (refer to FIG. 3) for the low speed clutch and for the high speed clutch.

Figure 25A:
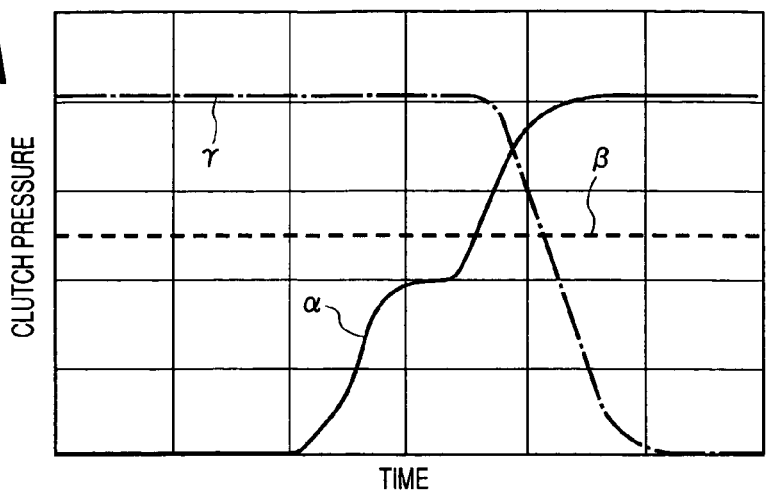
FIGS. 25A-25C are diagrams showing pressure of each portion when switching the clutch in Embodiment 1.
Figure 25B:
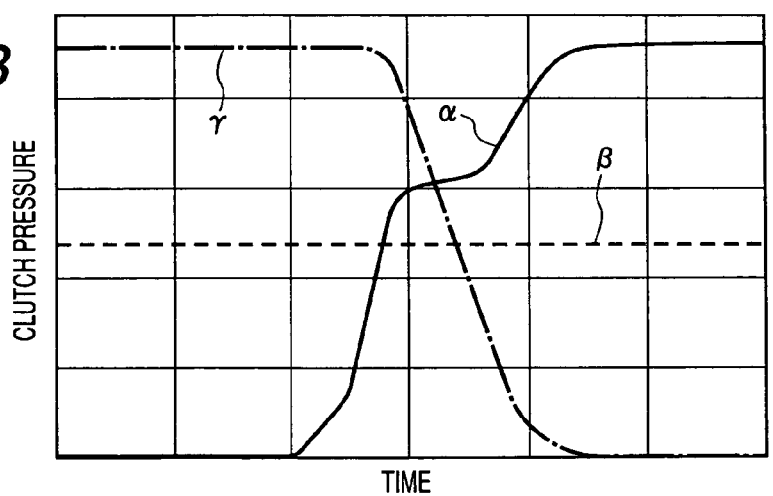
Figure 25C:
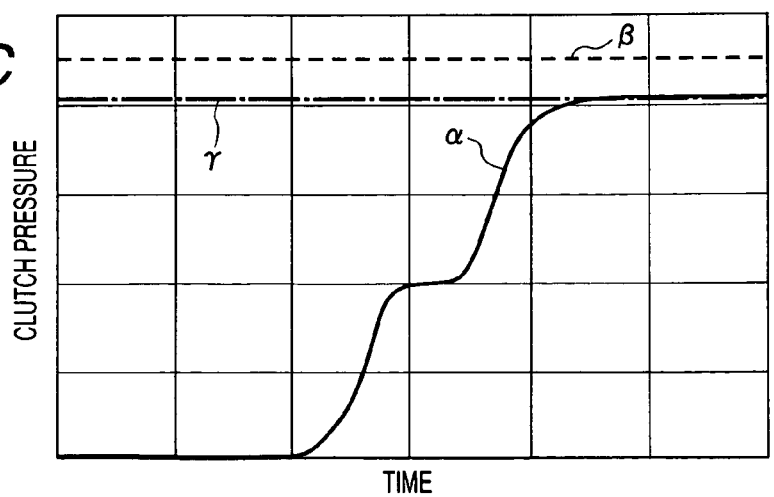

The respect will be explained in reference to FIG. 25. A bold line α in FIG. 25 indicates hydraulic pressure of a portion of the hydraulic chamber for the clutch with regard to one of the clutches which has not been connected, a broken line β of the same indicates hydraulic pressure for switching the switching valve for the clutch, and a chain line γ of the same indicates hydraulic pressure of a portion of the hydraulic chamber for the clutch with regard to other clutch which has been connected, respectively. In the case of a structure of Embodiment 1, as shown by FIG. 25A, no problem is posed when a relationship between hydraulic pressure of switching the switching valve for the clutch and hydraulic pressure introduced into a portion of the hydraulic chamber for each clutch is pertinent. In contrast thereto, when hydraulic pressure for switching the switching valve for the clutch is excessively lower than hydraulic pressure introduced into the portion of the hydraulic chamber for the clutch such that the elastic forces of the respective compression coil springs 68, 72 are excessively low, or the hydraulic pressures introduced into the portions of the hydraulic chambers of the respective clutches are excessively high, (switching of the switching valve for the clutch is carried out excessively simply), the hydraulic pressures are shown by FIG. 25B. In this case, there is present an instance of simultaneously disconnecting connection of the two clutches to bring about speed changing shock. Further, when hydraulic pressure for switching the switch valve for the clutch is excessively higher than the hydraulic pressure introduced into the portion of the hydraulic chamber for each clutch (a switching valve for the clutch is difficult to be switched) such that the elastic forces of the respective compression springs are excessively high or hydraulic pressures introduced into the portions of the hydraulic chambers of the respective clutches are excessively low, the hydraulic pressures becomes as shown by FIG. 25(C). In this case, even when a signal for the switching mode is outputted, the respective clutches 39b, 40b for low speed and for high speed (refer to FIG. 3) are not connected nor disconnected.

In the case of Embodiment 1, described above, it is necessary to pertinently restrict the set pressure of the pressure reducing valve 65 and the elastic forces of the respective compression coil springs 68, 72 such that such a problem is not posed. Further, it is necessary to select constituent members including materials thereof such that the set pressure or the elastic forces are not varied even by using the constituent elements over a long period of time. In contrast thereto, in the case of the embodiment, even when such a consideration is not given, the respective clutches 39b, 40b for the low speed and high speed can pertinently be connected and disconnected.

Embodiment 13

Figure 26:
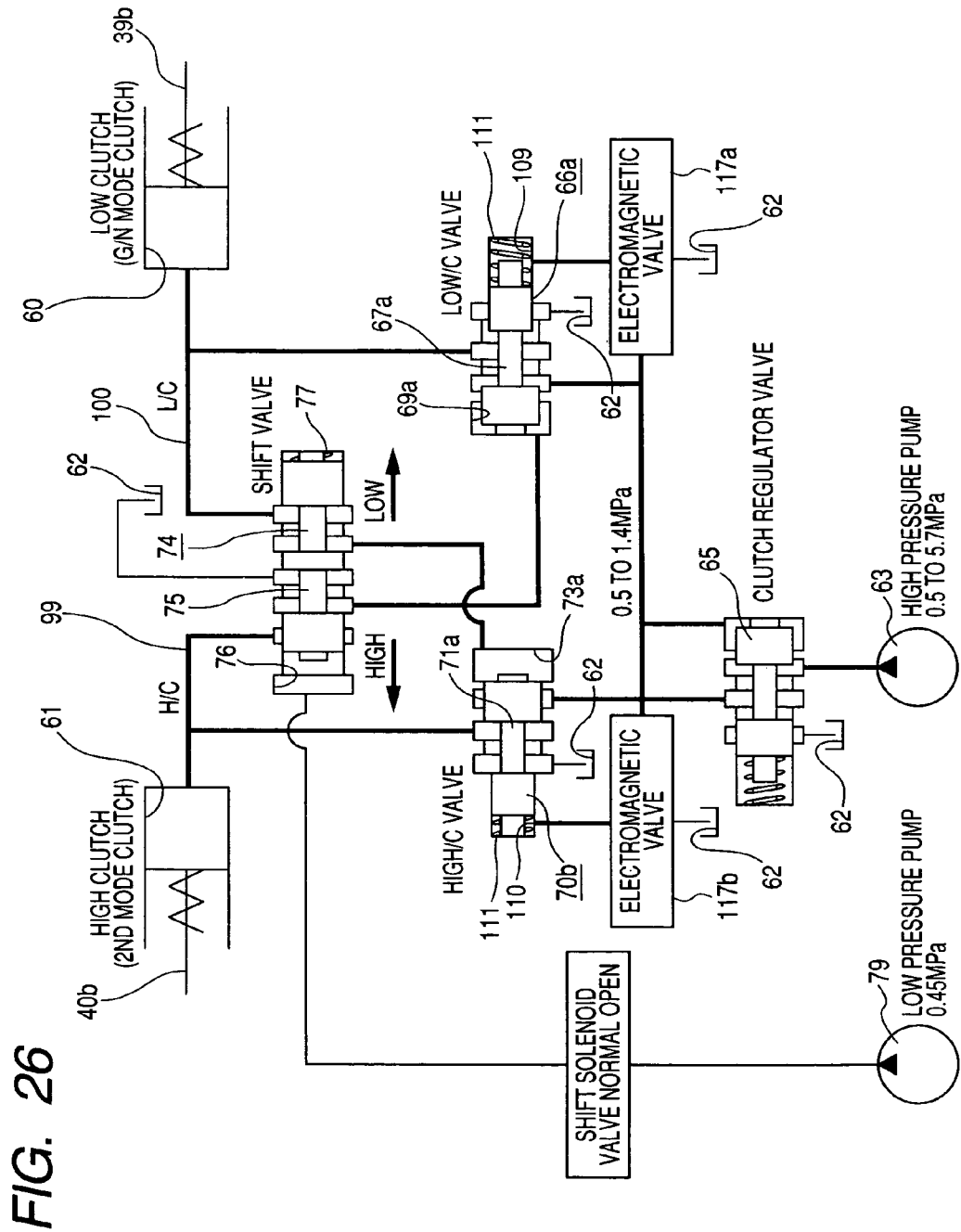
FIG. 26 is a diagram similar to FIG. 23 showing Embodiment 13 of the invention.

FIG. 26 shows Embodiment 13 of the invention. The embodiment is constituted by a structure of combining Embodiment 6 shown in FIG. 16, mentioned above, with Embodiment 12 shown in FIGS. 23 through 25, mentioned above. That is, in the case of the embodiment, hydraulic pressure delivered from the pressurizing pump 63 on the high-pressure side and passed through the pressure reducing valve 65 is introduced into the two reaction force chambers 109, 110 for the low speed clutch and for the high speed clutch in accordance with opening the electromagnetic valves 117a, 117b. In the case of the embodiment, in switching the mode, by opening the respective electromagnetic valves 117a, 117b in order to increase the value opening pressures of the respective switching valves 66a, 70b for the low speed clutch and for the high-speed clutch in switching the mode, hydraulic pressures are introduced into the respective reaction force chambers 109, 110. Further, in starting, hydraulic pressures in the respective reaction force chambers 109, 110 are discharged by closing the respective electromagnetic valves 117a, 117b in order to lower the valve opening pressures of the respective switching valves 66a, 70b for the low speed clutch and for the high speed clutch. The control of the electromagnetic valves 117a, 117b can also be carried out based on the transmission ratio of the toroidal type continuously variable transmission 24, 24a (refer to FIG. 1 and the like) other than carrying out based on the vehicle speed. That is, the transmission ratio of the toroidal type continuously variable transmission 24, 24a differs significantly between in starting and in switching the mode. Therefore, when the control of the respective electromagnetic valves 117a, 117b is carried out based on the transmission ratio of the toroidal type continuously transmission 24, 24a, when the transmission ratio becomes proximate to a value of switching the mode, pressurized oil may be introduced into the respective reaction force chambers 109, 110 by opening the respective electromagnetic valves 117a, 117b. When constituted in this way, in switching the mode, there can be provided a time period of simultaneously transmitting power by the two clutches 39b, 40b for low speed and for high speed (an instance of disconnecting connection of one clutch is slightly retarded from an instance of connecting other clutch) and further, the clutch which is not to be connected in starting can be prevented from being connected. The other constitutions and operation are similar to those of Embodiment 12, mentioned above, and Embodiment 6, mentioned above. In the above-described explanation, an explanation has been given of the case of applying the invention to the continuously variable transmission apparatus referred to as the geared neutral type realizing a rearward moving state, a stationary state and a forward moving state without switching the clutches by combining the toroidal-type continuously variable transmission and the planetary gear type transmission. However, the invention is applicable also to the structure integrated to the continuously variable transmission apparatus referred to as so-to-speak power split type for transmitting power only by the toroidal-type continuously variable transmission in running at low speed, transmitting main power by the planetary gear type transmission in running at high speed and controlling the transmission ratio by the toroidal-type continuously variable transmission. Further, the invention can be utilized not only as an automatic transmission for an automobile but also as a transmission for various industries. Further, the type of the toroidal continuously transmission apparatus is not limited to a half-toroidal type continuously variable transmission apparatus as shown in the drawings. The invention can be applied to a full-toroidal type continuously variable transmission apparatus.

What is claimed is:

1. A continuously variable transmission apparatus combined with a toroidal continuously variable transmission and a planetary gear transmission via a clutch apparatus, wherein the clutch apparatus comprising:

a low speed clutch connected in realizing a low speed mode of increasing a gear change ratio of the continuously variable transmission apparatus and disconnected in realizing a high speed mode of reducing the gear change ratio of the continuously variable transmission apparatus;

a high speed clutch connected in realizing the high speed mode and disconnected in realizing the low speed mode; and a controller for switching a state of connecting and disconnecting the respective clutches; and wherein the controller brings a speed change state into either mode of the low speed mode and the high speed mode by controlling to connect and disconnect the respective clutches; and the controller has a function, in switching the low speed mode and the high speed mode, that, prior to start to connect one of the low speed clutch and the high speed clutch which has not been connected, by adjusting the transmission ratio of the toroidal continuously variable transmission, the one clutch is started to connect after making rotational speeds of a pair of members connected via the one clutch substantially coincide with each other, and after starting to transmit a power by the one clutch, an operation of disconnecting other clutch which has been connected is started, whereby an instance of simultaneously transmitting the power by the two clutches is set during a time period until disconnecting the other clutch after starting to transmit the power by the one clutch.

2. The continuously variable transmission apparatus according to claim 1, wherein a start of the power transmission by the one clutch is detected by detecting a displacement of a drive member for connecting the clutch.

3. The continuously variable transmission apparatus according to claim 1, wherein the low speed clutch is connected by introducing a hydraulic pressure into a hydraulic chamber for the low speed clutch;

the high speed clutch is connected by introducing a hydraulic pressure into a hydraulic chamber for the high speed clutch; and a start of the power transmission by the one of the low speed clutch and the high speed clutch is detected by the hydraulic pressure in the hydraulic chamber for the clutch for introducing the hydraulic pressure in connecting the clutch.

4. The continuously variable transmission apparatus according to claim 3, wherein the hydraulic pressure in the hydraulic chamber for the clutch is electrically detected by a pressure sensor.

5. The continuously variable transmission apparatus according to claim 3, further comprising:

a switching valve switched by introducing the hydraulic pressure into the hydraulic chamber for the clutch to mechanically detect the hydraulic pressure in the hydraulic chamber for the clutch;

wherein a spool constituting the switching valve is displaced by introducing the hydraulic pressure into the hydraulic chamber for the clutch and the hydraulic pressure introduced into the hydraulic chamber for the clutch of the other clutch is reduced based on a displacement of the spool.

6. The continuously variable transmission apparatus according to claim 5, wherein a state of introducing the hydraulic pressure into the hydraulic chamber for the low speed clutch is controlled by the switching valve for the low speed clutch including a spool for the low speed clutch displaced by introducing the hydraulic pressure into a pilot chamber for the low speed clutch;

a state of introducing the hydraulic pressure into the hydraulic chamber for the high speed clutch is controlled by the switching valve for the high speed clutch including a spool for the high speed clutch displaced by introducing the hydraulic pressure into a pilot chamber for the high speed clutch;

the state of introducing the hydraulic pressure into the pilot chamber for the low speed clutch and the state of introducing the hydraulic pressure into the pilot chamber for the high speed clutch are controlled by an electric switch valve;

the switching valve for the low speed clutch reduces the hydraulic pressure introduced into the hydraulic chamber for the low speed clutch by introducing the hydraulic pressure into the pilot chamber for the low speed clutch;

the hydraulic pressure introduced into the pilot chamber for the low speed clutch is the hydraulic pressure introduced into the hydraulic chamber for the high speed clutch;

the switching valve for the high speed clutch reduces the hydraulic pressure introduced into the hydraulic chamber for the high speed clutch by introducing the hydraulic pressure into the pilot chamber for the high speed clutch; and the hydraulic pressure introduced into the pilot chamber for the high speed clutch is the hydraulic pressure introduced into the hydraulic chamber for the low speed clutch.

7. The continuously variable transmission apparatus according to claim 5, wherein a state of introducing the hydraulic pressure into the hydraulic chamber for the low speed clutch is controlled by the switch valve for the low speed clutch including a spool for the low speed clutch displaced by introducing the hydraulic pressure into a pilot chamber for the low speed clutch;

a state of introducing the hydraulic pressure into the hydraulic chamber for the high speed clutch is controlled by the switching valve for the high speed clutch including a spool for the high speed clutch displaced by introducing the hydraulic pressure into a pilot chamber for the high speed clutch;

the state of introducing the hydraulic pressure into the pilot chamber for the low speed clutch and the state of introducing the hydraulic pressure into the pilot chamber for the high speed clutch are controlled by a shifting switching valve including a switching spool displaced by introducing the hydraulic pressure into a switching pilot chamber;

a state of introducing the hydraulic pressure into the switching pilot chamber is controlled by a shifting electric switching valve, the switching valve for the low speed clutch reduces the hydraulic pressure introduced into the hydraulic chamber for the low speed clutch by introducing the hydraulic pressure into the pilot chamber for the low speed clutch;

the hydraulic pressure introduced into the pilot chamber for the low speed clutch is the hydraulic pressure introduced into the hydraulic chamber for the high speed clutch;

the switching valve for the high speed clutch reduces the hydraulic pressure introduced into the hydraulic chamber for the high speed clutch by introducing the hydraulic pressure into the pilot chamber for the high speed clutch; and the hydraulic pressure introduced into the pilot chamber for the high speed clutch is the hydraulic pressure introduced into the hydraulic chamber for the low speed clutch.

8. The continuously variable transmission apparatus according to claim 7, wherein a shifting manual switching valve for manually achieving a function the same as a function of the shifting electric switching valve is provided in parallel with the shifting electric switching valve and a selecting manual switching valve for selecting either of the shifting electric switching valve and the shifting manual switching valve is provided.

9. The continuously variable transmission apparatus according to claim 7, wherein the switching valve for the high speed clutch includes an elastic member for the high speed clutch on a side opposed to the pilot chamber for the high speed clutch in an axial direction by interposing the spool for the high speed clutch;

the spool for the high speed clutch is displaced against an elastic force of the elastic member for the high speed clutch by introducing the hydraulic pressure into the pilot chamber for the high speed clutch;

the switching valve for the low speed clutch includes an elastic member for the low speed clutch on a side opposed to the pilot chamber for the low speed clutch in an axial direction by interposing the spool for the low speed clutch; and the spool for the low speed clutch is displaced against an elastic force of the elastic member for the low speed clutch by introducing the hydraulic pressure into the pilot chamber for the low speed clutch.

10. The continuously variable transmission apparatus according to claim 9, wherein the elastic force of the elastic member for the clutch integrated to the switching valve for the clutch opened in introducing the hydraulic pressure into the hydraulic chamber for the clutch belonging to the clutch which is not to be connected at least in starting in the respective switching valves for the low speed and the high speed clutches is set to be large in a running state and small in a non-running state.

11. The continuously variable transmission apparatus according to claim 10, wherein the elastic member for the clutch is a compression coil spring for the clutch, the compression coil spring for the clutch is provided between the spool for the clutch and a pressing piston provided displaceably in the axial direction at inside of a cylinder portion provided at a position opposed to the pilot chamber for the clutch in the axial direction by interposing the spool for the clutch, and the pressing piston increases the elastic force of the compression coil spring for the clutch by being displaced to a side of the spool for the clutch by the hydraulic pressure introduced into the cylinder portion when the running state is selected and reduces the elastic force of the compression coil spring for the clutch by being displaced to a side of being remote from the spool for the clutch when the hydraulic pressure in the cylinder portion is discharged by selecting the non-running state.

12. The continuously variable transmission apparatus according to claim 11, further comprising:
a manual switching valve switched to a running mode and a non-running mode by a shift lever installed at a driver's seat;
wherein also the elastic forces of the elastic members for the clutches integrated to the switching valves for the clutches opened in introducing the hydraulic pressure into the hydraulic chambers for the clutches belonging not only to the clutch which is not to be connected in starting but also the clutch which is to be connected in starting for elastically pressing the spools for the clutches in the respective switching valves for the low speed and the high speed clutches are increased in a state of switching the manual switching valve to the running mode and reduced in a state of switching the manual switching valve to the non-running mode.

13. The continuously variable transmission apparatus according to claim 7,
wherein the switching valve for the clutch opened in introducing the hydraulic pressure into the hydraulic chamber for the clutch belonging to the clutch which is not to be connected at least in starting in the respective switching valves for the low speed clutch and the high speed clutch, is provided with a reaction force chamber on a side opposed to the pilot chamber for the clutch constituting the switching valve for the clutch by interposing the spool for the clutch constituting the switching valve for the clutch, and the hydraulic pressure in the reaction force chamber for pressing the spool for the clutch to a side of the pilot chamber for the clutch based on the hydraulic pressure introduced to inside of the reaction force chamber is set to be large in the running state and small in the non-running state.

14. The continuously variable transmission apparatus according to claim 13,
wherein the hydraulic pressure having a reduced pressure by being delivered from a delivery port of a pressurizing pump and passing a pressure reducing valve is introduced into the reaction force chamber by passing a pressure control valve of an electric type or an opening and closing valve.

15. The continuously variable transmission apparatus according to claim 13,
wherein the hydraulic pressure having a reduced pressure by being delivered from a delivery port of pressurizing pump and passing a pressure reducing valve is introduced into the reaction force chamber by passing a valve of a hydraulic type switched based on the hydraulic pressure in the hydraulic chamber for the clutch belonging to the connected clutch in the high speed clutch and the low speed clutch.

16. The continuously variable transmission apparatus according to claim 13, further comprising:
a manual switching valve switched to a running mode and a non-running mode by a shift lever installed at a driver's seat;
wherein also the hydraulic pressures in the reaction chambers of the switching valves for the clutches opened in introducing the hydraulic pressure into the hydraulic chambers for the clutches belonging not only to the clutch which is not to be connected in starting but also the clutch which is to be connected in starting in the respective switching valves for the low speed and the high speed clutches are increased in a state of switching the manual switching valve to the running mode and reduced in a state of switching the manual switching valve to the non-running mode.

17. The continuously variable transmission apparatus according to claim 13,
wherein the hydraulic pressure outputted from a portion communicating with a delivery port of a pressurizing pump and adjusted to a predetermined pressure by a pressure control valve of an electric type is introduced into the reaction force chamber.

18. The continuously variable transmission apparatus according to claim 7,
wherein the switching valve for the high speed clutch includes a reaction force chamber for the high speed clutch on a side opposed to the pilot chamber for the high speed clutch in an axial direction by interposing the spool for the high speed clutch, the spool for the high speed clutch is displaced against the hydraulic pressure introduced into the reaction force chamber for the high speed clutch by introducing the hydraulic pressure into the pilot chamber for the high speed clutch, the switching valve for the low speed clutch includes a reaction force chamber for the low speed clutch on a side opposed to the pilot chamber for the low speed clutch in an axial direction by interposing the spool for the low speed clutch, and the spool for the low speed clutch is displaced against the hydraulic pressure introduced into the reaction force chamber for the low speed clutch by introducing the hydraulic pressure into the pilot chamber for the low speed clutch.

19. The continuously variable transmission apparatus according to claim 18,
wherein a rattle preventing spring for the high speed clutch for pressing the spool for the high speed clutch to the side of the pilot chamber for the high speed clutch is provided in the reaction force chamber for the high speed clutch, and a rattle preventing spring for the low speed clutch for pressing the spool for the low speed clutch to the side of the pilot chamber for the low speed clutch is provided in the reaction force chamber for the low speed clutch, respectively.

20. The continuously variable transmission apparatus according to claim 18,
wherein a pressure receiving area on a side of the pilot chamber for the high speed clutch in the spool for the high speed clutch is wider than a pressure receiving area on a side of the reaction force chamber for the high speed clutch;
the same hydraulic pressure is made to be able to be introduced into the hydraulic chamber for the high speed clutch and the reaction force chamber for the high speed clutch;
a pressure receiving area on a side of the pilot chamber for the low speed clutch in the spool for the low speed clutch is wider than a pressure receiving area on a side of the reaction force chamber for the low speed clutch; and
the same hydraulic pressure is made to be able to be introduced into the pilot chamber for the low speed clutch and the reaction force chamber for the low speed clutch.

21. The continuously variable transmission apparatus according to claim 18, wherein the hydraulic pressure introduced into the pilot chamber for the high speed clutch, the reaction force chamber for the high speed clutch, the pilot chamber for the low speed clutch, and the reaction force chamber for the low speed clutch is the hydraulic pressure introduced into the two hydraulic chambers for the high speed clutch and the low speed clutch.

22. The continuously variable transmission apparatus according to claim 20, wherein a ratio of the pressure receiving area on the side of the reaction force chamber for the high speed clutch to the pressure receiving area on the side of the pilot chamber for the high speed clutch as well as a ratio of the pressure receiving area on the side of the reaction force chamber for the low speed clutch to the pressure receiving area on the side of the pilot chamber for the low speed clutch are both equal to or larger than 0.4 and less than 1.

* * * * *